(12) United States Patent
Katakura

(10) Patent No.: US 7,864,441 B2
(45) Date of Patent: Jan. 4, 2011

(54) ZOOM LENS AND IMAGE PICKUP APPARATUS USING THE SAME

(75) Inventor: Masahiro Katakura, Chohu (JP)

(73) Assignee: Olympus Imaging Corp., Tokyo (JP)

( * ) Notice: Subject to any disclaimer, the term of this patent is extended or adjusted under 35 U.S.C. 154(b) by 19 days.

(21) Appl. No.: 12/378,779

(22) Filed: Feb. 18, 2009

(65) Prior Publication Data

US 2009/0207500 A1 Aug. 20, 2009

(30) Foreign Application Priority Data

Feb. 20, 2008 (JP) ............................ 2008-039168
Jan. 23, 2009 (JP) ............................ 2009-013613

(51) Int. Cl.
*G02B 15/14* (2006.01)
(52) U.S. Cl. ..................................................... 359/676
(58) Field of Classification Search .................. 359/676, 359/680–682
See application file for complete search history.

(56) References Cited

U.S. PATENT DOCUMENTS

| 6,995,922 | B2 | 2/2006 | Mihara et al. |
| 7,113,346 | B1 | 9/2006 | Souma et al. |
| 2005/0088756 | A1 | 4/2005 | Yamada |
| 2007/0217026 | A1* | 9/2007 | Nishimura ................... 359/692 |
| 2010/0073778 | A1* | 3/2010 | Hirakawa ................... 359/684 |

FOREIGN PATENT DOCUMENTS

| EP | 1 717 626 | 11/2006 |
| JP | 2004-354871 | 12/2004 |
| JP | 2006-113111 | 4/2006 |

OTHER PUBLICATIONS

European Search Report dated Jun. 9, 2009, issued in corresponding European Patent Application No. 09002204.7.

* cited by examiner

*Primary Examiner*—Joseph Martinez
*Assistant Examiner*—James R Greece
(74) *Attorney, Agent, or Firm*—Kenyon & Kenyon LLP

(57) ABSTRACT

A zoom lens is such that spacings between a plurality of lens units are properly changed and thereby the magnification of the zoom lens is changed. The most object-side lens unit of this zoom lens has a positive refracting power and comprises, in order from an object side, a negative lens, a reflecting member for changing an optical path, and a positive lens, without cementing the reflecting member and the positive lens as well as the reflecting member and the negative lens, and at least one of surfaces of the negative lens and the positive lens is configured as an aspherical surface to satisfy the following condition:

$$0.0001 < |Y_{49}|/ih_w < 0.1$$

where $Y_{49}$ is an aspherical amount of the aspherical surface at a position where a chief ray of light incident on the most object-side lens unit at an angle of 49° with the optical axis is incident on a most object-side aspherical surface in the lens unit and $ih_w$ is an image height at a wide-angle position.

128 Claims, 14 Drawing Sheets

EMBODIMENT 1

EMBODIMENT 1
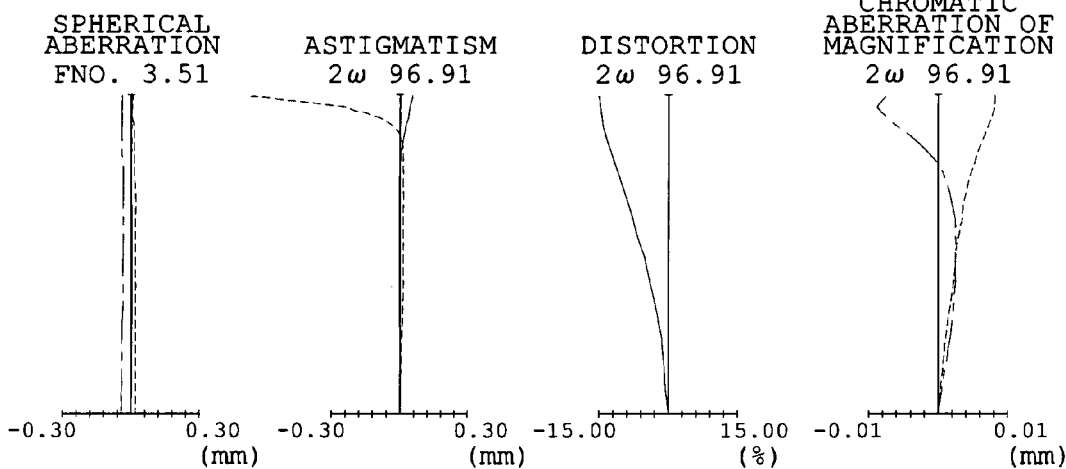
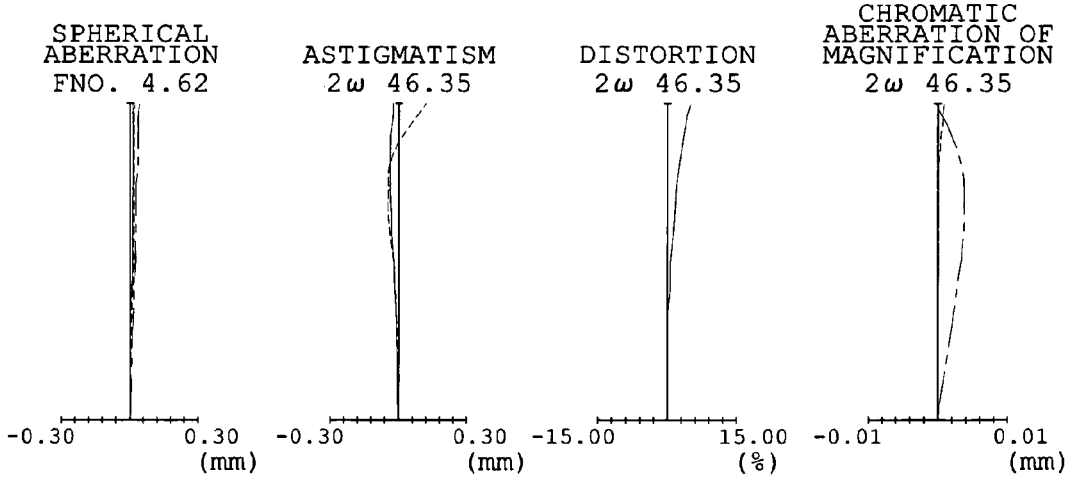
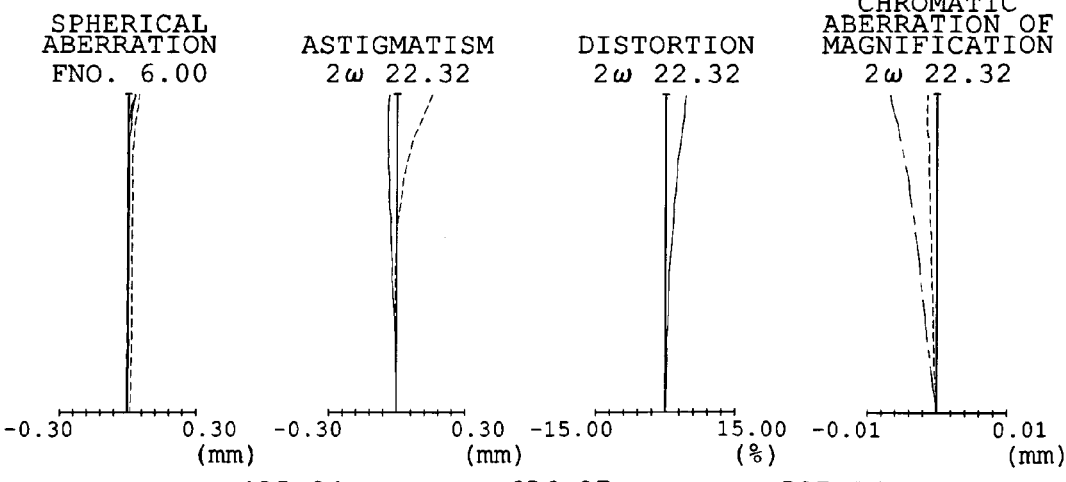
435.84 —·—   656.27 --------   587.56 ———

EMBODIMENT 2

EMBODIMENT 2
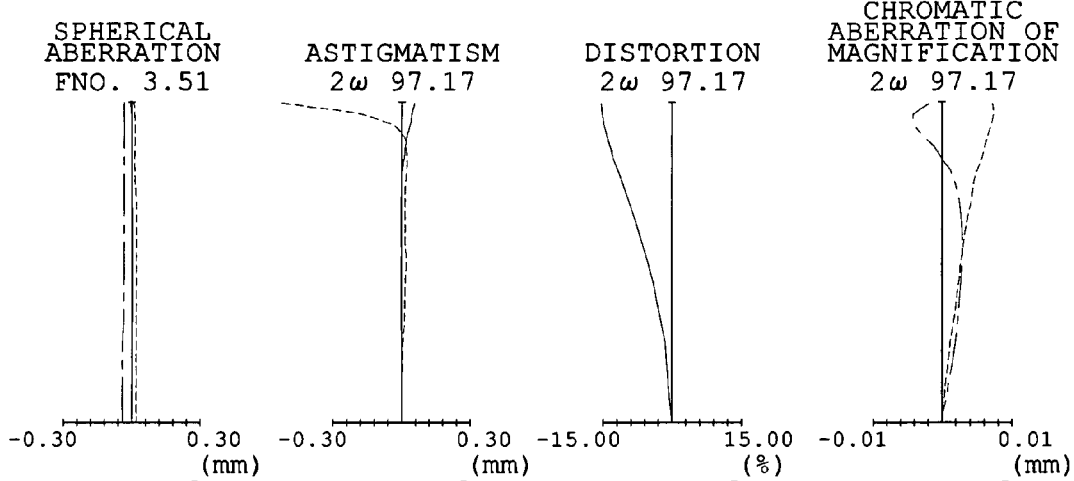
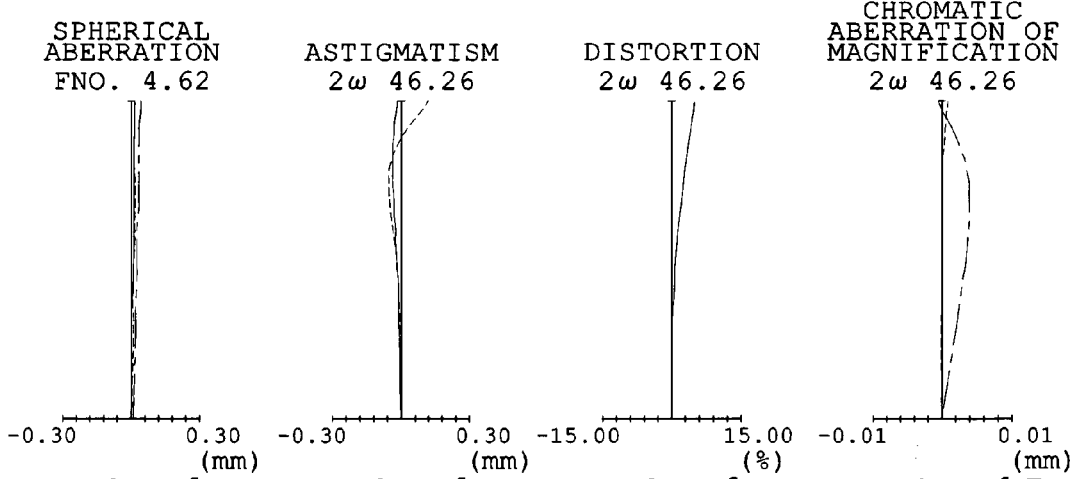
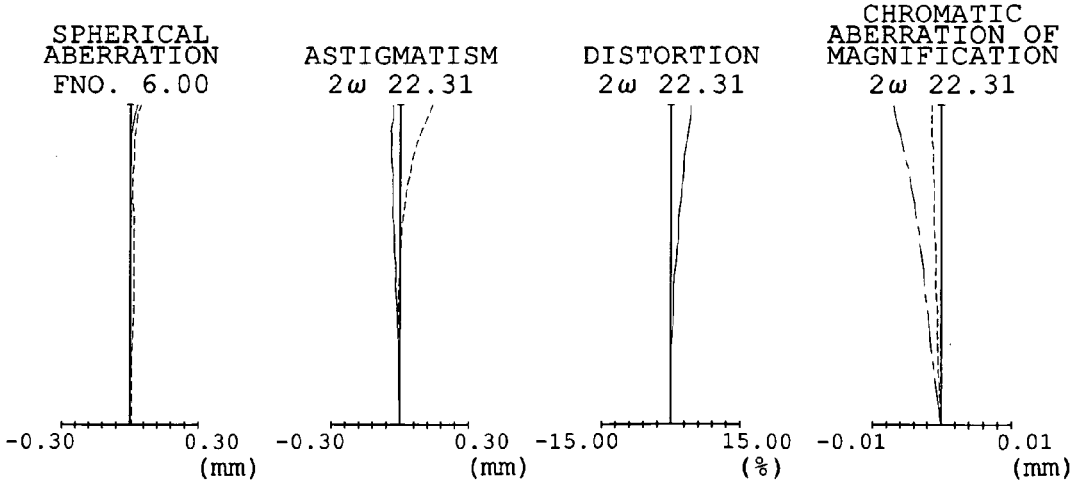

EMBODIMENT 3

EMBODIMENT 3
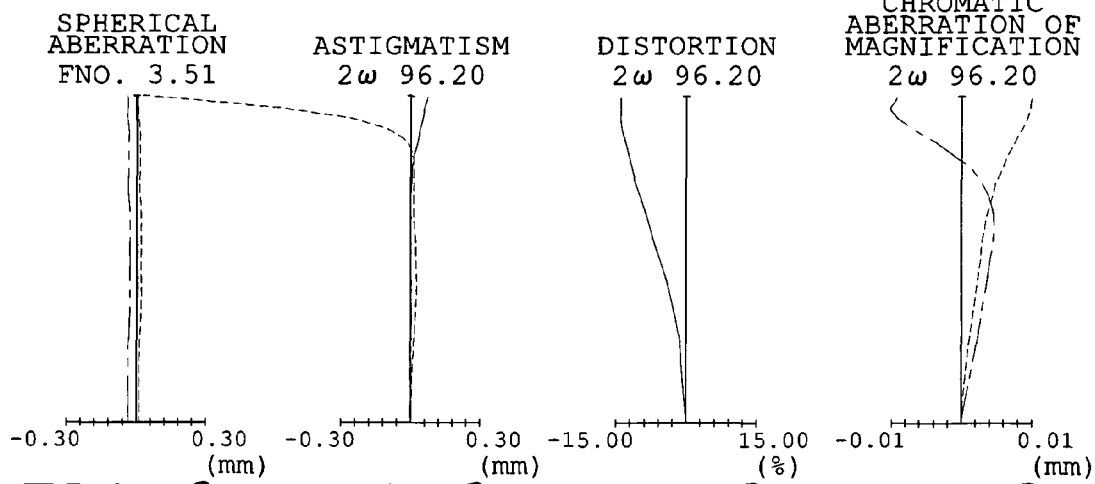
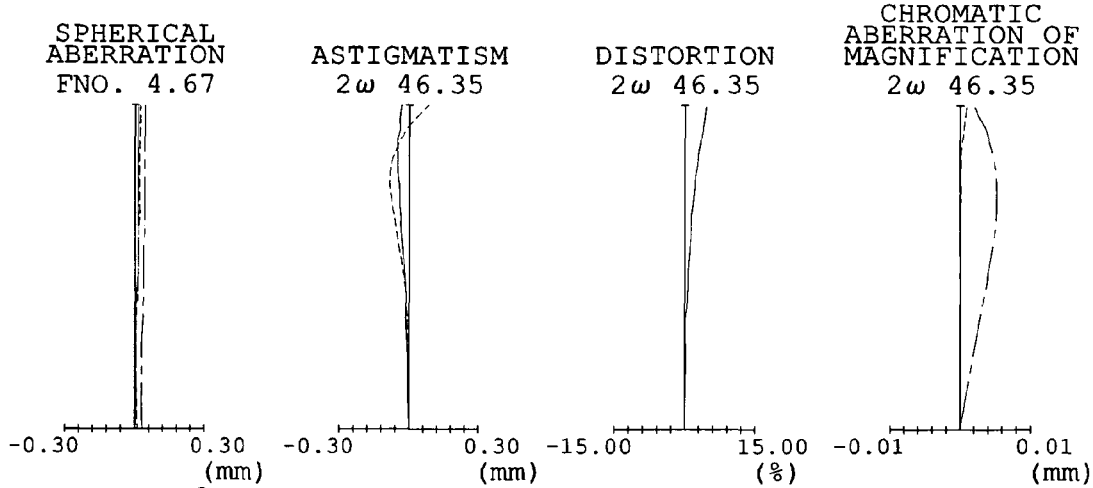
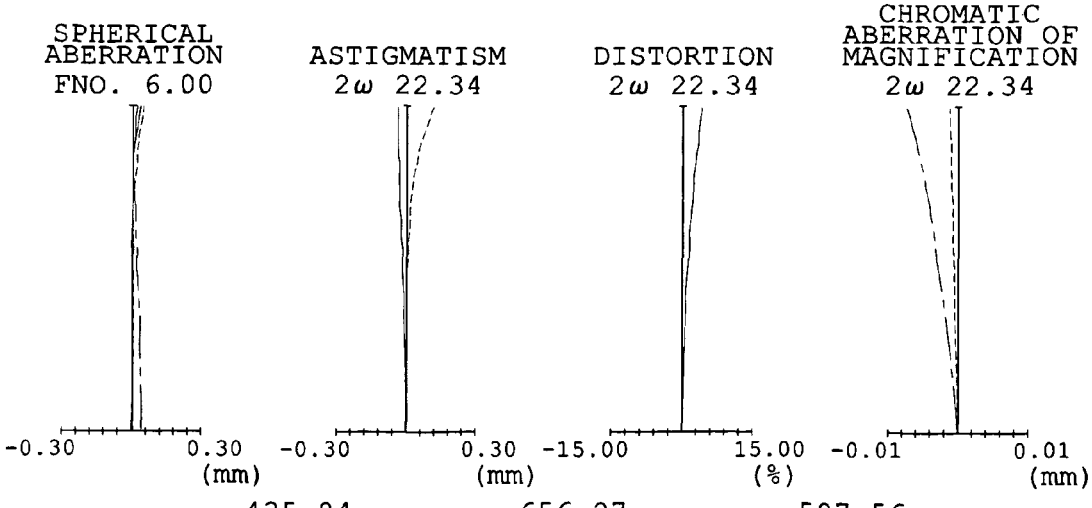

EMBODIMENT 4

EMBODIMENT 4

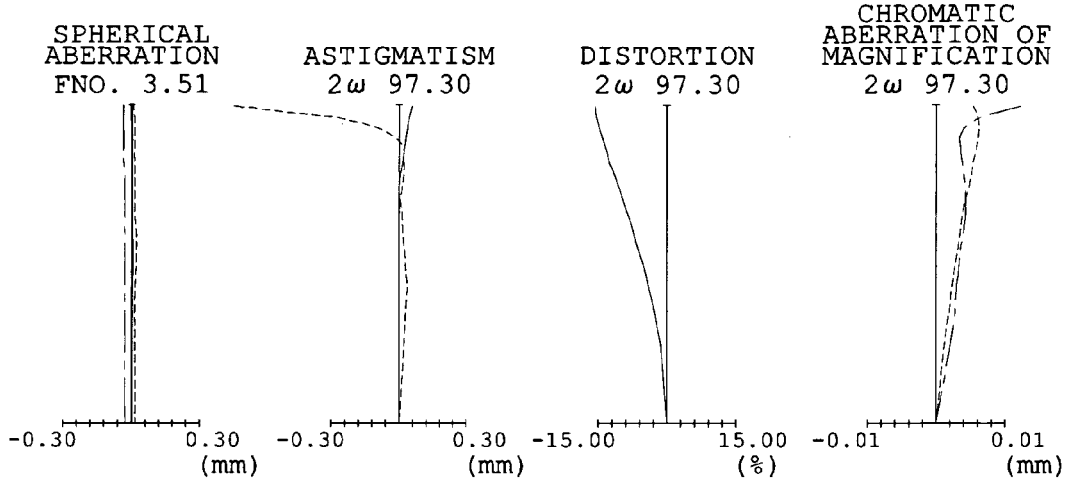

FIG.8A SPHERICAL ABERRATION FNO. 3.51
FIG.8B ASTIGMATISM 2ω 97.30
FIG.8C DISTORTION 2ω 97.30
FIG.8D CHROMATIC ABERRATION OF MAGNIFICATION 2ω 97.30

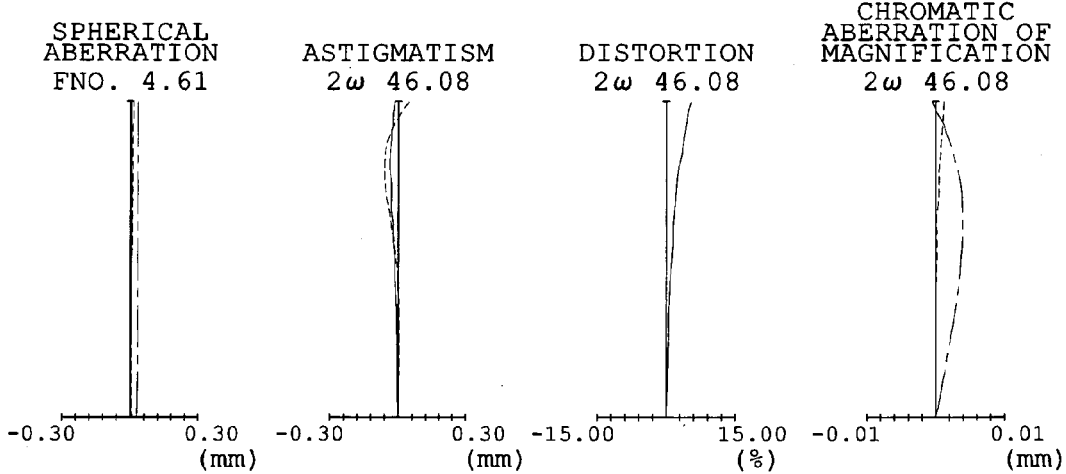

FIG.8E SPHERICAL ABERRATION FNO. 4.61
FIG.8F ASTIGMATISM 2ω 46.08
FIG.8G DISTORTION 2ω 46.08
FIG.8H CHROMATIC ABERRATION OF MAGNIFICATION 2ω 46.08

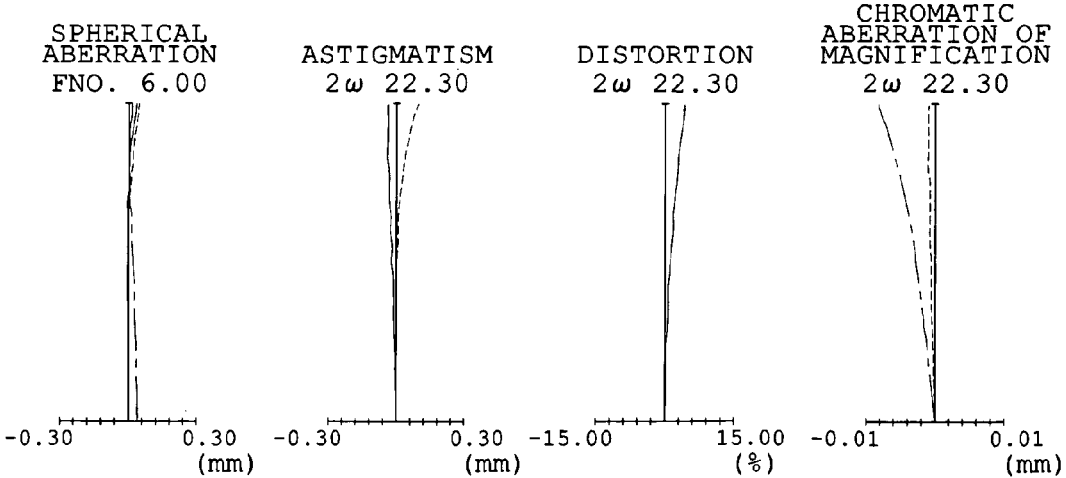

FIG.8I SPHERICAL ABERRATION FNO. 6.00
FIG.8J ASTIGMATISM 2ω 22.30
FIG.8K DISTORTION 2ω 22.30
FIG.8L CHROMATIC ABERRATION OF MAGNIFICATION 2ω 22.30

435.84 —·— 656.27 ········ 587.56 ———

ZOOM LENS AND IMAGE PICKUP APPARATUS USING THE SAME

This application claims benefits of Japanese Patent Application Nos. 2008-39168 filed in Japan on Feb. 20, 2008 and 2009-13613 filed in Japan on Jan. 23, 2009, the contents of which are incorporated herein by reference.

BACKGROUND OF THE INVENTION

1. Field of the Invention

This invention relates to a zoom lens suitable for compact digital still cameras and digital video cameras (which are hereinafter generically called digital cameras) and an image pickup apparatus provided with this zoom lens and an image sensor, such as a CCD or CMOS.

2. Description of Related Art

It has been required that the zoom lens adopted to the digital camera is wide in angle of view, high in magnification, low in cost, and compact in design. As a zoom lens satisfying such requirements, one which includes, in order from the object side, a first lens unit with positive refracting power, a second lens unit with negative refracting power, a third lens unit with positive refracting power, a fourth lens unit with positive refracting power, and a fifth lens unit with positive refracting power so that an optical path is changed in the first lens unit is known, and an example of this zoom lens is disclosed in Japanese Patent Kokai No. 2004-264786. Such a zoom lens realizes a high variable magnification ratio of about 2.5 and favorable optical properties and is capable of attaining a slim design of the digital camera adopting the zoom lens.

As another zoom lens satisfying these requirements, one which includes, in order from the object side, a first lens unit with positive refracting power, a second lens unit with negative refracting power, a third lens unit with positive refracting power, a fourth lens unit with positive refracting power, and a fifth lens unit with negative refracting power so that the optical path is changed in the first lens unit is known, and an example of this zoom lens is disclosed in Japanese Patent Kokai No. 2004-354871. Such a zoom lens realizes a high variable magnification ratio of about 3 and favorable optical properties and is capable of attaining a slim design of the digital camera adopting the zoom lens.

SUMMARY OF THE INVENTION

The zoom lens of the present invention comprises a plurality of lens units so that spacings between the lens units are properly changed and thereby the magnification of the zoom lens is changed. In this case, the most object-side lens unit has a positive refracting power and comprises a negative lens located at the most object-side position, a reflecting member for changing the optical path, placed on the image side of the negative lens, and a positive lens placed on the image side of the reflecting member, without cementing the reflecting member and the positive lens as well as the reflecting member and the negative lens, and at least one of surfaces of the negative lens and the positive lens is configured as an aspherical surface to satisfy the following condition:

$$0.0001 < |Y_{49}|/ih_w < 0.1 \quad (1)$$

where $Y_{49}$ is an aspherical amount of the aspherical surface at a position where a chief ray of light incident on the most object-side lens unit at an angle of 49° with the optical axis is incident on the most object-side aspherical surface in the lens unit and $ih_w$ is an image height at a wide-angle position.

The zoom lens of the present invention comprises a plurality of lens units so that spacings between the lens units are properly changed and thereby the magnification of the zoom lens is changed. In this case, the most object-side lens unit has a positive refracting power and comprises a negative lens located at the most object-side position, a reflecting member for changing the optical path, placed on the image side of the negative lens, and a positive lens placed on the image side of the reflecting member, without cementing the reflecting member and the positive lens as well as the reflecting member and the negative lens, and at least one of surfaces of the negative lens and the positive lens is configured as an aspherical surface to satisfy the following condition:

$$0.0001 < |Y_{47}|/ih_w < 0.1 \quad (2)$$

where $Y_{47}$ is the aspherical amount of the aspherical surface at a position where a chief ray of light incident on the most object-side lens unit at an angle of 47° with the optical axis is incident on the most object-side aspherical surface in the lens unit and $ih_w$ is an image height at a wide-angle position.

The zoom lens of the present invention comprises a plurality of lens units so that spacings between the lens units are properly changed and thereby the magnification of the zoom lens is changed. In this case, the most object-side lens unit has a positive refracting power and comprises a negative lens located at the most object-side position, a reflecting member for changing the optical path, placed on the image side of the negative lens, and a positive lens placed on the image side of the reflecting member, without cementing the reflecting member and the positive lens as well as the reflecting member and the negative lens, and at least one of surfaces of the negative lens and the positive lens is configured as an aspherical surface to satisfy the following condition:

$$0.0001 < |Y_{45}|/ih_w < 0.1 \quad (3)$$

where $Y_{45}$ is the aspherical amount of the aspherical surface at a position where a chief ray of light incident on the most object-side lens unit at an angle of 45° with the optical axis is incident on the most object-side aspherical surface in the lens unit and $ih_w$ is an image height at a wide-angle position.

The zoom lens of the present invention comprises a plurality of lens units so that spacings between the lens units are properly changed and thereby the magnification of the zoom lens is changed. In this case, the most object-side lens unit has a positive refracting power and comprises a negative lens located at the most object-side position, a reflecting member for changing the optical path, placed on the image side of the negative lens, and a positive lens placed on the image side of the reflecting member, without cementing the reflecting member and the positive lens as well as the reflecting member and the negative lens, and at least one of surfaces of the negative lens and the positive lens is configured as an aspherical surface to satisfy the following condition:

$$0.0001 < |Y_{43}|/ih_w < 0.1 \quad (4)$$

where $Y_{43}$ is the aspherical amount of the aspherical surface at a position where a chief ray of light incident on the most object-side lens unit at an angle of 43° with the optical axis is incident on the most object-side aspherical surface in the lens unit and $ih_w$ is an image height at a wide-angle position.

The zoom lens of the present invention comprises a plurality of lens units so that spacings between the lens units are properly changed and thereby the magnification of the zoom lens is changed. In this case, the most object-side lens unit has a positive refracting power and comprises a negative lens located at the most object-side position, a reflecting member for changing the optical path, placed on the image side of the negative lens, and a positive lens placed on the image side of the reflecting member, without cementing the reflecting member and the positive lens as well as the reflecting member and the negative lens, and at least one of surfaces of the negative lens and the positive lens is configured as an aspherical surface to satisfy the following condition:

$$0.0001 < |Y_{41}|/ih_w < 0.1 \tag{5}$$

where $Y_{41}$ is the aspherical amount of the aspherical surface at a position where a chief ray of light incident on the most object-side lens unit at an angle of 41° with the optical axis is incident on the most object-side aspherical surface in the lens unit and $ih_w$ is an image height at a wide-angle position.

The zoom lens of the present invention comprises a plurality of lens units so that spacings between the lens units are properly changed and thereby the magnification of the zoom lens is changed. In this case, the most object-side lens unit has a positive refracting power and comprises a negative lens located at the most object-side position, a reflecting member for changing the optical path, placed on the image side of the negative lens, and one or two positive lenses placed on the image side of the reflecting member, without cementing the reflecting member and the one or two positive lenses as well as the reflecting member and the negative lens; at least one of surfaces of the negative lens and the one or two positive lenses is configured as an aspherical surface; and the most image-side lens unit has a positive refracting power, to satisfy the following condition:

$$0.0001 < |Y_{40}|/ih_w < 0.1 \tag{6}$$

where $Y_{40}$ is the aspherical amount of the aspherical surface at a position where a chief ray of light incident on the most object-side lens unit at an angle of 40° with the optical axis is incident on the most object-side aspherical surface in the lens unit and $ih_w$ is an image height at a wide-angle position.

The zoom lens of the present invention comprises a plurality of lens units so that spacings between the lens units are properly changed and thereby the magnification of the zoom lens is changed. In this case, the most object-side lens unit has a positive refracting power and comprises a negative lens located at the most object-side position, a reflecting member for changing the optical path, placed on the image side of the negative lens, and one or two positive lenses placed on the image side of the reflecting member, without cementing the reflecting member and the one or two positive lenses as well as the reflecting member and the negative lens; at least one of surfaces of the negative lens and the one or two positive lenses is configured as an aspherical surface; and the most image-side lens unit has a positive refracting power, to satisfy the following condition:

$$0.0001 < |Y_{39}|/ih_w < 0.1 \tag{7}$$

where $Y_{39}$ is the aspherical amount of the aspherical surface at a position where a chief ray of light incident on the most object-side lens unit at an angle of 39° with the optical axis is incident on the most object-side aspherical surface in the lens unit and $ih_w$ is an image height at a wide-angle position.

The zoom lens of the present invention comprises a plurality of lens units so that spacings between the lens units are properly changed and thereby the magnification of the zoom lens is changed. In this case, the most object-side lens unit has a positive refracting power and comprises a negative lens located at the most object-side position, a reflecting member for changing the optical path, placed on the image side of the negative lens, and one or two positive lenses placed on the image side of the reflecting member, without cementing the reflecting member and the one or two positive lenses as well as the reflecting member and the negative lens; at least one of surfaces of the negative lens and the one or two positive lenses is configured as an aspherical surface; and the most image-side lens unit has a positive refracting power and includes a single positive lens, to satisfy the following condition:

$$0.0001 < |Y_{38}|/ih_w < 0.1 \tag{8}$$

where $Y_{38}$ is the aspherical amount of the aspherical surface at a position where a chief ray of light incident on the most object-side lens unit at an angle of 38° with the optical axis is incident on the most object-side aspherical surface in the lens unit and $ih_w$ is an image height at a wide-angle position.

In the zoom lens of the present invention, it is desirable that the reflecting member is a prism and satisfies the following condition:

$$1 < D_p/ih_w < 5 \tag{9}$$

where $D_p$ is the length of the prism measured along the optical axis.

In the zoom lens of the present invention, it is desirable to satisfy the following condition:

$$3.5 < f_t/f_w < 7.0 \tag{10}$$

where $f_w$ is the focal length of the zoom lens at a wide-angle position and $f_t$ is the focal length of the zoom lens at a telephoto position.

In the zoom lens of the present invention, it is desirable to satisfy the following condition:

$$0.5 < (r_{GIF\_O} + r_{GIF\_I})/(r_{GIF\_O} - r_{GIF\_I}) < 1.5 \tag{11}$$

where $r_{GIF\_O}$ is the radius of curvature of the object-side surface of the negative lens located at the most object-side position of the most object-side lens unit and $r_{GIF\_I}$ is the radius of curvature of the image-side surface of the negative lens located at the most object-side position of the most object-side lens unit.

In the zoom lens of the present invention, it is desirable to satisfy the following conditions:

$$1.95 < n_{dGIF} < 2.1 \tag{12}$$

$$18 < \nu_{dGIF} < 30 \tag{13}$$

where $n_{dGIF}$ is the refractive index of the negative lens located at the most object-side position of the most object-side lens unit and $\nu_{dGIF}$ is the Abbe's number of the negative lens located at the most object-side position of the most object-side lens unit.

In the zoom lens of the present invention, it is desirable that an aperture stop is provided so that the lens unit located at the most object-side position and the aperture stop are not moved when the magnification is changed.

In the zoom lens of the present invention, it is desirable that when the aperture stop is provided so that the lens unit located at the most object-side position and the aperture stop are not moved when the magnification is changed, the zoom lens comprises, in order from the object side, the first lens unit of the lens unit located at the most object-side position, the second lens unit with negative refracting power, the third lens unit with positive refracting power, the aperture stop, the fourth lens unit with positive refracting power, and the fifth lens unit with positive refracting power.

In the zoom lens of the present invention, it is desirable that when the zoom lens comprises the five lens units mentioned above, the fifth lens unit is constructed with a single positive lens and satisfies the following condition:

$$1.5 < P_w/ih_w < 2.3 \quad (14)$$

where $P_w$ is the position of the entrance pupil of the zoom lens at the wide-angle position.

In the zoom lens of the present invention, it is desirable that when the zoom lens comprises the five lens units mentioned above, the fourth lens unit is a moving unit in which a negative lens is located at the most image-side position and satisfies the following condition:

$$1 < (r_{G4L\_O} + r_{G4L\_I})/(r_{G4L\_O} - r_{G4L\_I}) < 8 \quad (15)$$

where $r_{G4L\_O}$ is the radius of curvature of the object-side surface of the negative lens located at the most image-side position of the fourth lens unit and $r_{G4L\_I}$ is the radius of curvature of the image-side surface of the negative lens located at the most image-side position of the fourth lens unit.

In the zoom lens of the present invention, it is desirable that when the zoom lens comprises the five lens units mentioned above, the third lens unit is constructed with a single positive lens.

In the zoom lens of the present invention, it is desirable that when the zoom lens comprises the five lens units mentioned above, the fourth lens unit consists of, in order from the object side, a positive lens, a cemented doublet of a positive lens and a negative lens, and a negative lens and satisfies the following condition:

$$0.3 < P_{G4C}/P_{G4L} < 2 \quad (16)$$

where $P_{G4C}$ is the refractive index of the cemented doublet of the fourth lens unit and $P_{G4L}$ is the refractive index of the negative lens located at the most image-side position of the fourth lens unit.

In the zoom lens of the present invention, it is desirable that when the zoom lens comprises the five lens units mentioned above, it satisfies at least one of the following conditions:

$$-5.0 < P_{G2}/P_{G4} < -0.3 \quad (17)$$

$$0.1 < P_{G3}/P_{G4} < 4 \quad (18)$$

where $P_{G2}$ is the refractive index of the second lens unit, $P_{G3}$ is the refractive index of the third lens unit, and $P_{G4}$ is the refractive index of the fourth lens unit.

In the zoom lens of the present invention, it is desirable that when the zoom lens comprises the five lens units mentioned above, the fifth lens unit is constructed with a single positive lens and satisfies the following condition:

$$0.5 < f_{G5}/f_t < 2.0 \quad (19)$$

where $f_{G5}$ is the focal length of the positive lens constituting the fifth lens unit.

The image pickup apparatus of the present invention comprises the zoom lens and an image sensor converting an image formed by the zoom lens into an electric signal.

The image pickup apparatus of the present invention is provided with a circuit electrically correcting distortion and/or chromatic aberration of magnification.

According to the present invention, it is possible to provide the zoom lens which is compact, can be fabricated at a low cost, has a wide angle of view and a high variable magnification ratio of about 5, and possesses excellent optical properties with respect to on- and off-axis aberrations, and an image pickup apparatus using this zoom lens.

These and other features and advantages of the present invention will become apparent from the following detailed description of the preferred embodiments when taken in conjunction with the accompanying drawings.

BRIEF DESCRIPTION OF THE DRAWINGS

FIGS. 2A-2D, 2E-2H, and 2I-2L are diagrams showing aberration characteristics at wide-angle, middle, and telephoto positions, respectively, in infinite object point focusing of the zoom lens shown in FIGS. 1A-1C.

FIGS. 4A-4D, 4E-4H, and 4I-4L are diagrams showing aberration characteristics at wide-angle, middle, and telephoto positions, respectively, in infinite object point focusing of the zoom lens shown in FIGS. 3A-3C.

FIGS. 6A-6D, 6E-6H, and 6I-6L are diagrams showing aberration characteristics at wide-angle, middle, and telephoto positions, respectively, in infinite object point focusing of the zoom lens shown in FIGS. 5A-5C.

FIGS. 8A-8D, 8E-8H, and 8I-8L are diagrams showing aberration characteristics at wide-angle, middle, and telephoto positions, respectively, in infinite object point focusing of the zoom lens shown in FIGS. 7A-7C.

DETAILED DESCRIPTION OF THE PREFERRED EMBODIMENTS

Figure 1A:
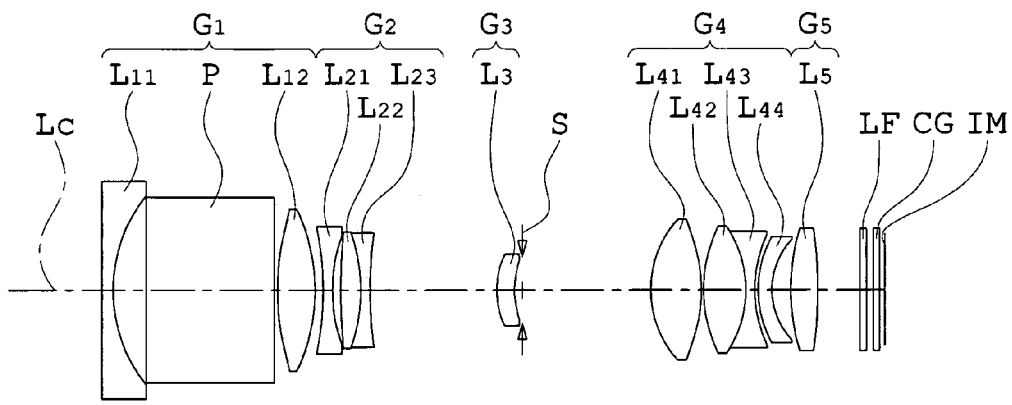
FIGS. 1A, 1B, and 1C are sectional views showing optical arrangements, developed along the optical axis, at wide-angle, middle, and telephoto positions, respectively, in infinite object point focusing of the zoom lens according to Embodiment 1 of the present invention.

Before undertaking the description of the embodiments of the zoom lens of the present invention and the image pickup apparatus using the zoom lens, the function and effect of the structure of the present invention will be explained.

The zoom lens of the present invention comprises a plurality of lens units so that spacings between the lens units are properly changed and thereby the magnification of the zoom lens is changed. In this case, the most object-side lens unit has a positive refracting power and comprises a negative lens placed at the most object-side position, a reflecting member for changing the optical path, placed on the image side of the negative lens, and a positive lens placed on the image side of the reflecting member, and at least one of surfaces of the negative lens, the reflecting member, and the positive lens is configured as an aspherical surface to satisfy the following condition:

$$0.0001 < |Y|/ih_w < 0.1$$

where Y is the aspherical amount of the aspherical surface at a position where a chief ray of light incident on the most object-side lens unit at a preset angle with the optical axis is incident on the most object-side aspherical surface in the lens unit and $ih_w$ is an image height at the wide-angle position.

In the zoom lens of the present invention, as mentioned above, the negative lens is located at the most object-side position of the most object-side lens unit and thus its effective aperture is small. In addition, the zoom lens of the present invention provides the most object-side lens unit with the reflecting member changing the optical path so that the optical path is changed in the most object-side lens unit and thereby directions in which other lens units are moved in order to carry out the magnification change and focusing are different from a direction along the optical axis of incidence. Consequently, in the zoom lens of the present invention, the size of the lens in its radial direction is reduced and the size in the direction along the optical axis of incidence is also reduced so that when the zoom lens is used in a camera, the slim design of the camera can be easily realized.

In this way, the zoom lens of the present invention is designed to locate the negative lens at the most object-side position of the most object-side lens unit, the reflecting member on the image side of the negative lens, and the positive lens on the image side of the reflecting member. Whereby, the image-side surface of the negative lens can be configured as a strong concave surface and hence is capable of favorably correcting aberration, notably off-axis aberration at the wide-angle position, while having a sufficient refracting power.

The zoom lens of the present invention, as described above, is constructed so that the most object-side lens unit has at least one aspherical surface and satisfies any one of the following conditions:

$$0.0001 < |Y_{49}|/ih_w < 0.1 \tag{1}$$

$$0.0001 < |Y_{47}|/ih_w < 0.1 \tag{2}$$

$$0.0001 < |Y_{45}|/ih_w < 0.1 \tag{3}$$

$$0.0001 < |Y_{43}|/ih_w < 0.1 \tag{4}$$

$$0.0001 < |Y_{41}|/ih_w < 0.1 \tag{5}$$

$$0.0001 < |Y_{40}|/ih_w < 0.1 \tag{6}$$

$$0.0001 < |Y_{39}|/ih_w < 0.1 \tag{7}$$

$$0.0001 < |Y_{38}|/ih_w < 0.1 \tag{8}$$

where $Y_{49}$, $Y_{47}$, $Y_{45}$, $Y_{43}$, $Y_{41}$, $Y_{40}$, $Y_{39}$, and $Y_{38}$ are the aspherical amounts of the aspherical surfaces at positions where chief rays of light incident on the most object-side lens unit at angles of 49°, 47°, 45°, 43°, 41°, 40°, 39°, and 38°, respectively, with the optical axis are incident on the most object-side aspherical surface in the most object-side lens unit and $ih_w$ is an image height at the wide-angle position.

Conditions (1)-(8) determine the conditions of the aspherical amounts of the aspherical surfaces required when the wide-angle design is attained. Below the lower limit values of Conditions (1)-(8), the aspherical amount of the most object-side aspherical surface in the most object-side lens unit becomes too small to mainly correct off-axis aberration and it becomes difficult to attain the wide-angle design. On the other hand, beyond the upper limit values of Conditions (1)-(8), the aspherical amount of the most object-side aspherical surface in the most object-side lens unit becomes extremely large, and mass production becomes difficult because an optical system producing fabrication errors is caused.

Also, it is more desirable that the zoom lens, instead of satisfying Conditions (1)-(8), is designed to satisfy any one of Conditions (1)'-(8)' and (1)"-(8)" described below.

$$0.00015 < |Y_{49}|/ih_w < 0.01 \tag{1)'}$$

$$0.0002 < |Y_{49}|/ih_w < 0.008 \tag{1)"}$$

$$0.00015 < |Y_{47}|/ih_w < 0.01 \tag{2)'}$$

$$0.0002 < |Y_{47}|/ih_w < 0.008 \tag{2)"}$$

$$0.00015 < |Y_{45}|/ih_w < 0.01 \tag{3)'}$$

$$0.0002 < |Y_{45}|/ih_w < 0.008 \tag{3)"}$$

$$0.00015 < |Y_{43}|/ih_w < 0.01 \tag{4)'}$$

$$0.0002 < |Y_{43}|/ih_w < 0.008 \tag{4)"}$$

$$0.00015 < |Y_{41}|/ih_w < 0.01 \tag{5)'}$$

$$0.0002 < |Y_{41}|/ih_w < 0.008 \tag{5)"}$$

$$0.00015 < |Y_{40}|/ih_w < 0.01 \tag{6)'}$$

$$0.0002 < |Y_{40}|/ih_w < 0.008 \tag{6)"}$$

$$0.00015 < |Y_{39}|/ih_w < 0.01 \tag{7)'}$$

$$0.0002 < |Y_{39}|/ih_w < 0.008 \tag{7)"}$$

$$0.00015 < |Y_{38}|/ih_w < 0.01 \tag{8)'}$$

$$0.0002 < |Y_{38}|/ih_w < 0.008 \tag{8)"}$$

Also, the upper limit values or lower limit values of Conditions (1)'-(8)' may be set as the upper limit values or lower limit values of Conditions (1)-(8) and (1)"-(8)", and the upper limit values or lower limit values of Conditions (1)"-(8)" may also be set as the upper limit values or lower limit values of Conditions (1)-(8) and (1)'-(8)'.

Since the zoom lens of the present invention, as mentioned above, imparts the positive refracting power to the most image-side lens unit, a telecentric characteristic is ensured and a reduction in the amount of incident light can be suppressed.

In the zoom lens of the present invention, as described above, the positive lens is placed on the image side of the reflecting member in the most object-side lens unit, and the positive refracting power is reasonably imparted to the most object-side lens unit without increasing the cost, so that spherical aberration produced due to the negative lens located at the most object-side position can be favorably corrected. Also, it is desirable that one or two positive lenses are used for the optical arrangement.

Also, in the zoom lens of the present invention, it is desirable that the positive refracting power is imparted to the most image-side lens unit. By doing so, the telecentric characteristic is sufficiently ensured and at the same time, the cost can be kept. Also, it is desirable that the most image-side lens unit is constructed with a single positive lens. In the zoom lens of the present invention, it is desirable that the reflecting member is a prism and satisfies the following condition:

$$1 < D_p/ih_w < 5 \qquad (9)$$

where $D_p$ is the length of the prism measured along the optical axis and $ih_w$ is an image height at the wide-angle position.

Condition (9) determines the condition for reasonably placing the prism changing the optical path in the zoom lens. Below the lower limit value of Condition (9), the amount of ambient light is considerably decreased, which is unfavorable. On the other hand, beyond the upper limit value of Condition (9), bulkiness of the overall length is caused. Also, it is more desirable that the zoom lens, instead of satisfying Condition (9), is constructed to satisfy one of the following conditions:

$$1.5 < D_p/ih_w < 4.6 \qquad (9)'$$

$$2.5 < D_p/ih_w < 3.5 \qquad (9)''$$

Also, the upper limit value or lower limit value of Condition (9)' may be set as the upper limit values or lower limit values of Conditions (9) and (9)'', and the upper limit value or lower limit value of Condition (9)'' may also be set as the upper limit values or lower limit values of Conditions (9) and (9)'.

In the zoom lens of the present invention, it is desirable to satisfy the following condition:

$$3.5 < f_t/f_w < 7.0 \qquad (10)$$

where $f_w$ is the focal length of the zoom lens at the wide-angle position and $f_t$ is the focal length of the zoom lens at the telephoto position.

Condition (10) refers to the variable magnification ratio. Below the lower limit value of Condition (10), a desired variable magnification ratio ceases to be obtainable. On the other hand, beyond the upper limit value of Condition (10), the overall length is liable to bulk at the wide-angle and telephoto positions. Also, it is further desirable that the zoom lens, instead of satisfying Condition (10), is constructed to satisfy one of the following conditions:

$$4.0 < f_t/f_w < 6.0 \qquad (10)'$$

$$2.5 < f_t/f_w < 3.5 \qquad (10)''$$

Also, the upper limit value or lower limit value of Condition (10)' may be set as the upper limit values or lower limit values of Conditions (10) and (10)'', and the upper limit value or lower limit value of Condition (10)'' may also be set as the upper limit values or lower limit values of Conditions (10) and (10)'.

In the zoom lens of the present invention, it is desirable to satisfy the following condition:

$$0.5 < (r_{GIF\_O} + r_{GIF\_I})/(r_{GIF\_O} - r_{GIF\_I}) < 1.5 \qquad (11)$$

where $r_{GIF\_O}$ is the radius of curvature of the object-side surface of the negative lens located at the most object-side position of the most object-side lens unit and $r_{GIF\_I}$ is the radius of curvature of the image-side surface of the negative lens located at the most object-side position of the most object-side lens unit.

Condition (11) determines the condition relative to the negative lens located at the most object-side position of the most object-side lens unit. When the radii of curvature of the negative lens are within the limit of Condition (11), it is possible to favorably correct off-axis aberration while obtaining a sufficient negative refracting power. Below the lower limit value of Condition (11), correction for off-axis aberration becomes difficult in the main. On the other hand, beyond the upper limit value of Condition (11), the entrance pupil is moved toward the image side, and thus the ray height is increased so that the radial size is liable to bulk. Also, it is more desirable that the zoom lens, instead of satisfying Condition (11), is designed to satisfy one of the following conditions:

$$0.7 < (r_{GIF\_O} + r_{GIF\_I})/(r_{GIF\_O} - r_{GIF\_I}) < 1.3 \qquad (11)'$$

$$0.8 < (r_{GIF\_O} + r_{GIF\_I})/(r_{GIF\_O} - r_{GIF\_I}) < 1.2 \qquad (11)''$$

Also, the upper limit value or lower limit value of Condition (11)' may be set as the upper limit values or lower limit values of Conditions (11) and (11)'', and the upper limit value or lower limit value of Condition (11)'' may also be set as the upper limit values or lower limit values of Conditions (11) and (11)'.

In the zoom lens of the present invention, it is desirable to satisfy the following conditions:

$$1.95 < n_{dGIF} < 2.1 \qquad (12)$$

$$18 < \nu_{dGIF} < 30 \qquad (13)$$

where $n_{dGIF}$ is the refractive index of the negative lens located at the most object-side position of the most object-side lens unit and $\nu_{dGIF}$ is the Abbe's number of the negative lens located at the most object-side position of the most object-side lens unit.

Conditions (12) and (13) are conditions for reducing the overall length of the zoom lens by suppressing aberration while ensuring the refracting power of the negative lens located at the most object-side position of the most object-side lens unit. Below the lower limit value of Condition (12), the radius of curvature of the negative lens located at the most object-side position of the most object-side lens unit becomes small and off-axis aberration is liable to occur. On the other hand, beyond the upper limit value of Condition (12), the availability of glass material for configuring the negative lens located at the most object-side position of the most object-side lens unit is impaired, and an increase in cost and the deterioration of mass productivity are caused. Below the lower limit value or beyond the upper limit value of Condition (13) while satisfying Condition (12), the availability of glass material for configuring the negative lens located at the most object-side position of the most object-side lens unit is impaired, and an increase in cost and the deterioration of mass productivity are caused.

In the zoom lens of the present invention, it is desirable that the aperture stop is provided so that the lens unit located at the most object-side position and the aperture stop are not moved when the magnification is changed. By doing so, a drive control section for changing the magnification can be simply constructed and therefore, a compact design and a cost reduction are easily realized relative to the whole of the apparatus using the zoom lens of the present invention.

In the zoom lens of the present invention, it is desirable to comprise, in order from the object side, the first lens unit with positive refracting power, the second lens unit with negative refracting power, the third lens unit with positive refracting power, the aperture stop, the fourth lens unit with positive refracting power, and the fifth lens unit with positive refracting power. In such an arrangement, a sufficient refracting power is imparted to each lens unit and at the same time, aberration can be favorably corrected.

In the zoom lens of the present invention, it is desirable that when the zoom lens comprises the five lens units mentioned above, the fifth lens unit is constructed with a single positive lens and satisfies the following condition:

$$1.5 < P_w/ih_w < 2.3 \tag{14}$$

where $P_w$ is the position of the entrance pupil of the zoom lens at the wide-angle position and $ih_w$ is an image height at the wide-angle position.

In such an arrangement, a cost reduction is realized and at the same time, space for the magnification change and focusing can be ensured in the zoom lens. Below the lower limit value of Condition (14), the problem arises that a magnification to be obtained by the lens units moved for the magnification change approaches zero and the amount of movement of the lens units is increased or the variable magnification ratio is decreased. In addition, correction for off-axis aberration, such as distortion, and correction for chromatic aberration become difficult. On the other hand, beyond the upper limit value of Condition (14), the entrance pupil becomes extremely deep, and when an attempt is made to ensure the angle of view of some extent, the diameters and thicknesses of individual optical elements constituting the first lens unit bulk and the change of the optical path becomes physically difficult.

In the zoom lens of the present invention, it is desirable that when the zoom lens comprises the five lens units mentioned above, the fourth lens unit is a moving unit in which a negative lens is located at the most image-side position and satisfies the following condition:

$$1 < (r_{G4L\_O} + r_{G4L\_I})/(r_{G4L\_O} - r_{G4L\_I}) < 8 \tag{15}$$

where $r_{G4L\_O}$ is the radius of curvature of the object-side surface of the negative lens located at the most image-side position of the fourth lens unit and $r_{G4L\_I}$ is the radius of curvature of the image-side surface of the negative lens located at the most image-side position of the fourth lens unit.

As mentioned above, when the zoom lens is constructed so that the fourth lens unit is taken as the moving unit and relative relationships between the fourth lens unit and the lens units located on the object side of the fourth lens unit can be changed, the fourth lens unit can be thought of as a variator for making the magnification change. When the negative lens is located at the most image-side position of the fourth lens unit, the Petzval sum is improved and correction for curvature of field is facilitated at the wide-angle position in the main from the viewpoint of correction for aberration. In addition, when another lens element with negative refracting power exists in the fourth lens unit, the refracting power is shared between the lens element and the negative lens and a ray of light incident on the fourth lens unit can be refracted. Also, Condition (15) refers to the condition for determining the radii of curvature so that the ray of light is reasonably refracted by the negative lens of the fourth lens unit. Below the lower limit value of Condition (15), the refracting power becomes extremely strong and off-axis aberration is liable to be produced. On the other hand, below the lower limit value of Condition (15), it is hard to obtain a sufficient refracting power.

It is more desirable that the zoom lens, instead of satisfying Condition (15), is designed to satisfy one of the following conditions:

$$3 < (r_{G4L\_O} + r_{G4L\_I})/(r_{G4L\_O} - r_{G4L\_I}) < 6 \tag{15'}$$

$$4 < (r_{G4L\_O} + r_{G4L\_I})/(r_{G4L\_O} - r_{G4L\_I}) < 5 \tag{15''}$$

Also, the upper limit value or lower limit value of Condition (15)' may be set as the upper limit values or lower limit values of Conditions (15) and (15)'', and the upper limit value or lower limit value of Condition (15)'' may also be set as the upper limit values or lower limit values of Conditions (15) and (15)'.

In the zoom lens of the present invention, it is desirable that when the zoom lens comprises the five lens units mentioned above, the third lens unit is constructed with a single positive lens. By doing so, bulkiness of the third lens unit and the overall length of the zoom lens can be easily prevented and a cost reduction is feasible.

In the zoom lens of the present invention, it is desirable that when the zoom lens comprises the five lens units mentioned above, the fourth lens unit consists of, in order from the object side, a positive lens, a cemented doublet of a positive lens and a negative lens, and a negative lens and satisfies the following condition:

$$0.3 < P_{G4C}/P_{G4L} < 2 \tag{16}$$

where $P_{G4C}$ is the refractive index of the cemented doublet of the fourth lens unit and $P_{G4L}$ is the refractive index of the negative lens located at the most image-side position of the fourth lens unit.

As described above, the fourth lens unit consists of, in order from the object side, a positive lens, a cemented doublet of a positive lens and a negative lens, and a negative lens, and thereby the negative refracting power of the fourth lens unit can be shared between the cemented doublet and the negative lens and it is possible to transfer an object image to the fifth lens unit that is an imaging lens while favorably correcting curvature of field and coma due to the improvement of the Petzval sum. Also, Condition (16) refers to the condition for determining the relationship between the refractive index of the cemented doublet and the refractive index of the negative lens in the fourth lens unit. When these refractive indices are within the limit of Condition (16), the negative refracting power of the fourth lens unit is favorably shared, and chromatic aberration and off-axis aberration can be favorably corrected by the cemented doublet and the negative lens, respectively. Beyond the upper limit value or below the lower limit value of Condition (16), the refracting power of the cemented doublet or the negative lens becomes too strong and off-axis aberration is liable to be produced in the main.

It is further desirable that the zoom lens, instead of satisfying Condition (16), is designed to satisfy one of the following conditions:

$$0.5 < P_{G4C}/P_{G4L} < 1.5 \tag{16'}$$

$$0.7 < P_{G4C}/P_{G4L} < 1.2 \tag{16''}$$

Also, the upper limit value or lower limit value of Condition (16)' may be set as the upper limit values or lower limit values of Conditions (16) and (16)", and the upper limit value or lower limit value of Condition (16)" may also be set as the upper limit values or lower limit values of Conditions (16) and (16)'

In the zoom lens of the present invention, it is desirable that when the zoom lens comprises the five lens units mentioned above, it satisfies at least one of the following conditions:

$$-5.0 < P_{G2}/P_{G4} < -0.3 \tag{17}$$

$$0.1 < P_{G3}/P_{G4} < 4 \tag{18}$$

where $P_{G2}$ is the refractive index of the second lens unit, $P_{G3}$ is the refractive index of the third lens unit, and $P_{G4}$ is the refractive index of the fourth lens unit.

Condition (17) refers to the condition determining the refractive indices of the second lens unit and the fourth lens unit that are variators. When these refractive indices are within the limit of Condition (17), a variable magnification function can be favorably shared between the second lens unit and the fourth lens unit. Beyond the upper limit value or below the lower limit value of Condition (17), the variable magnification function shared by one lens unit becomes too pronounced, with the result that a power balance is lost and on- and off-axis aberrations are liable to occur.

Condition (18) refers to the condition for determining the refractive indices of the third lens unit and the fourth lens unit so that when a ray of light making a large angle with the optical axis of the zoom lens is incident on the zoom lens, the ray of light is smoothly refracted by the third lens unit and the fourth lens unit, each having the positive refracting power, and is rendered incident on the fifth lens unit of the imaging lens. When these refractive indices are within the limit of Condition (18), the production of off-axis aberrations including coma is suppressed and good image quality can be obtained. Beyond the upper limit value of Condition (18), the refractive index of the third lens unit becomes too high and thus off-axis aberration is liable to occur in the main. On the other hand, below the lower limit value of Condition (18), the refractive index of the third lens unit becomes too low and thus the ray of light cannot be smoothly refracted. Consequently, coma becomes liable to be produced and the diameter of the fourth lens unit is liable to bulk.

It is more desirable that the zoom lens, instead of satisfying Condition (17), is designed to satisfy one of the following conditions:

$$-3.0 < P_{G2}/P_{G4} < -1.0 \tag{17}'$$

$$-2.0 < P_{G2}/P_{G4} < -1.5 \tag{17}''$$

Also, the upper limit value or lower limit value of Condition (17)' may be set as the upper limit values or lower limit values of Conditions (17) and (17)", and the upper limit value or lower limit value of Condition (17)" may also be set as the upper limit values or lower limit values of Conditions (17) and (17)'.

It is further desirable that the zoom lens, instead of satisfying Condition (18), is designed to satisfy one of the following conditions:

$$0.2 < P_{G3}/P_{G4} < 1.5 \tag{18}'$$

$$0.3 < P_{G3}/P_{G4} < 0.6 \tag{18}''$$

Also, the upper limit value or lower limit value of Condition (18)' may be set as the upper limit values or lower limit values of Conditions (18) and (18)", and the upper limit value or lower limit value of Condition (18)" may also be set as the upper limit values or lower limit values of Conditions (18) and (18)'.

In the zoom lens of the present invention, it is desirable that when the zoom lens comprises the five lens units mentioned above, the fifth lens unit is constructed with a single positive lens and satisfies the following condition:

$$0.5 < f_{G5}/f_t < 2.0 \tag{19}$$

where $f_{G5}$ is the focal length of the positive lens constituting the fifth lens unit and $f_t$ is the focal length of the zoom lens at the telephoto position.

As mentioned above, when the fifth lens unit is constructed with a single positive lens, a low-cost zoom lens can be designed. Condition (19) refers to the condition for favorably correcting curvature of field while ensuring the telecentric characteristic. Beyond the upper limit value of Condition (19), a sufficient telecentric characteristic cannot be ensured. On the other hand, below the lower limit value of Condition (19), correction for curvature of field becomes particularly difficult at the wide-angle position.

It is further desirable that the zoom lens, instead of satisfying Condition (19), is designed to satisfy one of the following conditions:

$$0.7 < f_{G5}/f_t < 1.5 \tag{19}'$$

$$0.9 < f_{G5}/f_t < 1.3 \tag{19}''$$

Also, the upper limit value or lower limit value of Condition (19)' may be set as the upper limit values or lower limit values of Conditions (19) and (19)", and the upper limit value or lower limit value of Condition (19)" may also be set as the upper limit values or lower limit values of Conditions (19) and (19)'.

The image pickup apparatus of the present invention comprises the zoom lens, an image sensor converting an image formed by the zoom lens into an electric signal, and a circuit electrically correcting distortion and/or chromatic aberration of magnification. In this way, when distortion of the zoom lens can be allowed, a reduction of the number of lenses and the compact design of the zoom lens is facilitated. Further, chromatic aberration of magnification is electrically corrected and thereby a color blurring of a photographic image is lessened and the improvement of the resolution power can be attained.

In accordance with the drawings, Embodiments 1-4 of the present invention will be explained below.

In the drawings, numerals indicated as subscripts relative to $r_1, r_2, \ldots$ and $d_1, d_2, \ldots$ in the sectional views of the optical systems correspond to face numbers 1, 2, . . . in numerical data. In the diagrams of aberration characteristics, $\Delta M$ indicates astigmatism on the meridional plane and $\Delta S$ indicates astigmatism on the sagittal plane. Also, the meridional plane refers to a plane including the optical axis and the chief ray of the optical system (a plane parallel to the plane of the page) and the sagittal plane refers to a plane perpendicular to the plane including the optical axis and the chief ray of the optical system (a plane perpendicular to the plane of the page).

In the numerical data of lenses in individual embodiments described below, R denotes the radius of curvature of each surface, D denotes face-to-face spacing, Nd denotes a refractive index at the d line, ν d denotes an Abbe's number at the d line, K denotes a conic constant, and $A_4$, $A_6$, $A_8$, and $A_{10}$ denote aspherical coefficients. The configuration of the aspherical surface uses the aspherical coefficients in the embodiments and is expressed by the following equation:

$$Z=(Y^2/r)/[1+\{1-(1+K)\cdot(Y/r)^2\}^{1/2}]+A_4 Y^4+A_6 Y^6+A_8 Y^8+A_{10} Y^{10}+\ldots$$

where Z is taken as the coordinates in the direction of the optical axis and Y is taken as the coordinates in a direction perpendicular to the optical axis.

Embodiment 1

Figure 1B:
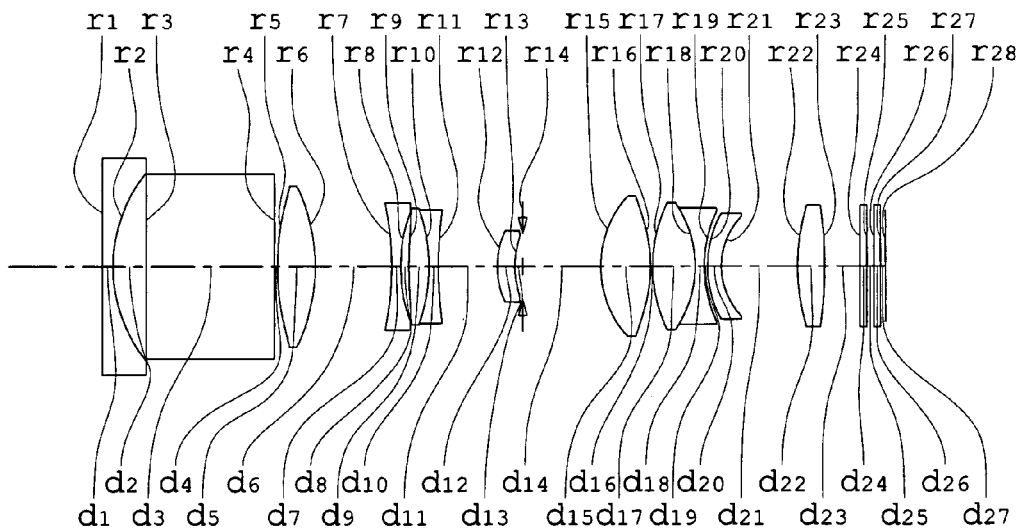
Figure 1C:
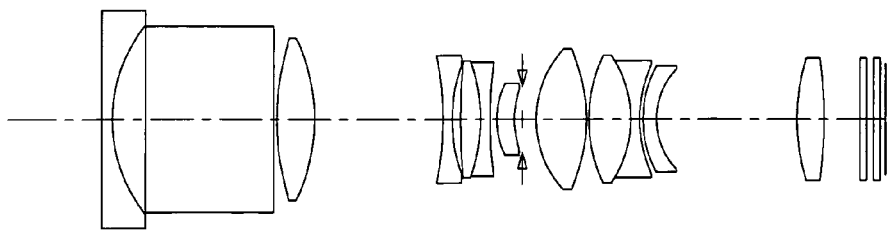

FIGS. 1A, 1B, and 1C are sectional views showing optical arrangements, developed along the optical axis, at wide-angle, middle, and telephoto positions, respectively, in infinite object point focusing of the zoom lens according to Embodiment 1 of the present invention. FIGS. 2A-2D, 2E-2H, and 2I-2L are diagrams showing aberration characteristics at wide-angle, middle, and telephoto positions, respectively, in infinite object point focusing of the zoom lens shown in FIGS. 1A-1C.

First, in accordance with FIGS. 1A-1C, the optical arrangement of the zoom lens of this embodiment will be explained. The zoom lens of the embodiment comprises, in order from the object side along an optical axis Lc, a first lens unit $G_1$ with positive refracting power, a second lens unit $G_2$ with negative refracting power, a third lens unit $G_3$ with positive refracting power, a fourth lens unit $G_4$ with positive refracting power, and a fifth lens unit $G_5$ with positive refracting power. Between the third lens unit $G_3$ and the fourth lens unit $G_4$, an aperture stop S constructed integrally with the third lens unit $G_3$ is interposed. Also, on the image side of the fifth lens unit $G_5$, a low-pass filter LF, a CCD cover glass CG, and a CCD having an image pickup surface IM are arranged in this order from the object side.

The first lens unit $G_1$ includes, in order from the object side, a first lens $L_{11}$ which is a plano-concave lens with a concave surface facing the image side and has a negative refracting power, a prism P which is a reflecting member changing the optical path, and a second lens $L_{12}$ which is a biconvex lens whose both surfaces are aspherical and has a positive refracting power. The second lens unit $G_2$ includes, in order from the object side, a first lens $L_{21}$ which is a biconcave lens whose both surfaces are aspherical and has a negative refracting power and a cemented doublet of a second lens $L_{22}$ which is a biconvex lens and has a positive refracting power and a third lens $L_{23}$ which is a biconcave lens and has a negative refracting power. The third lens unit $G_3$ includes only a lens $L_3$ which is a meniscus lens whose both surfaces are aspherical, with a convex surface facing the object side, and which has a positive refracting power. The fourth lens unit $G_4$ includes a fourth lens $L_{41}$ which is a biconvex lens whose both surfaces are aspherical and has a positive refracting power, a cemented doublet of a second lens $L_{42}$ which is a biconvex lens and has a positive refracting power and a third lens $L_{43}$ which is a biconcave lens and has a negative refracting power, and a lens $L_{44}$ which is a negative meniscus lens with a convex surface facing the object side and has a negative refracting power. The fifth lens unit $G_5$ includes only a lens $L_5$ which is a biconvex lens and has a positive refracting power.

When the magnification is changed in the range from the wide-angle position to the telephoto position, the first lens unit $G_1$ is not moved along the optical axis Lc. The second lens unit $G_2$ is moved toward the image side along the optical axis Lc while widening spacing between the first lens unit $G_1$ and the second lens unit $G_2$. The third lens unit $G_3$ is not moved along the optical axis Lc. The fourth lens unit $G_4$ is moved toward the object side along the optical axis Lc while narrowing spacing between the third lens unit $G_3$ and the fourth lens unit $G_4$. The fifth lens unit $G_5$ is moved along the optical axis Lc in such a way as to widen spacing between the fourth lens unit $G_4$ and the fifth lens unit $G_5$. The aperture stop S is constructed integrally with the third lens unit $G_3$ and thus is not moved along the optical axis Lc.

Subsequently, structures and numerical data of lenses constituting the optical system in the embodiment are shown below. Also, the unit is millimeters.

| Surface data | | | | |
|---|---|---|---|---|
| Face number | Radius of curvature R | Face spacing D | Refractive index Nd | Abbe's number vd |
| 1 | ∞ | 0.80 | 2.00069 | 25.46 |
| 2 | 11.660 | 2.44 | | |
| 3 | ∞ | 9.50 | 1.90366 | 31.32 |
| 4 | ∞ | 0.20 | | |
| 5 (Aspherical surface) | 18.301 | 2.80 | 1.69680 | 55.53 |
| 6 (Aspherical surface) | −14.085 | D6 | | |
| 7 (Aspherical surface) | −22.642 | 0.69 | 1.83481 | 42.71 |
| 8 (Aspherical surface) | 11.828 | 0.60 | | |
| 9 | 49.521 | 1.50 | 1.92286 | 20.88 |
| 10 | −13.275 | 0.70 | 1.88300 | 40.76 |
| 11 | 32.321 | D11 | | |
| 12 (Aspherical surface) | 6.198 | 1.30 | 1.59551 | 39.24 |
| 13 (Aspherical surface) | 8.509 | 0.63 | | |
| 14 (Aperture stop) | ∞ | D14 | | |
| 15 (Aspherical surface) | 7.908 | 3.72 | 1.49700 | 81.54 |
| 16 (Aspherical surface) | −11.085 | 0.15 | | |
| 17 | 11.369 | 3.13 | 1.73310 | 48.90 |
| 18 | −8.693 | 0.64 | 2.00330 | 28.27 |
| 19 | 10.028 | 0.25 | | |
| 20 | 8.540 | 1.00 | 1.88300 | 40.76 |
| 21 | 5.549 | D21 | | |
| 22 | 16.240 | 2.00 | 1.49700 | 81.54 |
| 23 | −33.478 | D23 | | |
| 24 | ∞ | 0.50 | 1.54771 | 62.84 |
| 25 | ∞ | 0.50 | | |
| 26 | ∞ | 0.50 | 1.51633 | 64.14 |

-continued

| | | |
|---|---|---|
| 27 | ∞ | 0.37 |
| 28 (Image pickup surface) | ∞ | |

Aspherical data

| Face number | Radius of curvature R | Conic constant K | Aspherical coefficients | | | |
|---|---|---|---|---|---|---|
| | | | $A_4$ | $A_6$ | $A_8$ | $A_{10}$ |
| 5 | 18.301 | 0.000 | −4.32705e−05 | 3.09401e−07 | 1.39712e−08 | −5.83387e−10 |
| 6 | −14.085 | 0.000 | 7.01469e−05 | 5.94163e−07 | 3.27425e−09 | −4.20720e−10 |
| 7 | −22.642 | 0.000 | 1.98949e−04 | −1.29622e−05 | 3.37629e−07 | −5.49064e−09 |
| 8 | 11.828 | 0.000 | 7.00870e−07 | −1.17920e−05 | 1.80878e−08 | |
| 12 | 6.198 | 0.000 | −4.11309e−04 | 7.30206e−07 | −1.06678e−06 | |
| 13 | 8.509 | 0.000 | | | | |
| 15 | 7.908 | 0.000 | −2.63999e−04 | 2.47782e−06 | 4.95618e−10 | 5.51528e−10 |
| 16 | −11.085 | 0.000 | 3.34905e−04 | 1.42676e−06 | 1.32701e−07 | −1.85055e−09 |

Various data
Zoom ratio 4.66

| | Wide-angle | Middle | Telephoto |
|---|---|---|---|
| Focal length | 4.39 | 9.38 | 20.45 |
| F number | 3.51 | 4.62 | 6.00 |
| Angle of view | 96.91 | 46.35 | 22.32 |
| Image height | 4.20 | 4.20 | 4.20 |
| Overall lens length | 57.65 | 57.65 | 57.65 |
| Back focus | 4.60 | 4.13 | 4.14 |
| D6 | 0.60 | 5.70 | 9.58 |
| D11 | 9.48 | 4.38 | 0.50 |
| D14 | 9.53 | 5.78 | 1.05 |
| D21 | 1.40 | 5.62 | 10.33 |
| D23 | 3.08 | 2.61 | 2.62 |

Zoom lens unit data

| Unit | Top face number | Focal length |
|---|---|---|
| 1 | 1 | 16.412 |
| 2 | 7 | −8.5404 |
| 3 | 12 | 31.6772 |
| 4 | 15 | 14.1317 |
| 5 | 22 | 22.3004 |

Height of an incident ray that an angle made by the optical axis is a preset angle and data according to the aspherical amount of the most object-side aspherical surface on which the ray is incident

| Angle | Height of incident ray (The most object-side surface) | Height of incident ray (The most object-side aspherical surface) | Aspherical amount |
|---|---|---|---|
| 38° | 5.663 | 3.82 | −0.00801 |
| 39° | 5.82 | 3.93 | −0.0089 |
| 40° | 5.979 | 4.04 | −0.00987 |
| 41° | 6.14 | 4.16 | −0.01101 |
| 42° | 6.303 | 4.28 | −0.01225 |
| 43° | 6.468 | 4.40 | −0.0136 |
| 44° | 6.636 | 4.53 | −0.01519 |
| 45° | 6.808 | 4.66 | −0.01695 |
| 46° | 6.986 | 4.80 | −0.01904 |
| 47° | 7.17 | 4.95 | −0.02154 |
| 48° | 7.364 | 5.12 | −0.02479 |
| 49° | 7.577 | 5.31 | −0.02903 |

Data according to Conditions

| | | |
|---|---|---|
| Condition (1) | $0.0001 < |Y_{49}|/ih_w < 0.1$: | 0.0069 |
| Condition (2) | $0.0001 < |Y_{47}|/ih_w < 0.1$: | 0.0051 |
| Condition (3) | $0.0001 < |Y_{45}|/ih_w < 0.1$: | 0.0040 |
| Condition (4) | $0.0001 < |Y_{43}|/ih_w < 0.1$: | 0.0032 |
| Condition (5) | $0.0001 < |Y_{41}|/ih_w < 0.1$: | 0.0026 |
| Condition (6) | $0.0001 < |Y_{40}|/ih_w < 0.1$: | 0.0024 |
| Condition (7) | $0.0001 < |Y_{39}|/ih_w < 0.1$: | 0.0021 |
| Condition (8) | $0.0001 < |Y_{38}|/ih_w < 0.1$: | 0.0019 |
| Condition (9) | $1 < D_p/ih_w < 5$: | 2.26 |
| Condition (10) | $3.5 < f_t/f_w < 7.0$: | 4.66 |
| Condition (11) | $0.5 < (r_{GIF\_O} + r_{GIF\_I})/(r_{GIF\_O} - r_{GIF\_I}) < 1.5$: | 1.00 |
| Condition (12) | $1.95 < n_{dGIF} < 2.1$: | 2.00069 |
| Condition (13) | $18 < v_{dGIF} < 30$: | 25.4579 |
| Condition (14) | $1.5 < P_w/ih_w < 2.3$: | 2.00 |
| Condition (15) | $1 < (r_{G4L\_O} + r_{G4L\_I})/(r_{G4L\_O} - r_{G4L\_I}) < 8$: | 4.71 |
| Condition (16) | $0.3 < P_{G4C}/P_{G4L} < 2$: | 0.94 |
| Condition (17) | $-5.0 < P_{G2}/P_{G4} < -0.3$: | −1.65 |
| Condition (18) | $0.1 < P_{G3}/P_{G4} < 4$: | 0.45 |
| Condition (19) | $0.5 < f_{GS}/f_t < 2.0$: | 1.09 |

Subsequently, a description will be given of the case where the image pickup apparatus provided with the zoom lens of this embodiment has a circuit for electrically correcting distortion.

In the zoom lens with which the image pickup apparatus is provided, barrel distortion is produced on the photoelectric conversion surface of the CCD at the wide-angle position. On the other hand, at the middle and telephoto positions, such distortion is not virtually produced. Thus, the image pickup apparatus provided with the zoom lens of the embodiment is constructed so that an effective image pickup region is shaped into a barrel form at the wide-angle position and into a rectangle at the middle and telephoto positions in order to correct distortion. Image data of barrel distortion obtained at the wide-angle position are converted into rectangular image information in which distortion is reduced, by electrical image processing, to make the record and the display.

Also, for the image height, the image height at the wide-angle position is such as to become smaller than the image height at the middle or telephoto position. At the wide-angle position, the length of the minor side of the photoelectric conversion surface is set to be the same as that of the minor side of the effective image pickup region, and the effective image pickup region is determined so that distortion after image processing remains by about −3%. A smaller barrel effective image pickup region may, of course, be made so that an image converted into the rectangle is recorded as a reconstructed image.

Next, numerical data in the case where distortion is electrically corrected in this embodiment are shown below. Also, data not described below have values identical with data in the case where distortion is not electrically corrected. The unit is millimeters.

Various data where distortion is electrically corrected

| Zoom ratio 4.66 | | | |
|---|---|---|---|
| | Wide-angle | Middle | Telephoto |
| Focal length | 4.39 | 9.38 | 20.45 |
| F number | 3.51 | 4.62 | 6.00 |
| Angle of view | 93.06 | 46.35 | 22.32 |
| Image height | 3.95 | 4.20 | 4.20 |

Height of an incident ray that an angle made by the optical axis where distortion is electrically corrected is a preset angle and data according to the aspherical amount of the most object-side aspherical surface on which the ray is incident

| Angle | Height of incident ray (The most object-side surface) | Height of incident ray (The most object-side aspherical surface) | Aspherical amount |
|---|---|---|---|
| 38° | 5.663 | 3.82 | −0.00801 |
| 39° | 5.82 | 3.93 | −0.0089 |
| 40° | 5.979 | 4.04 | −0.00987 |
| 41° | 6.14 | 4.16 | −0.01101 |
| 42° | 6.303 | 4.28 | −0.01225 |
| 43° | 6.468 | 4.40 | −0.0136 |
| 44° | 6.636 | 4.53 | −0.01519 |
| 45° | 6.808 | 4.66 | −0.01695 |
| 46° | 6.986 | 4.80 | −0.01904 |

Data according to Conditions where distortion is electrically corrected

| Condition (1) | $0.0001 < |Y_{49}|/ih_w < 0.1$: | — |
|---|---|---|
| Condition (2) | $0.0001 < |Y_{47}|/ih_w < 0.1$: | — |
| Condition (3) | $0.0001 < |Y_{45}|/ih_w < 0.1$: | 0.0043 |
| Condition (4) | $0.0001 < |Y_{43}|/ih_w < 0.1$: | 0.0034 |
| Condition (5) | $0.0001 < |Y_{41}|/ih_w < 0.1$: | 0.0028 |
| Condition (6) | $0.0001 < |Y_{40}|/ih_w < 0.1$: | 0.0025 |
| Condition (7) | $0.0001 < |Y_{39}|/ih_w < 0.1$: | 0.0023 |
| Condition (8) | $0.0001 < |Y_{38}|/ih_w < 0.1$: | 0.0020 |
| Condition (9) | $1 < D_p/ih_w < 5$: | 2.40 |
| Condition (10) | $3.5 < f_t/f_w < 7.0$: | 4.66 |
| Condition (11) | $0.5 < (r_{GIF\_O} + r_{GIF\_I})/(r_{GIF\_O} - r_{GIF\_I}) < 1.5$: | 1.00 |
| Condition (12) | $1.95 < n_{dGIF} < 2.1$: | 2.00069 |
| Condition (13) | $18 < v_{dGIF} < 30$: | 25.4579 |
| Condition (14) | $1.5 < P_w/ih_w < 2.3$: | 2.13 |
| Condition (15) | $1 < (r_{G4L\_O} + r_{G4L\_I})/(r_{G4L\_O} - r_{G4L\_I}) < 8$: | 4.71 |
| Condition (16) | $0.3 < P_{G4C}/P_{G4L} < 2$: | 0.94 |
| Condition (17) | $-5.0 < P_{G2}/P_{G4} < -0.3$: | −1.65 |
| Condition (18) | $0.1 < P_{G3}/P_{G4} < 4$: | 0.45 |
| Condition (19) | $0.5 < f_{GS}/f_t < 2.0$: | 1.09 |

Embodiment 2

Figure 3A:
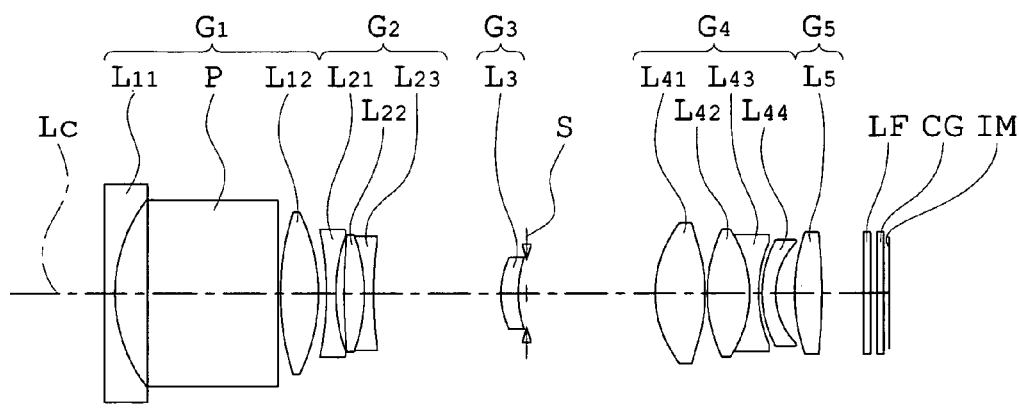
FIGS. 3A, 3B, and 3C are sectional views showing optical arrangements, developed along the optical axis, at wide-angle, middle, and telephoto positions, respectively, in infinite object point focusing of the zoom lens according to Embodiment 2 of the present invention.
Figure 3B:
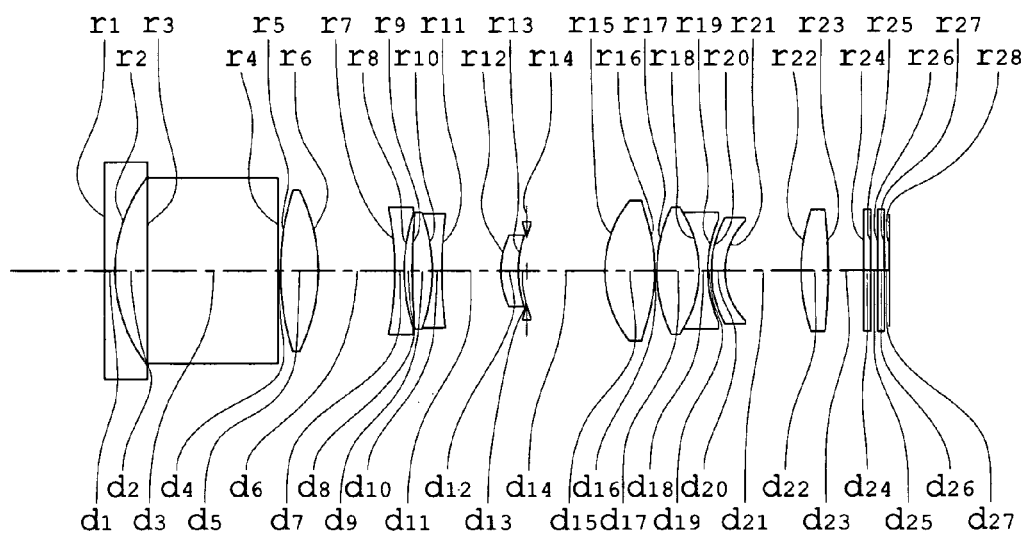
Figure 3C:
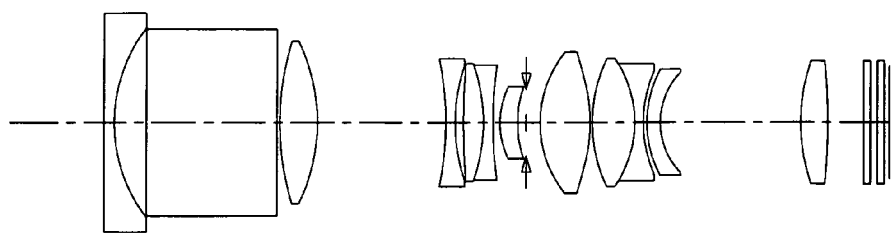

FIGS. 3A, 3B, and 3C are sectional views showing optical arrangements, developed along the optical axis, at wide-angle, middle, and telephoto positions, respectively, in infinite object point focusing of the zoom lens according to Embodiment 2 of the present invention. FIGS. 4A-4D, 4E-4H, and 4I-4L are diagrams showing aberration characteristics at wide-angle, middle, and telephoto positions, respectively, in infinite object point focusing of the zoom lens shown in FIGS. 3A-3C.

First, in accordance with FIGS. 3A-3C, the optical arrangement of the zoom lens of this embodiment will be explained. The zoom lens of the embodiment comprises, in order from the object side along the optical axis Lc, the first lens unit $G_1$ with positive refracting power, the second lens unit $G_2$ with negative refracting power, the third lens unit $G_3$ with positive refracting power, the fourth lens unit $G_4$ with positive refracting power, and the fifth lens unit $G_5$ with positive refracting power. Between the third lens unit $G_3$ and the fourth lens unit $G_4$, the aperture stop S constructed integrally with the third lens unit $G_3$ is interposed. Also, on the image side of the fifth lens unit $G_5$, the low-pass filter LF, the CCD cover glass CG, and the CCD having the image pickup surface IM are arranged in this order from the object side.

The first lens unit $G_1$ includes, in order from the object side, the first lens $L_{11}$ which is a plano-concave lens whose image-side surface is aspherical, with a concave surface facing the image side, and has a negative refracting power, the prism P which is a reflecting member changing the optical path, and the second lens $L_{12}$ which is a biconvex lens whose both surfaces are aspherical and has a positive refracting power. The second lens unit $G_2$ includes, in order from the object side, the first lens $L_{21}$ which is a biconcave lens whose both surfaces are aspherical and has a negative refracting power and a cemented doublet of the second lens $L_{22}$ which is a biconvex lens and has a positive refracting power and the third lens $L_{23}$ which is a biconcave lens and has a negative refracting power. The third lens unit $G_3$ includes only the lens $L_3$ which is a meniscus lens whose object-side surface is aspherical, with a convex surface facing the object side, and which has a positive refracting power. The fourth lens unit $G_4$ includes the fourth lens $L_{41}$ which is a biconvex lens whose both surfaces are aspherical and has a positive refracting power, a cemented doublet of the second lens $L_{42}$ which is a biconvex lens and has a positive refracting power and the third lens $L_{43}$ which is a biconcave lens and has a negative refracting power, and the lens $L_{44}$ which is a negative meniscus lens with a convex surface facing the object side and has a negative refracting power. The fifth lens unit $G_5$ includes only the lens $L_5$ which is a biconvex lens and has a positive refracting power.

When the magnification is changed in the range from the wide-angle position to the telephoto position, the first lens unit $G_1$ is not moved along the optical axis Lc. The second lens unit $G_2$ is moved toward the image side along the optical axis Lc while widening spacing between the first lens unit $G_1$ and the second lens unit $G_2$. The third lens unit $G_3$ is not moved along the optical axis. The fourth lens unit $G_4$ is moved toward the object side along the optical axis Lc while narrowing spacing between the third lens unit $G_3$ and the fourth lens unit $G_4$. The fifth lens unit $G_5$ is moved along the optical axis Lc in such a way as to widen spacing between the fourth lens unit $G_4$ and the fifth lens unit $G_5$. The aperture stop S is constructed integrally with the third lens unit $G_3$ and thus is not moved along the optical axis Lc.

Subsequently, structures and numerical data of lenses constituting the optical system in the embodiment are shown below. Also, the unit is millimeters.

Surface data

| Face number | Radius of curvature R | Face spacing D | Refractive index Nd | Abbe's number vd |
|---|---|---|---|---|
| 1 | ∞ | 0.80 | 2.00069 | 25.46 |
| 2 (Aspherical surface) | 11.667 | 2.43 | | |
| 3 | ∞ | 9.50 | 1.90366 | 31.32 |
| 4 | ∞ | 0.20 | | |
| 5 (Aspherical surface) | 18.349 | 2.80 | 1.69680 | 55.53 |
| 6 (Aspherical surface) | −14.047 | D6 | | |
| 7 (Aspherical surface) | −22.376 | 0.69 | 1.83481 | 42.71 |
| 8 (Aspherical surface) | 11.963 | 0.61 | | |
| 9 | 51.817 | 1.50 | 1.92286 | 20.88 |
| 10 | −13.139 | 0.70 | 1.88300 | 40.76 |
| 11 | 32.814 | D11 | | |
| 12 (Aspherical surface) | 6.185 | 1.30 | 1.59551 | 39.24 |
| 13 | 8.487 | 0.63 | | |
| 14 (Aperture stop) | ∞ | D14 | | |
| 15 (Aspherical surface) | 7.910 | 3.72 | 1.49700 | 81.54 |
| 16 (Aspherical surface) | −11.067 | 0.15 | | |
| 17 | 11.389 | 3.13 | 1.73310 | 48.90 |
| 18 | −8.693 | 0.64 | 2.00330 | 28.27 |
| 19 | 9.916 | 0.26 | | |
| 20 | 8.487 | 1.00 | 1.88300 | 40.76 |
| 21 | 5.562 | D21 | | |
| 22 | 14.592 | 2.00 | 1.49700 | 81.54 |
| 23 | −44.852 | D23 | | |
| 24 | ∞ | 0.50 | 1.54771 | 62.84 |
| 25 | ∞ | 0.50 | | |
| 26 | ∞ | 0.50 | 1.51633 | 64.14 |
| 27 | ∞ | 0.37 | | |
| 28 (Image pickup surface) | ∞ | | | |

Aspherical data

| Face number | Radius of curvature R | Conic constant K | Aspherical coefficients $A_4$ | $A_6$ | $A_8$ | $A_{10}$ |
|---|---|---|---|---|---|---|
| 2 | 11.667 | 0.000 | −1.35663e−06 | −6.97256e−08 | 9.54631e−11 | 4.89612e−11 |
| 5 | 18.349 | 0.000 | −4.37303e−05 | 2.87624e−07 | 1.39395e−08 | −5.69822e−10 |
| 6 | −14.047 | 0.000 | 6.99025e−05 | 5.87979e−07 | 3.15256e−09 | −4.11133e−10 |
| 7 | −22.376 | 0.000 | 1.99922e−04 | −1.27467e−05 | 3.49972e−07 | −5.51008e−09 |
| 8 | 11.963 | 0.000 | 3.29930e−05 | −1.14691e−05 | 4.19033e−08 | |
| 12 | 6.185 | 0.000 | −4.13885e−04 | 4.31915e−07 | −1.05254e−06 | |
| 15 | 7.910 | 0.000 | −2.63361e−04 | 2.53459e−06 | −2.14272e−09 | 3.86179e−10 |
| 16 | −11.067 | 0.000 | 3.35906e−04 | 1.42317e−06 | 1.30693e−07 | −2.03754e−09 |

Various data
Zoom ratio 4.66

| | Wide-angle | Middle | Telephoto |
|---|---|---|---|
| Focal length | 4.39 | 9.38 | 20.45 |
| F number | 3.51 | 4.62 | 6.00 |
| Angle of view | 97.17 | 46.26 | 22.31 |
| Image height | 4.20 | 4.20 | 4.20 |
| Overall lens length | 57.65 | 57.65 | 57.65 |
| Back focus | 4.56 | 4.12 | 4.13 |
| D6 | 0.60 | 5.71 | 9.58 |
| D11 | 9.48 | 4.37 | 0.50 |

-continued

| | | | |
|---|---|---|---|
| D14 | 9.55 | 5.80 | 1.05 |
| D21 | 1.41 | 5.61 | 10.35 |
| D23 | 3.04 | 2.60 | 2.60 |

Zoom lens unit data

| Unit | Top face number | Focal length |
|---|---|---|
| 1 | 1 | 16.4204 |
| 2 | 7 | −8.538 |
| 3 | 12 | 31.6307 |
| 4 | 15 | 14.1653 |
| 5 | 22 | 22.4033 |

Height of an incident ray that an angle made by the optical axis is a preset angle and data according to the aspherical amount of the most object-side aspherical surface on which the ray is incident

| Angle | Height of incident ray (The most object-side surface) | Height of incident ray (The most object-side aspherical surface) | Aspherical amount |
|---|---|---|---|
| 38° | 5.67 | 5.04 | −0.00146 |
| 39° | 5.827 | 5.16 | −0.00157 |
| 40° | 5.986 | 5.29 | −0.00169 |
| 41° | 6.147 | 5.41 | −0.00179 |
| 42° | 6.309 | 5.53 | −0.00187 |
| 43° | 6.473 | 5.65 | −0.00193 |
| 44° | 6.639 | 5.78 | −0.00196 |
| 45° | 6.809 | 5.90 | −0.00194 |
| 46° | 6.983 | 6.03 | −0.00187 |
| 47° | 7.163 | 6.16 | −0.00171 |
| 48° | 7.351 | 6.29 | −0.00146 |
| 49° | 7.554 | 6.44 | −0.00102 |

Data according to Conditions

| | | |
|---|---|---|
| Condition (1) | $0.0001 < |Y_{49}|/ih_w < 0.1$ | 0.0024 |
| Condition (2) | $0.0001 < |Y_{47}|/ih_w < 0.1$ | 0.0041 |
| Condition (3) | $0.0001 < |Y_{45}|/ih_w < 0.1$ | 0.0046 |
| Condition (4) | $0.0001 < |Y_{43}|/ih_w < 0.1$ | 0.0046 |
| Condition (5) | $0.0001 < |Y_{41}|/ih_w < 0.1$ | 0.0043 |
| Condition (6) | $0.0001 < |Y_{40}|/ih_w < 0.1$ | 0.0040 |
| Condition (7) | $0.0001 < |Y_{39}|/ih_w < 0.1$ | 0.0037 |
| Condition (8) | $0.0001 < |Y_{38}|/ih_w < 0.1$ | 0.0035 |
| Condition (9) | $1 < D_p/ih_w < 5$ | 2.26 |
| Condition (10) | $3.5 < f_t/f_w < 7.0$ | 4.66 |
| Condition (11) | $0.5 < (r_{GIF\_O} + r_{GIF\_I})/(r_{GIF\_O} - r_{GIF\_I}) < 1.5$ | 1.00 |
| Condition (12) | $1.95 < n_{dGIF} < 2.1$ | 2.00069 |
| Condition (13) | $18 < v_{dGIF} < 30$ | 25.4579 |
| Condition (14) | $1.5 < P_w/ih_w < 2.3$ | 2.00 |
| Condition (15) | $1 < (r_{G4L\_O} + r_{G4L\_I})/(r_{G4L\_O} - r_{G4L\_I}) < 8$ | 4.80 |
| Condition (16) | $0.3 < P_{G4C}/P_{G4L} < 2$ | 0.89 |
| Condition (17) | $-5.0 < P_{G2}/P_{G4} < -0.3$ | −1.66 |
| Condition (18) | $0.1 < P_{G3}/P_{G4} < 4$ | 0.45 |
| Condition (19) | $0.5 < f_{G5}/f_t < 2.0$ | 1.10 |

Next, numerical data in the case where distortion is electrically corrected in this embodiment are shown below. Also, data not described below have values identical with data in the case where distortion is not electrically corrected. The unit is millimeters.

Various data where distortion is electrically corrected

Zoom ratio 4.66

| | Wide-angle | Middle | Telephoto |
|---|---|---|---|
| Focal length | 4.39 | 9.38 | 20.45 |
| F number | 3.51 | 4.62 | 6.00 |
| Angle of view | 93.08 | 46.26 | 22.31 |
| Image height | 3.94 | 4.20 | 4.20 |

Height of an incident ray that an angle made by the optical axis where distortion is electrically corrected is a preset angle and data according to the aspherical amount of the most object-side aspherical surface on which the ray is incident

| Angle | Height of incident ray (The most object-side surface) | Height of incident ray (The most object-side aspherical surface) | Aspherical amount |
|---|---|---|---|
| 38° | 5.67 | 5.04 | −0.00146 |
| 39° | 5.827 | 5.16 | −0.00157 |
| 40° | 5.986 | 5.29 | −0.00169 |
| 41° | 6.147 | 5.41 | −0.00179 |
| 42° | 6.309 | 5.53 | −0.00187 |
| 43° | 6.473 | 5.65 | −0.00193 |
| 44° | 6.639 | 5.78 | −0.00196 |
| 45° | 6.809 | 5.90 | −0.00194 |
| 46° | 6.983 | 6.03 | −0.00187 |

Data according to Conditions where distortion is electrically corrected

| | | |
|---|---|---|
| Condition (1) | $0.0001 < |Y_{49}|/ih_w < 0.1$ | — |
| Condition (2) | $0.0001 < |Y_{47}|/ih_w < 0.1$ | — |
| Condition (3) | $0.0001 < |Y_{45}|/ih_w < 0.1$ | 0.0043 |
| Condition (4) | $0.0001 < |Y_{43}|/ih_w < 0.1$ | 0.0049 |
| Condition (5) | $0.0001 < |Y_{41}|/ih_w < 0.1$ | 0.0045 |
| Condition (6) | $0.0001 < |Y_{40}|/ih_w < 0.1$ | 0.0043 |
| Condition (7) | $0.0001 < |Y_{39}|/ih_w < 0.1$ | 0.0040 |
| Condition (8) | $0.0001 < |Y_{38}|/ih_w < 0.1$ | 0.0037 |
| Condition (9) | $1 < D_p/ih_w < 5$ | 2.41 |
| Condition (10) | $3.5 < f_t/f_w < 7.0$ | 4.66 |
| Condition (11) | $0.5 < (r_{GIF\_O} + r_{GIF\_I})/(r_{GIF\_O} - r_{GIF\_I}) < 1.5$ | 1.00 |
| Condition (12) | $1.95 < n_{dGIF} < 2.1$ | 2.00069 |
| Condition (13) | $18 < v_{dGIF} < 30$ | 25.4579 |
| Condition (14) | $1.5 < P_w/ih_w < 2.3$ | 2.13 |

-continued

| | | |
|---|---|---|
| Condition (15) | $1 < (r_{G4L\_O} + r_{G4L\_I})/(r_{G4L\_O} - r_{G4L\_I}) < 8$ | 4.80 |
| Condition (16) | $0.3 < P_{G4C}/P_{G4L} < 2$ | 0.89 |
| Condition (17) | $-5.0 < P_{G2}/P_{G4} < -0.3$ | -1.66 |
| Condition (18) | $0.1 < P_{G3}/P_{G4} < 4$ | 0.45 |
| Condition (19) | $0.5 < f_{G5}/f_t < 2.0$ | 1.10 |

Embodiment 3

Figure 5A:
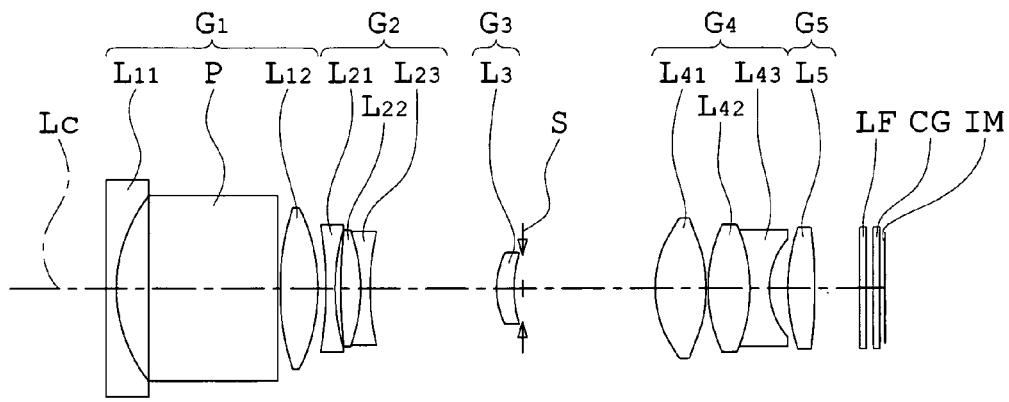
FIGS. 5A, 5B, and 5C are sectional views showing optical arrangements, developed along the optical axis, at wide-angle, middle, and telephoto positions, respectively, in infinite object point focusing of the zoom lens according to Embodiment 3 of the present invention.
Figure 5B:
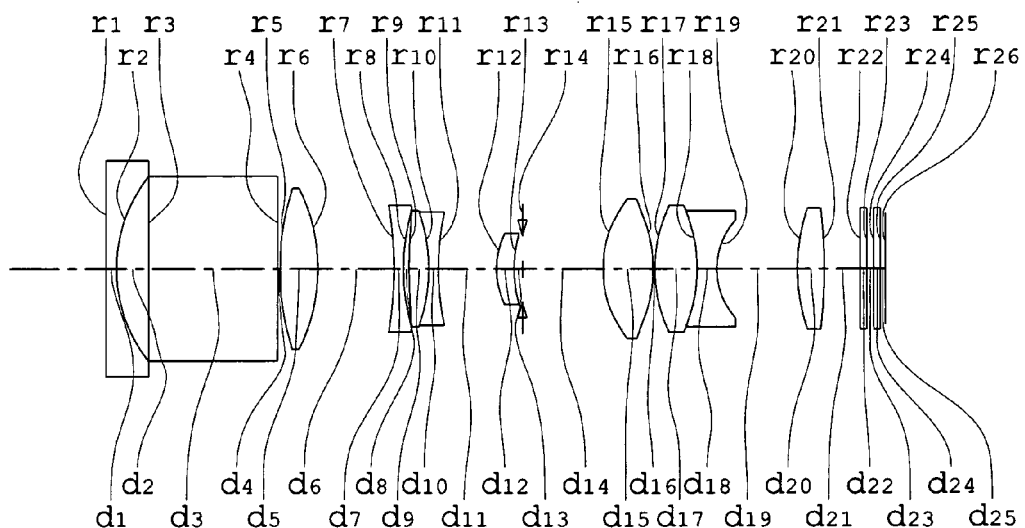
Figure 5C:
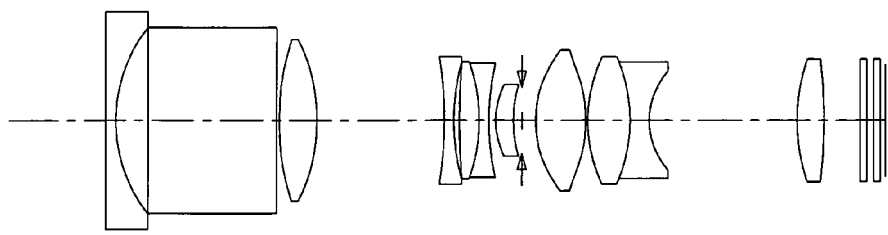

FIGS. 5A, 5B, and 5C are sectional views showing optical arrangements, developed along the optical axis, at wide-angle, middle, and telephoto positions, respectively, in infinite object point focusing of the zoom lens according to Embodiment 3 of the present invention. FIGS. 6A-6D, 6E-6H, and 6I-6L are diagrams showing aberration characteristics at wide-angle, middle, and telephoto positions, respectively, in infinite object point focusing of the zoom lens shown in FIGS. 5A-5C.

First, in accordance with FIGS. 5A-5C, the optical arrangement of the zoom lens of this embodiment will be explained. The zoom lens of the embodiment comprises, in order from the object side along the optical axis Lc, the first lens unit $G_1$ with positive refracting power, the second lens unit $G_2$ with negative refracting power, the third lens unit $G_3$ with positive refracting power, the fourth lens unit $G_4$ with positive refracting power, and the fifth lens unit $G_5$ with positive refracting power. Between the third lens unit $G_3$ and the fourth lens unit $G_4$, the aperture stop S constructed integrally with the third lens unit $G_3$ is interposed. Also, on the image side of the fifth lens unit $G_5$, the low-pass filter LF, the CCD cover glass CG, and the CCD having the image pickup surface IM are arranged in this order from the object side.

The first lens unit $G_1$ includes, in order from the object side, the first lens $L_{11}$ which is a plano-concave lens with a concave surface facing the image side and has a negative refracting power, the prism P which is a reflecting member changing the optical path, and the second lens $L_{12}$ which is a biconvex lens whose both surfaces are aspherical and has a positive refracting power. The second lens unit $G_2$ includes, in order from the object side, the first lens $L_{21}$ which is a biconcave lens whose object-side surface is aspherical and has a negative refracting power and a cemented doublet of the second lens $L_{22}$ which is a biconvex lens and has a positive refracting power and the third lens $L_{23}$ which is a biconcave lens and has a negative refracting power. The third lens unit $G_3$ includes only the lens $L_3$ which is a meniscus lens whose object-side surface is aspherical, with a convex surface facing the object side, and which has a positive refracting power. The fourth lens unit $G_4$ includes the fourth lens $L_4$, which is a biconvex lens whose both surfaces are aspherical and has a positive refracting power and a cemented doublet of the second lens $L_{42}$ which is a biconvex lens and has a positive refracting power and the third lens $L_{43}$ which is a biconcave lens and has a negative refracting power. The fifth lens unit $G_5$ includes only the lens $L_5$ which is a biconvex lens and has a positive refracting power.

When the magnification is changed in the range from the wide-angle position to the telephoto position, the first lens unit $G_1$ is not moved along the optical axis Lc. The second lens unit $G_2$ is moved toward the image side along the optical axis Lc while widening spacing between the first lens unit $G_1$ and the second lens unit $G_2$. The third lens unit $G_3$ is not moved along the optical axis. The fourth lens unit $G_4$ is moved toward the object side along the optical axis Lc while narrowing spacing between the third lens unit $G_3$ and the fourth lens unit $G_4$. The fifth lens unit $G_5$ is moved along the optical axis Lc in such a way as to widen spacing between the fourth lens unit $G_4$ and the fifth lens unit $G_5$. The aperture stop S is constructed integrally with the third lens unit $G_3$ and thus is not moved along the optical axis Lc.

Subsequently, structures and numerical data of lenses constituting the optical system in the embodiment are shown below. Also, the unit is millimeters.

| | Surface data | | | |
|---|---|---|---|---|
| Face number | Radius of curvature R | Face spacing D | Refractive index Nd | Abbe's number vd |
| 1 | ∞ | 0.80 | 2.00069 | 25.46 |
| 2 | 11.414 | 2.42 | | |
| 3 | ∞ | 9.50 | 1.90366 | 31.32 |
| 4 | ∞ | 0.20 | | |
| 5 (Aspherical surface) | 19.044 | 2.80 | 1.69680 | 55.53 |
| 6 (Aspherical surface) | -13.854 | D6 | | |
| 7 (Aspherical surface) | -23.737 | 0.69 | 1.83481 | 42.71 |
| 8 | 16.621 | 0.42 | | |
| 9 | 48.223 | 1.50 | 1.92286 | 20.88 |
| 10 | -13.058 | 0.70 | 1.88300 | 40.76 |
| 11 | 19.545 | D11 | | |
| 12 (Aspherical surface) | 6.662 | 1.30 | 1.59551 | 39.24 |
| 13 | 9.458 | 0.63 | | |
| 14 (Aperture stop) | ∞ | D14 | | |
| 15 (Aspherical surface) | 7.780 | 3.72 | 1.49700 | 81.54 |
| 16 (Aspherical surface) | -10.508 | 0.15 | | |
| 17 | 11.592 | 3.13 | 1.77377 | 47.17 |
| 18 | -12.184 | 1.42 | 2.00330 | 28.27 |
| 19 | 5.685 | D19 | | |
| 20 | 14.875 | 2.00 | 1.49700 | 81.54 |
| 21 | -40.397 | D21 | | |
| 22 | ∞ | 0.50 | 1.54771 | 62.84 |
| 23 | ∞ | 0.50 | | |
| 24 | ∞ | 0.50 | 1.51633 | 64.14 |

-continued

| | | | |
|---|---|---|---|
| 25 | ∞ | 0.37 | |
| 26 (Image pickup surface) | ∞ | | |

Aspherical data

Aspherical coefficients

| Face number | Radius of curvature R | Conic constant K | $A_4$ | $A_6$ | $A_8$ | $A_{10}$ |
|---|---|---|---|---|---|---|
| 5 | 19.044 | 0.000 | −3.86768e−05 | 9.13708e−07 | −5.32518e−09 | −2.09717e−10 |
| 6 | −13.854 | 0.000 | 6.72382e−05 | 1.17773e−06 | −1.33835e−08 | −9.66376e−11 |
| 7 | −23.737 | 0.000 | 1.28542e−04 | −1.01830e−06 | −3.33593e−08 | 6.40713e−10 |
| 12 | 6.662 | 0.000 | −3.18053e−04 | −3.62753e−06 | −4.00160e−07 | |
| 15 | 7.780 | 0.000 | −4.08990e−04 | −1.11437e−06 | 1.60090e−07 | −2.85420e−09 |
| 16 | −10.508 | 0.000 | 3.41167e−04 | −3.87385e−06 | 3.65529e−07 | −5.50672e−09 |

Various data
Zoom ratio 4.66

| | Wide-angle | Middle | Telephoto |
|---|---|---|---|
| Focal length | 4.39 | 9.41 | 20.45 |
| F number | 3.51 | 4.67 | 6.00 |
| Angle of view | 96.20 | 46.35 | 22.34 |
| Image height | 4.20 | 4.20 | 4.20 |
| Overall lens length | 57.53 | 57.53 | 57.53 |
| Back focus | 4.81 | 4.12 | 4.12 |
| D6 | 0.60 | 5.73 | 9.57 |
| D11 | 9.47 | 4.34 | 0.50 |
| D14 | 9.90 | 5.99 | 1.05 |
| D21 | 1.40 | 5.99 | 10.93 |
| D23 | 3.28 | 2.60 | 2.60 |

Zoom lens unit data

| Unit | Top face number | Focal length |
|---|---|---|
| 1 | 1 | 16.8415 |
| 2 | 7 | −8.8186 |
| 3 | 12 | 32.2459 |
| 4 | 15 | 14.1366 |
| 5 | 20 | 22.1412 |

Height of an incident ray that an angle made by the optical axis is a preset angle and data according to the aspherical amount of the most object-side aspherical surface on which the ray is incident

| Angle | Height of incident ray (The most object-side surface) | Height of incident ray (The most object-side aspherical surface) | Aspherical amount |
|---|---|---|---|
| 38° | 5.68 | 3.91 | −0.00624 |
| 39° | 5.841 | 4.03 | −0.00689 |
| 40° | 6.004 | 4.15 | −0.00759 |
| 41° | 6.169 | 4.28 | −0.00839 |
| 42° | 6.337 | 4.41 | −0.00925 |
| 43° | 6.509 | 4.54 | −0.01017 |
| 44° | 6.686 | 4.68 | −0.01124 |
| 45° | 6.868 | 4.83 | −0.01247 |
| 46° | 7.058 | 4.99 | −0.01393 |
| 47° | 7.26 | 5.17 | −0.01576 |
| 48° | 7.482 | 5.37 | −0.01812 |
| 49° | 7.742 | 5.44 | −0.01904 |

Data according to Conditions

| Condition (1) | $0.0001 < |Y_{49}|/ih_w < 0.1$ | 0.0045 |
|---|---|---|
| Condition (2) | $0.0001 < |Y_{47}|/ih_w < 0.1$ | 0.0038 |
| Condition (3) | $0.0001 < |Y_{45}|/ih_w < 0.1$ | 0.0030 |
| Condition (4) | $0.0001 < |Y_{43}|/ih_w < 0.1$ | 0.0024 |
| Condition (5) | $0.0001 < |Y_{41}|/ih_w < 0.1$ | 0.0020 |
| Condition (6) | $0.0001 < |Y_{40}|/ih_w < 0.1$ | 0.0018 |
| Condition (7) | $0.0001 < |Y_{39}|/ih_w < 0.1$ | 0.0016 |
| Condition (8) | $0.0001 < |Y_{38}|/ih_w < 0.1$ | 0.0015 |
| Condition (9) | $1 < D_p/ih_w < 5$ | 2.26 |
| Condition (10) | $3.5 < f_t/f_w < 7.0$ | 4.66 |
| Condition (11) | $0.5 < (r_{GIF\_O} + r_{GIF\_I})/(r_{GIF\_O} - r_{GIF\_I}) < 1.5$ | 1.00 |
| Condition (12) | $1.95 < n_{dGIF} < 2.1$ | 2.00069 |
| Condition (13) | $18 < v_{dGIF} < 30$ | 25.4579 |
| Condition (14) | $1.5 < P_v/ih_w < 2.3$ | 2.00 |
| Condition (15) | $1 < (r_{G4L\_O} + r_{G4L\_I})/(r_{G4L\_O} - r_{G4L\_I}) < 8$ | — |
| Condition (16) | $0.3 < P_{G4C}/P_{G4L} < 2$ | — |
| Condition (17) | $-5.0 < P_{G2}/P_{G4} < -0.3$ | −1.60 |
| Condition (18) | $0.1 < P_{G3}/P_{G4} < 4$ | 0.44 |
| Condition (19) | $0.5 < f_{G5}/f_t < 2.0$ | 1.08 |

Next, numerical data in the case where distortion is electrically corrected in this embodiment are shown below. Also, data not described below have values identical with data in the case where distortion is not electrically corrected. The unit is millimeters.

Various data where distortion is electrically corrected

| Zoom ratio 4.66 | | | |
|---|---|---|---|
| | Wide-angle | Middle | Telephoto |
| Focal length | 4.39 | 9.41 | 20.45 |
| F number | 3.51 | 4.67 | 6.00 |
| Angle of view | 92.99 | 46.35 | 22.34 |
| Image height | 3.97 | 4.20 | 4.20 |

Height of an incident ray that an angle made by the optical axis where distortion is electrically corrected is a preset angle and data according to the aspherical amount of the most object-side aspherical surface on which the ray is incident

| Angle | Height of incident ray (The most object-side surface) | Height of incident ray (The most object-side aspherical surface) | Aspherical amount |
|---|---|---|---|
| 38° | 5.68 | 3.91 | −0.00624 |
| 39° | 5.841 | 4.03 | −0.00689 |
| 40° | 6.004 | 4.15 | −0.00759 |
| 41° | 6.169 | 4.28 | −0.00839 |
| 42° | 6.337 | 4.41 | −0.00925 |
| 43° | 6.509 | 4.54 | −0.01017 |
| 44° | 6.686 | 4.68 | −0.01124 |
| 45° | 6.868 | 4.83 | −0.01247 |
| 46° | 7.058 | 4.99 | −0.01393 |

Data according to Conditions where distortion is electrically corrected

| | | |
|---|---|---|
| Condition (1) | $0.0001 < |Y_{49}|/ih_w < 0.1$ | — |
| Condition (2) | $0.0001 < |Y_{47}|/ih_w < 0.1$ | — |
| Condition (3) | $0.0001 < |Y_{45}|/ih_w < 0.1$ | 0.0031 |
| Condition (4) | $0.0001 < |Y_{43}|/ih_w < 0.1$ | 0.0026 |
| Condition (5) | $0.0001 < |Y_{41}|/ih_w < 0.1$ | 0.0021 |
| Condition (6) | $0.0001 < |Y_{40}|/ih_w < 0.1$ | 0.0019 |
| Condition (7) | $0.0001 < |Y_{39}|/ih_w < 0.1$ | 0.0017 |
| Condition (8) | $0.0001 < |Y_{38}|/ih_w < 0.1$ | 0.0016 |
| Condition (9) | $1 < D_p/ih_w < 5$ | 2.39 |
| Condition (10) | $3.5 < f_t/f_w < 7.0$ | 4.66 |
| Condition (11) | $0.5 < (r_{GIF\_O} + r_{GIF\_I})/(r_{GIF\_O} - r_{GIF\_I}) < 1.5$ | 1.00 |
| Condition (12) | $1.95 < n_{dGIF} < 2.1$ | 2.00069 |
| Condition (13) | $18 < v_{dGIF} < 30$ | 25.4579 |
| Condition (14) | $1.5 < P_w/ih_w < 2.3$ | 2.11 |
| Condition (15) | $1 < (r_{G4L\_O} + r_{G4L\_I})/(r_{G4L\_O} - r_{G4L\_I}) < 8$ | — |
| Condition (16) | $0.3 < P_{G4C}/P_{G4L} < 2$ | — |
| Condition (17) | $-5.0 < P_{G2}/P_{G4} < -0.3$ | −1.60 |
| Condition (18) | $0.1 < P_{G3}/P_{G4} < 4$ | 0.44 |
| Condition (19) | $0.5 < f_{G5}/f_t < 2.0$ | 1.08 |

Embodiment 4

Figure 7A:
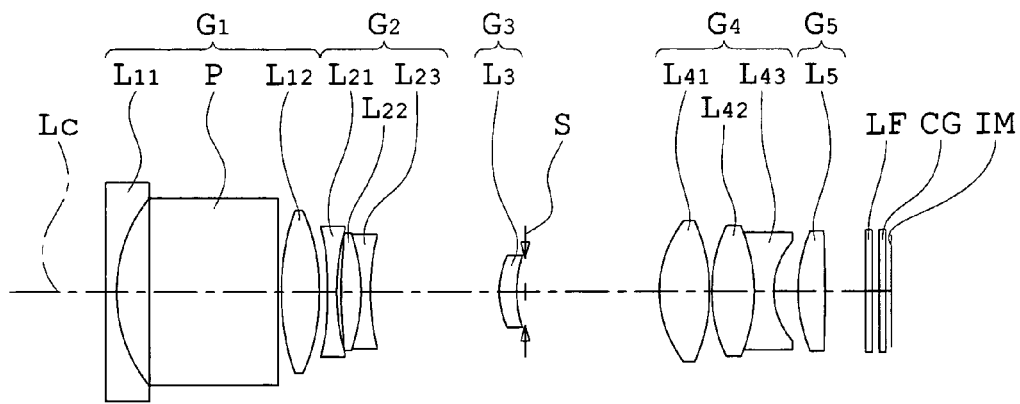
FIGS. 7A, 7B, and 7C are sectional views showing optical arrangements, developed along the optical axis, at wide-angle, middle, and telephoto positions, respectively, in infinite object point focusing of the zoom lens according to Embodiment 4 of the present invention.
Figure 7B:
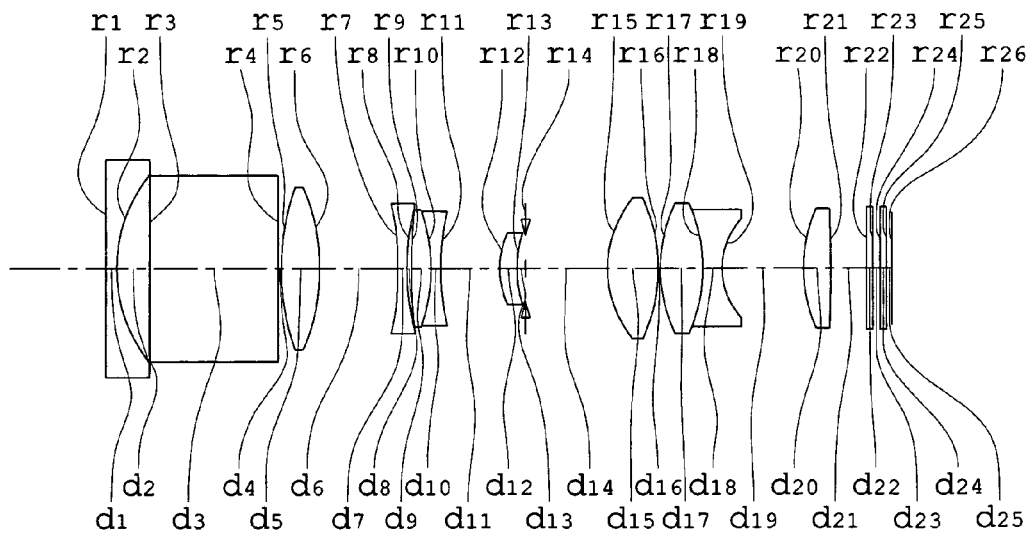
Figure 7C:
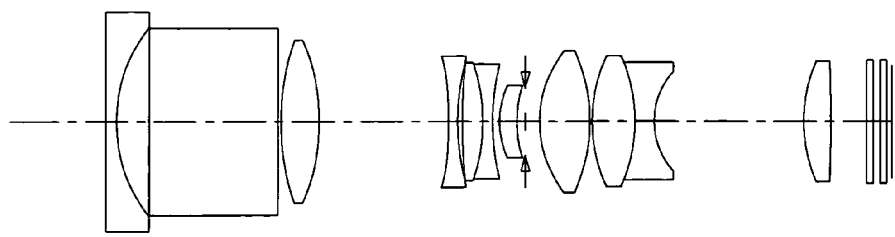

FIGS. 7A, 7B, and 7C are sectional views showing optical arrangements, developed along the optical axis, at wide-angle, middle, and telephoto positions, respectively, in infinite object point focusing of the zoom lens according to Embodiment 4 of the present invention. FIGS. 8A-8D, 8E-8H, and 8I-8L are diagrams showing aberration characteristics at wide-angle, middle, and telephoto positions, respectively, in infinite object point focusing of the zoom lens shown in FIGS. 7A-7C.

First, in accordance with FIGS. 7A-7C, the optical arrangement of the zoom lens of this embodiment will be explained. The zoom lens of the embodiment comprises, in order from the object side along the optical axis Lc, the first lens unit $G_1$ with positive refracting power, the second lens unit $G_2$ with negative refracting power, the third lens unit $G_3$ with positive refracting power, the fourth lens unit $G_4$ with positive refracting power, and the fifth lens unit $G_5$ with positive refracting power. Between the third lens unit $G_3$ and the fourth lens unit $G_4$, the aperture stop S constructed integrally with the third lens unit $G_3$ is interposed. Also, on the image side of the fifth lens unit $G_5$, the low-pass filter LF, the CCD cover glass CG, and the CCD having the image pickup surface IM are arranged in this order from the object side.

The first lens unit $G_1$ includes, in order from the object side, the first lens $L_{11}$ which is a plano-concave lens whose image-side surface is aspherical, with a concave surface facing the image side, and has a negative refracting power, the prism P which is a reflecting member changing the optical path, and the second lens $L_{12}$ which is a biconvex lens whose both surfaces are aspherical and has a positive refracting power. The second lens unit $G_2$ includes, in order from the object side, the first lens $L_{21}$ which is a biconcave lens whose object-side surface is aspherical and has a negative refracting power and a cemented doublet of the second lens $L_{22}$ which is a biconvex lens and has a positive refracting power and the third lens $L_{23}$ which is a biconcave lens and has a negative refracting power. The third lens unit $G_3$ includes only the lens $L_3$ which is a meniscus lens whose object-side surface is aspherical, with a convex surface facing the object side, and which has a positive refracting power. The fourth lens unit $G_4$ includes the fourth lens $L_{41}$ which is a biconvex lens whose both surfaces are aspherical and has a positive refracting power and a cemented doublet of the second lens $L_{42}$ which is a biconvex lens and has a positive refracting power and the third lens $L_{43}$ which is a biconcave lens and has a negative refracting power. The fifth lens unit $G_5$ includes only the lens $L_5$ which is a biconvex lens and has a positive refracting power.

When the magnification is changed in the range from the wide-angle position to the telephoto position, the first lens unit $G_1$ is not moved along the optical axis Lc. The second lens unit $G_2$ is moved toward the image side along the optical axis Lc while widening spacing between the first lens unit $G_1$ and the second lens unit $G_2$. The third lens unit $G_3$ is not moved along the optical axis. The fourth lens unit $G_4$ is moved toward the object side along the optical axis Lc while narrowing spacing between the third lens unit $G_3$ and the fourth lens unit $G_4$. The fifth lens unit $G_5$ is moved along the optical axis Lc in such a way as to widen spacing between the fourth lens unit $G_4$ and the fifth lens unit $G_5$. The aperture stop S is constructed integrally with the third lens unit $G_3$ and thus is not moved along the optical axis Lc.

Subsequently, structures and numerical data of lenses constituting the optical system in the embodiment are shown below. Also, the unit is millimeters.

Surface data

| Face number | Radius of curvature R | Face spacing D | Refractive index Nd | Abbe's number vd |
|---|---|---|---|---|
| 1 | ∞ | 0.80 | 2.00069 | 25.46 |
| 2 (Aspherical surface) | 11.397 | 2.42 | | |
| 3 | ∞ | 9.50 | 1.90366 | 31.32 |
| 4 | ∞ | 0.20 | | |
| 5 (Aspherical surface) | 18.943 | 2.80 | 1.69680 | 55.53 |
| 6 (Aspherical surface) | −13.861 | D6 | | |
| 7 (Aspherical surface) | −21.431 | 0.69 | 1.83481 | 42.71 |
| 8 | 18.210 | 0.34 | | |
| 9 | 43.100 | 1.50 | 1.92286 | 20.88 |
| 10 | −13.479 | 0.70 | 1.88300 | 40.76 |
| 11 | 18.361 | D11 | | |
| 12 (Aspherical surface) | 6.504 | 1.30 | 1.59551 | 39.24 |
| 13 | 9.104 | 0.63 | | |
| 14 (Aperture stop) | ∞ | D14 | | |
| 15 (Aspherical surface) | 7.779 | 3.72 | 1.49700 | 81.54 |
| 16 (Aspherical surface) | −10.481 | 0.15 | | |
| 17 | 11.752 | 3.13 | 1.77377 | 47.17 |
| 18 | −12.412 | 1.42 | 2.00330 | 28.27 |
| 19 | 5.701 | D19 | | |
| 20 | 11.500 | 2.00 | 1.49700 | 81.54 |
| 21 | −115.635 | D21 | | |
| 22 | ∞ | 0.50 | 1.54771 | 62.84 |
| 23 | ∞ | 0.50 | | |
| 24 | ∞ | 0.50 | 1.51633 | 64.14 |
| 25 | ∞ | 0.37 | | |
| 26 (Image pickup surface) | ∞ | | | |

Aspherical data

| Face number | Radius of curvature R | Conic constant K | $A_4$ | $A_6$ | $A_8$ | $A_{10}$ |
|---|---|---|---|---|---|---|
| 2 | 11.397 | 0.000 | −1.49688e−05 | −1.66327e−07 | −1.53468e−09 | 1.83307e−10 |
| 5 | 18.943 | 0.000 | −4.43998e−05 | 6.79485e−07 | −8.12120e−09 | −1.64936e−10 |
| 6 | −13.861 | 0.000 | 6.45550e−05 | 9.91432e−07 | −1.73289e−08 | −3.66996e−11 |
| 7 | −21.431 | 0.000 | 1.32656e−04 | −1.01545e−06 | 1.97526e−08 | −6.86320e−10 |
| 12 | 6.504 | 0.000 | −3.42007e−04 | −4.57563e−06 | −3.60841e−07 | |
| 15 | 7.779 | 0.000 | −3.91152e−04 | −6.95999e−07 | 1.50407e−07 | −5.07404e−09 |
| 16 | −10.481 | 0.000 | 3.61646e−04 | −3.02044e−06 | 3.29434e−07 | −7.68518e−09 |

Various data
Zoom ratio 4.66

| | Wide-angle | Middle | Telephoto |
|---|---|---|---|
| Focal length | 4.39 | 9.38 | 20.45 |
| F number | 3.51 | 4.61 | 6.00 |
| Angle of view | 97.30 | 46.08 | 22.30 |
| Image height | 4.20 | 4.20 | 4.20 |
| Overall lens length | 57.61 | 57.61 | 57.61 |
| Back focus | 4.49 | 4.12 | 4.12 |
| D6 | 0.60 | 5.83 | 9.67 |
| D11 | 9.57 | 4.34 | 0.50 |
| D14 | 9.86 | 6.04 | 1.05 |
| D21 | 1.80 | 5.99 | 10.93 |
| D23 | 2.97 | 2.60 | 2.60 |

Zoom lens unit data

| Unit | Top face number | Focal length |
|---|---|---|
| 1 | 1 | 16.7848 |
| 2 | 7 | −8.809 |
| 3 | 12 | 32.2322 |
| 4 | 15 | 14.2358 |
| 5 | 20 | 21.1571 |

Height of an incident ray that an angle made by the optical axis is a preset angle and data according to the aspherical amount of the most object-side aspherical surface on which the ray is incident

| Angle | Height of incident ray (The most object-side surface) | Height of incident ray (The most object-side aspherical surface) | Aspherical amount |
|---|---|---|---|
| 38° | 5.718 | 5.08 | −0.01141 |
| 39° | 5.879 | 5.20 | −0.0124 |
| 40° | 6.041 | 5.33 | −0.0135 |
| 41° | 6.204 | 5.45 | −0.01452 |
| 42° | 6.368 | 5.57 | −0.01553 |
| 43° | 6.535 | 5.70 | −0.01658 |
| 44° | 6.703 | 5.82 | −0.01749 |
| 45° | 6.875 | 5.95 | −0.01836 |
| 46° | 7.051 | 6.07 | −0.01902 |
| 47° | 7.233 | 6.20 | −0.01953 |
| 48° | 7.423 | 6.34 | −0.01976 |
| 49° | 7.628 | 6.49 | −0.01951 |

Data according to Conditions

| | | |
|---|---|---|
| Condition (1) | $0.0001 < |Y_{49}|/ih_w < 0.1$ | 0.0047 |
| Condition (2) | $0.0001 < |Y_{47}|/ih_w < 0.1$ | 0.0047 |
| Condition (3) | $0.0001 < |Y_{45}|/ih_w < 0.1$ | 0.0044 |
| Condition (4) | $0.0001 < |Y_{43}|/ih_w < 0.1$ | 0.0039 |
| Condition (5) | $0.0001 < |Y_{41}|/ih_w < 0.1$ | 0.0035 |
| Condition (6) | $0.0001 < |Y_{40}|/ih_w < 0.1$ | 0.0032 |
| Condition (7) | $0.0001 < |Y_{39}|/ih_w < 0.1$ | 0.0030 |
| Condition (8) | $0.0001 < |Y_{38}|/ih_w < 0.1$ | 0.0027 |
| Condition (9) | $1 < D_p/ih_w < 5$ | 2.26 |
| Condition (10) | $3.5 < f_t/f_w < 7.0$ | 4.66 |
| Condition (11) | $0.5 < (r_{GIF\_O} + r_{GIF\_I})/(r_{GIF\_O} - r_{GIF\_I}) < 1.5$ | 1.00 |
| Condition (12) | $1.95 < n_{dGIF} < 2.1$ | 2.00069 |
| Condition (13) | $18 < \nu_{dGIF} < 30$ | 25.4579 |
| Condition (14) | $1.5 < P_w/ih_w < 2.3$ | 2.00 |
| Condition (15) | $1 < (r_{G4L\_O} + r_{G4L\_I})/(r_{G4L\_O} - r_{G4L\_I}) < 8$ | — |
| Condition (16) | $0.3 < P_{G4C}/P_{G4L} < 2$ | — |
| Condition (17) | $-5.0 < P_{G2}/P_{G4} < -0.3$ | −1.62 |
| Condition (18) | $0.1 < P_{G3}/P_{G4} < 4$ | 0.44 |
| Condition (19) | $0.5 < f_{G5}/f_t < 2.0$ | 1.03 |

Next, numerical data in the case where distortion is electrically corrected in this embodiment are shown below. Also, data not described below have values identical with data in the case where distortion is not electrically corrected. The unit is millimeters.

Various data where distortion is electrically corrected

| Zoom ratio 4.66 | | | |
|---|---|---|---|
| | Wide-angle | Middle | Telephoto |
| Focal length | 4.39 | 9.38 | 20.45 |
| F number | 3.51 | 4.61 | 6.00 |
| Angle of view | 93.10 | 46.08 | 22.30 |
| Image height | 3.94 | 4.20 | 4.20 |

Height of an incident ray that an angle made by the optical axis where distortion is electrically corrected is a preset angle and data according to the aspherical amount of the most object-side aspherical surface on which the ray is incident

| Angle | Height of incident ray (The most object-side surface) | Height of incident ray (The most object-side aspherical surface) | Aspherical amount |
|---|---|---|---|
| 38° | 5.718 | 5.08 | −0.01141 |
| 39° | 5.879 | 5.20 | −0.0124 |
| 40° | 6.041 | 5.33 | −0.0135 |
| 41° | 6.204 | 5.45 | −0.01452 |
| 42° | 6.368 | 5.57 | −0.01553 |
| 43° | 6.535 | 5.70 | −0.01658 |
| 44° | 6.703 | 5.82 | −0.01749 |
| 45° | 6.875 | 5.95 | −0.01836 |
| 46° | 7.051 | 6.07 | −0.01902 |

Data according to Conditions where distortion is electrically corrected

| | | |
|---|---|---|
| Condition (1) | $0.0001 < |Y_{49}|/ih_w < 0.1$ | — |
| Condition (2) | $0.0001 < |Y_{47}|/ih_w < 0.1$ | — |
| Condition (3) | $0.0001 < |Y_{45}|/ih_w < 0.1$ | 0.0047 |
| Condition (4) | $0.0001 < |Y_{43}|/ih_w < 0.1$ | 0.0042 |
| Condition (5) | $0.0001 < |Y_{41}|/ih_w < 0.1$ | 0.0037 |
| Condition (6) | $0.0001 < |Y_{40}|/ih_w < 0.1$ | 0.0034 |
| Condition (7) | $0.0001 < |Y_{39}|/ih_w < 0.1$ | 0.0031 |
| Condition (8) | $0.0001 < |Y_{38}|/ih_w < 0.1$ | 0.0029 |
| Condition (9) | $1 < D_p/ih_w < 5$ | 2.41 |
| Condition (10) | $3.5 < f_t/f_w < 7.0$ | 4.66 |
| Condition (11) | $0.5 < (r_{GIF\_O} + r_{GIF\_I})/(r_{GIF\_O} - r_{GIF\_I}) < 1.5$ | 1.00 |
| Condition (12) | $1.95 < n_{dGIF} < 2.1$ | 2.00069 |
| Condition (13) | $18 < \nu_{dGIF} < 30$ | 25.4579 |
| Condition (14) | $1.5 < P_w/ih_w < 2.3$ | 2.13 |
| Condition (15) | $1 < (r_{G4L\_O} + r_{G4L\_I})/(r_{G4L\_O} - r_{G4L\_I}) < 8$ | — |
| Condition (16) | $0.3 < P_{G4C}/P_{G4L} < 2$ | — |
| Condition (17) | $-5.0 < P_{G2}/P_{G4} < -0.3$ | −1.62 |
| Condition (18) | $0.1 < P_{G3}/P_{G4} < 4$ | 0.44 |
| Condition (19) | $0.5 < f_{G5}/f_t < 2.0$ | 1.03 |

Also, although in each embodiment the zoom lens is constructed with five lens units, the present invention is not limited to such an arrangement and lens units may be further arranged at any position between the first lens unit and the second lens unit, between the second lens unit and the third lens unit, between the third lens unit and the fourth lens unit, and between the fourth lens unit and the fifth lens unit. In each embodiment, the first lens unit includes, in order from the object side, the first lens with negative refracting power, the reflecting member changing the optical path, and the second lens with positive refracting power. However, the present invention is not limited to this arrangement and lenses may be further arranged at any position between the first lens and the prism, between the prism and the second lens, and between the first lens unit and the second lens unit.

In each embodiment, the reflecting member is constructed with the prism, but the present invention is not limited to this construction and a mirror may be used. The zoom lens of the present invention may be constructed as described below. In the zoom lens of the present invention, shading on the periphery of the image may be lessened by shifting the microlens array of the CCD. For example, the design of the microlens array of the CCD may be changed in accordance with the angle of incidence of a light ray at the image height. The amount of reduction in brightness on the periphery of the image may be corrected by image processing.

The zoom lens of the present invention may be designed to place a flare stop in addition to the aperture stop in order to cut off unwanted light such as ghost and flare. Also, the flare stop may be located at any position on the object side of the first lens unit, between the first lens unit and the second lens unit, between the second lens unit and the third lens unit, between the third lens unit and the fourth lens unit, between the fourth lens unit and the fifth lens unit, and between the fifth lens unit and the image pickup surface. The flare stop may be constructed with a frame member or with another member. In addition, the flare stop may be constructed in such a way that it is printed directly on an optical member or that paint or an adhesive seal is used. The flare stop may have any of shapes of a circle, ellipse, rectangle, polygon, and contour surrounded by a function curve. The flare stop may be designed to cut off not only detrimental light beams, but also light beams such as coma flare on the periphery of the image.

In the zoom lens of the present invention, an antireflection coat may be applied to each lens so that ghost and flare are lessened. In this case, in order to lessen the ghost and flare more effectively, it is desirable that the antireflection coat to be applied is used as a multiple coat. An infrared cutoff coat may be applied not to the low-pass filter, but to the surface of each lens or the cover glass.

Also, in order to prevent ghost and flare from occurring, it is generally performed that the antireflection coat is applied to the air contact surface of a lens. On the other hand, the refractive index of an adhesive on the cemented surface of a cemented lens is much higher than that of air. Hence, the cemented surface of the cemented lens often has the refractive index originally equal to or less than a single layer coat, and thus the coat is not particularly applied in most cases. However, when the antireflection coat is positively applied to the cemented surface of the cemented lens, ghost and flare can be further lessened and a more favorable image can be obtained. In particular, high-index glass materials in which the effect of correction for aberration is secured have been popularized in recent years and have come to be often used in optical systems for cameras. However, when the high-index glass material is used for the cemented lens, reflection at the cemented surface ceases to be negligible. In this case, therefore, the application of the antireflection coat to the cemented surface is particularly effective.

Coating methods effective for such cemented surfaces are disclosed in Japanese Patent Kokai Nos. Hei 2-27301, 2001-324676, and 2005-92115 and U.S. Pat. No. 7,116,482. For the application of the coat, it is only necessary that a relatively high-index coating substance, such as $Ta_2O_5$, $TiO_2$, $Nb_2O_5$, $ZrO_2$, $HfO_2$, $CeO_2$, $SnO_2$, $In_2O_3$, $ZnO$, or $Y_2O_3$, or a relatively low-index coating substance, such as $MgF_2$, $SiO_2$, or $Al_2O_3$, is properly selected in accordance with the refractive index of a lens for a substrate and the refractive index of the adhesive and is set to a film thickness such as to satisfy a phase condition.

As a matter of course, the coat of the cemented surface, like the coating on the air contact surface of the lens element, may be used as a multicoat. The coat substance of the number of films of two or more layers is properly combined with the film thickness and thereby a further reduction in reflectance and the control of the spectral characteristic and/or the angular characteristic of the reflectance become possible.

Figure 9:
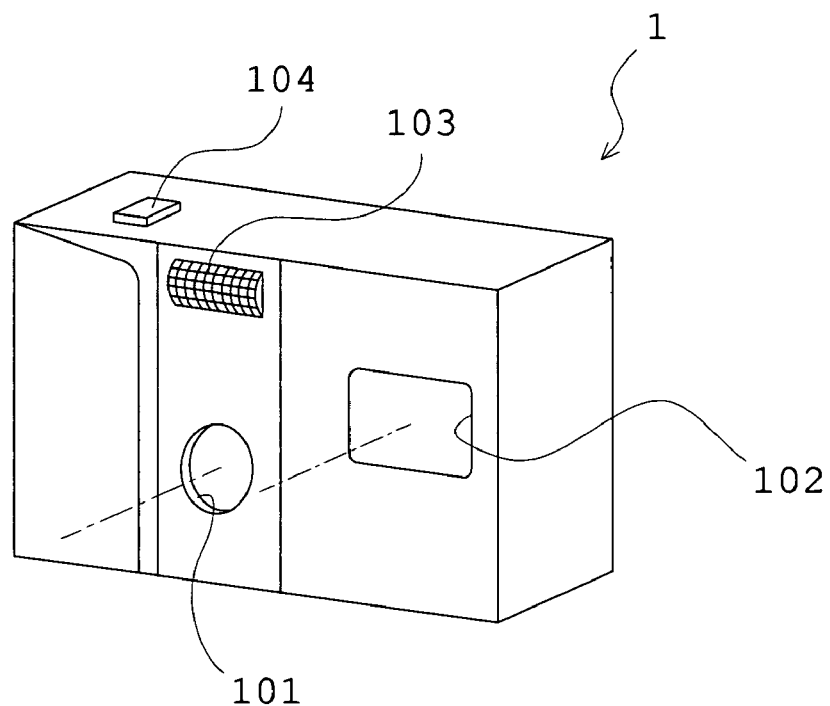
FIG. 9 is a perspective front view showing the appearance of an example of a digital camera incorporating the image pickup apparatus of the present invention.
Figure 10:
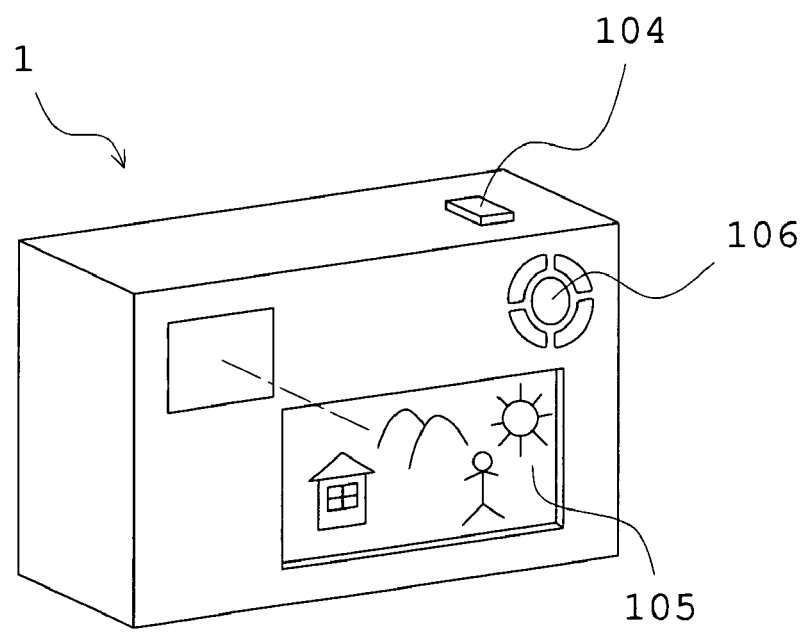
FIG. 10 is a perspective rear view showing the digital camera of FIG. 9.
Figure 11:
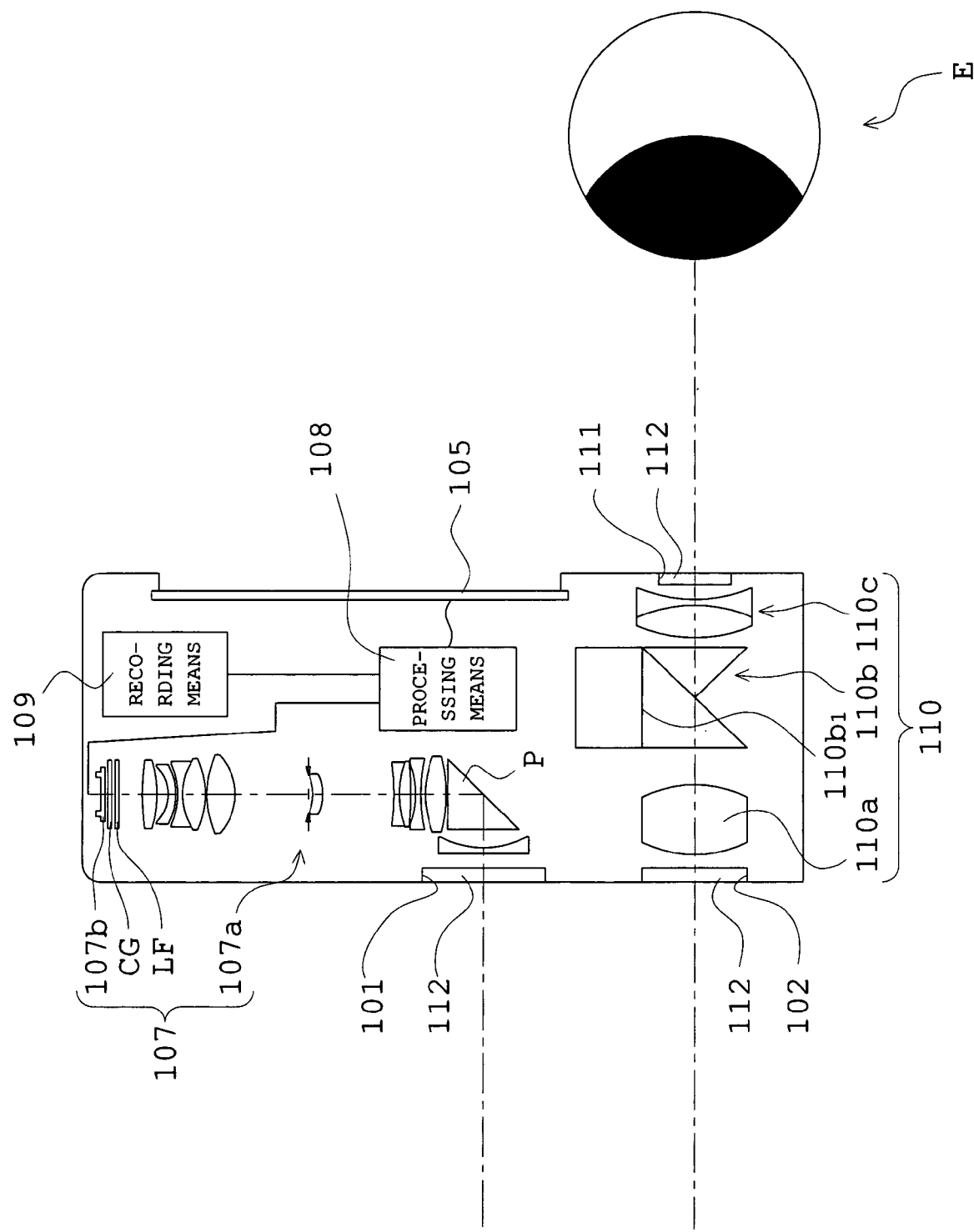
FIG. 11 is a sectional view showing the structure of the digital camera of FIG. 9.
Figure 12:
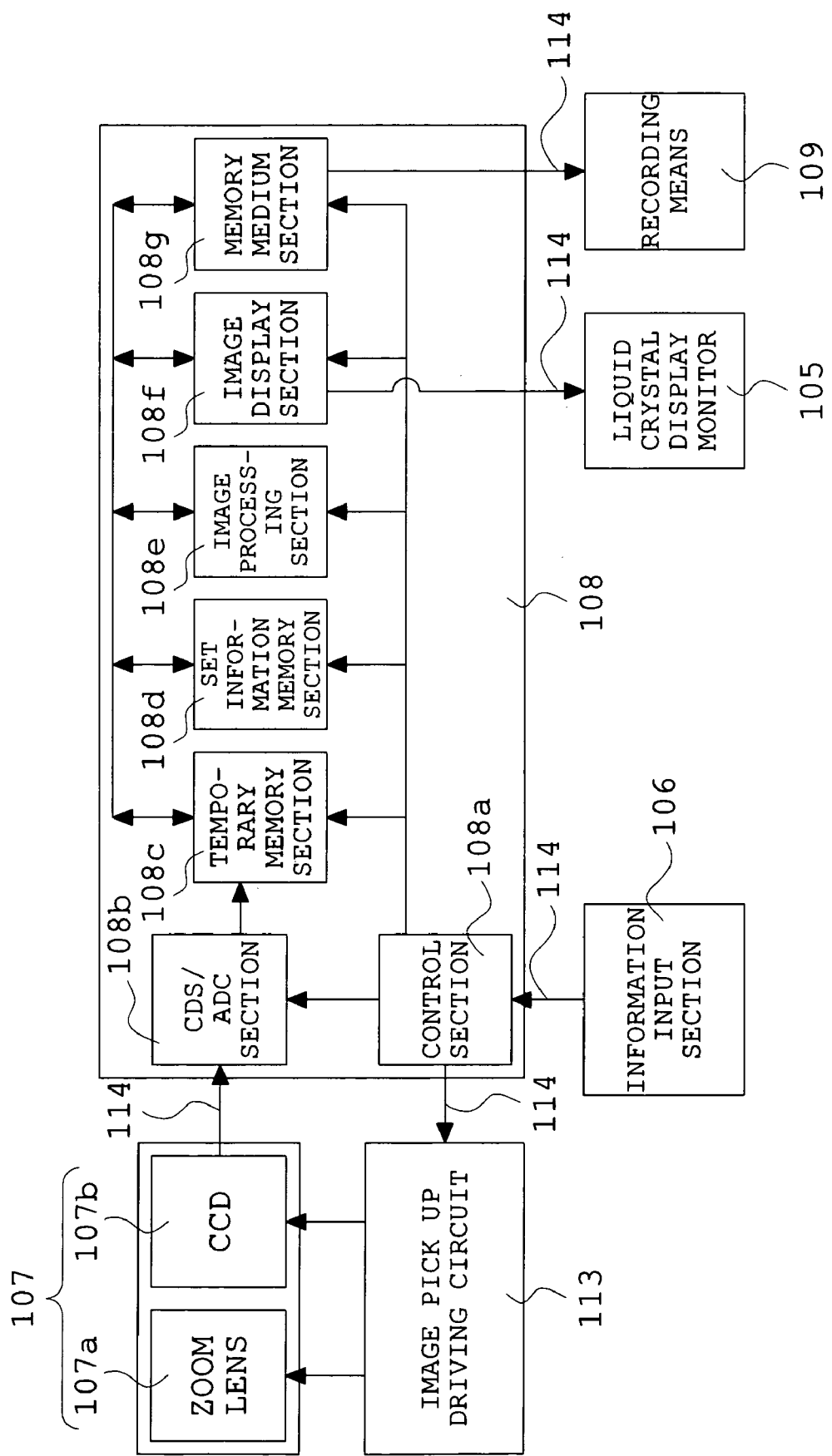
FIG. 12 is a block diagram showing the configuration of essential parts of an internal circuit of the digital camera of FIG. 9.

The image pickup apparatus using the zoom lens of the present invention discussed above can be favorably used in the digital camera, the personal computer, or the mobile phone. The embodiments of such apparatuses are illustrated below. First, an example of the digital camera incorporating the image pickup apparatus of the present invention is shown. FIG. 9 is a perspective front view showing the appearance of an example of a digital camera incorporating the image pickup apparatus of the present invention and FIG. 10 is a perspective rear view showing the digital camera of FIG. 9. FIG. 11 is a sectional view showing an internal structure of the digital camera of FIGS. 9 and 10. FIG. 12 is a block diagram showing the configuration of essential parts of an internal circuit of the digital camera of FIG. 9.

First, in accordance with FIGS. 9-11, the structure of a digital camera 1 will be explained. The digital camera 1 has a photographing opening section 101, a finder opening section 102, and a flash light-emitting section 103 in front thereof. On the upper face of the camera, a shutter button 104 is provided. On the back face, a liquid crystal display monitor 105 and an information input section 106 are provided. An image pickup apparatus 107, a processing means 108, a recording means 109, and a finder optical system 110 are included inside the digital camera 1. Cover members 112 are provided for the photographing opening section 101, the finder opening section 102, and an opening section 111 located on the exit side of the finder optical system 110 and provided on the back face of the digital camera 1.

The image pickup apparatus 107 incorporated in the digital camera 1 corresponds to the image pickup apparatus of the present invention discussed in the above embodiments and includes, in order from the object side, a zoom lens 107a having the prism P, the low-pass filter LF, the CCD cover glass CG, and a CCD 107b. Consequently, the optical path of light from an object incident on the photographing opening section 101 is changed from a direction perpendicular to the front of the digital camera 1 to a direction parallel thereto by the prism P of the zoom lens 107a inside the digital camera 1.

The finder optical system 110 includes a finder objective optical system 110a, an erecting prism 110b, and an eyepiece optical system 110c. Light from the object incident on the finder opening section 102 is introduced into the erecting prism 110b of an image erecting member by the finder objective optical system 110a to form an object image as an erected image in a field frame $110b_1$ and then the object image is introduced into an observer's eye E through the eyepiece optical system 110c.

The digital camera 1 is such that when the shutter button 104 provided on the upper face of the digital camera 1 is pushed, image information is acquired through the image pickup apparatus 107 in association with the operation of this shutter button. The image information acquired by the image pickup apparatus 107 is recorded in the recording means 109 through the processing means 108. The recorded image information is fetched by the processing means 108 and can also be displayed as an electronic image on the liquid crystal display monitor 105 provided on the back face of the camera.

In the digital camera 1 constructed as mentioned above, the optical path used to acquire the image information is changed in the digital camera 1, and hence in contrast with a digital camera in which the optical path is not changed, a compact design, particularly relative to the dimension in a depth direction of the camera, can be realized. In addition, since the image pickup apparatus 107 used to acquire the image is provided with the zoom lens 107a which has a wide angle of view and a high variable magnification ratio, is favorably corrected for aberration, is bright, and has a long back focus in which filters can be arranged, low cost, as well as high performance, can be brought about.

Also, although in this example the optical path used to acquire the image information is changed in a lateral direction of the camera 1, it may be changed in a longitudinal direction. In the example, plane-parallel plates are used as the cover members 112, but the most object-side lens of the zoom lens 107a of the image pickup apparatus 107, the most object-side lens of the finder objective optical system 110a, and the most image-side lens of the eyepiece optical system may be fitted directly into the opening sections, without using the cover members 112 for the opening sections, Next, in accordance with FIG. 12, reference is made to image information processing performed in the digital camera 1. The digital camera 1, as shown in FIG. 12, is provided with an image pickup driving circuit 113 in addition to the image pickup apparatus 107, the processing means 108, and the recording section 109. The processing means 108 has a control section 108a, a CDS/ADC section 108b, a temporary memory section 108c, a set information memory section 108d, an image processing section 108e, an image display section 108f, and a memory medium section 108g, and these sections are mutually connected so that the input and output of data are possible. Also, the processing means 108 is connected to the liquid crystal display monitor 105, the information input section 106, the image pickup apparatus 107, the recording section 109, and the image pickup driving circuit 113 through buses 114 connected to a signal input-output port of the processing means. The image pickup driving circuit 113 is such as to drive and control the zoom lens 107a and the CCD 107b of the image pickup apparatus 107 in accordance with a signal from the control section 108a of the processing means 108.

The control section 108a of the control means 108 includes a central arithmetic processing unit such as a CPU and houses a program memory, not shown. The control section 108a is a circuit which controls the whole of digital camera 1 in accordance with a program stored in the program memory and instructions which are inputted by a user of the digital camera 1 through the information input section 106 having a input button and switch. The CDS/ADC section 108b of the control means 108 is a circuit which amplifies an electrical signal inputted from the CCD 107b of the image pickup apparatus 107, performs analog-to-digital conversion, and outputs raw image data in which only the amplification and the analog-to-digital conversion are performed (or Bayer data, which are called RAW data) to the temporary memory section 108c. The temporary memory section 108c of the control means 108 is, for example, a buffer including a SDRAM and is a memory unit of temporarily memorizing the above RAW data which is outputted from the CDS/ADC section 108b.

The set information memory section 108d of the processing means 108 has a ROM section and a RAM section which are not shown in the figures. The information memory 108d is a circuit that reads various image quality parameters which are stored in the ROM section in advance and that memorizes a image quality parameter which is selected from the read image quality parameters by the input operation of the information input section 106 of a user of the digital camera 1 in the RAM section.

The image processing section 108e of the processing means 108 is a circuit that reads the RAW data memorized in the temporary memory section 108c or a memory medium section 108g to electrically perform various image processing processes, which include correction for distortion, in accordance with a image quality parameter designated by a user of the digital camera 1.

The image display section 108f is a circuit that is connected to the liquid crystal display monitor 105 to display an image, an operation menu, and so forth on the liquid crystal display monitor 105. The memory medium section 108g is a circuit that controls a unit which records and/or saves RAW data transferred from the temporary memory section 108c and image data image-processed by the image processing section 108e. In this embodiment, the unit which records and/or saves the data is the recording means 109 incorporated into the digital camera 1. However, the unit which records and/or saves the data may be, for example, a recording medium, such as a flash memory, which can be removably fitted to the outside of the digital camera 1.

Figure 13:
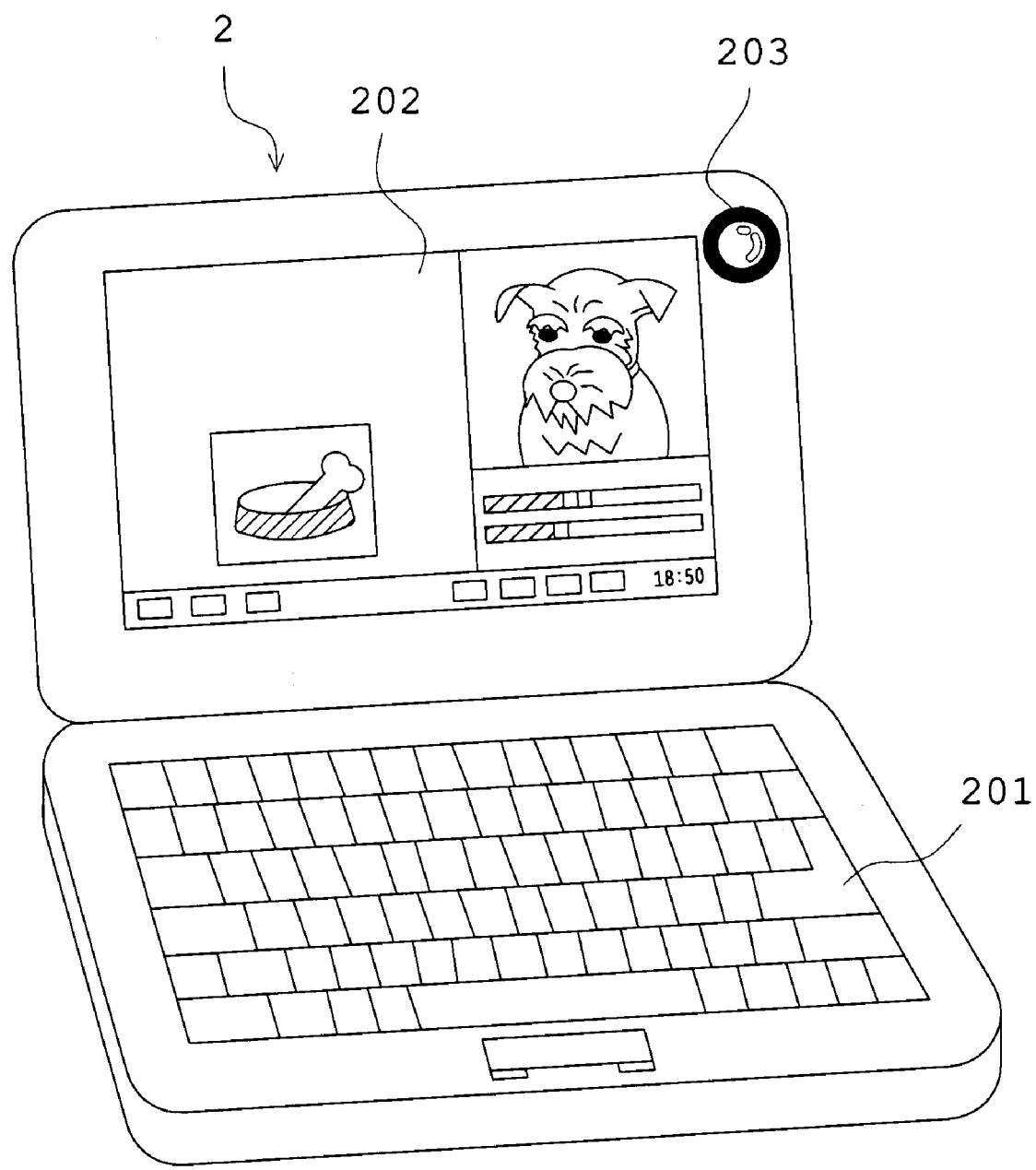
FIG. 13 is a perspective front view showing a personal computer, whose cover is opened, incorporating the image pickup apparatus of the present invention.
Figure 14:
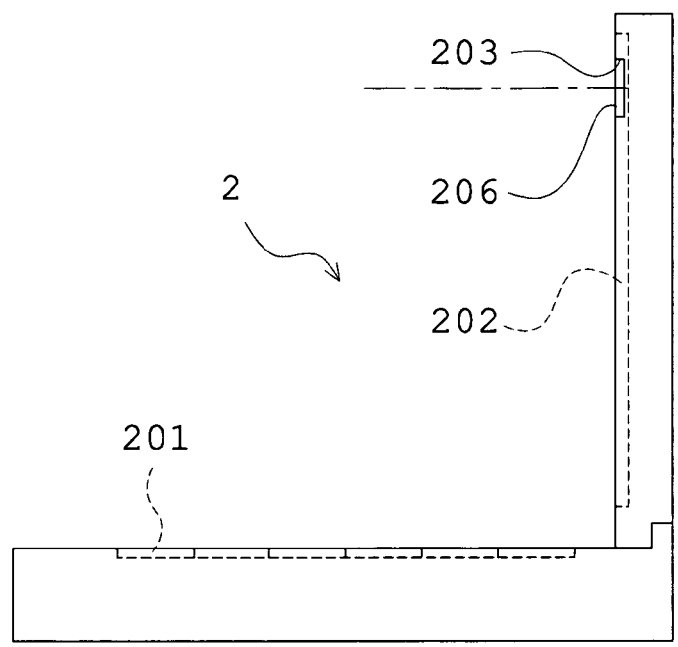
FIG. 14 is a sectional view showing the image pickup apparatus using the zoom lens of the present invention incorporated in the personal computer of FIG. 13 and its periphery.
Figure 15:
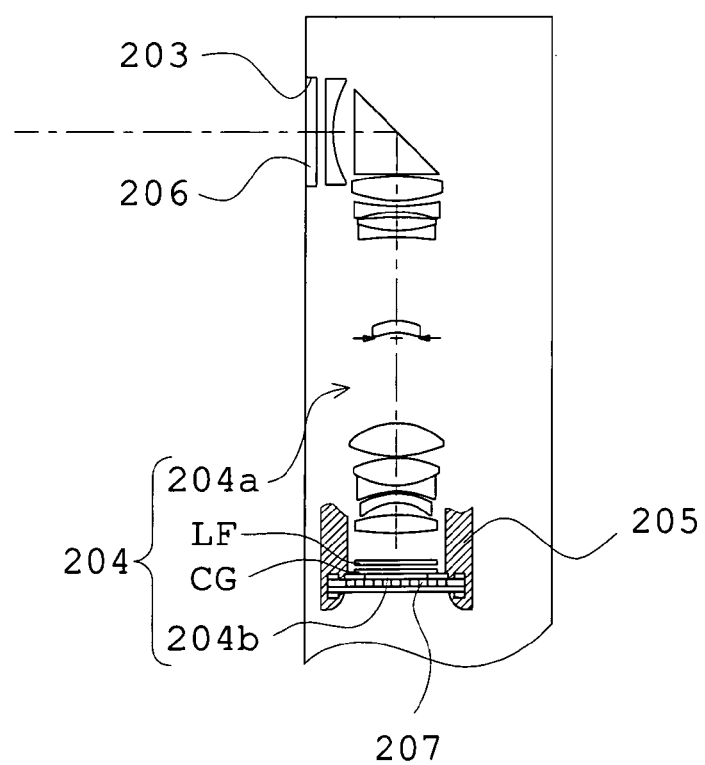
FIG. 15 is a side view showing the personal computer of FIG. 13.

Next, one example of a personal computer that is an information processing apparatus into which the image pickup apparatus according to the present invention is incorporated will be shown. FIG. 13 is a perspective front view showing a personal computer whose cover is opened and into which the image pickup apparatus according to the present invention is incorporated. FIG. 14 is a side view showing the personal computer shown in FIG. 13. FIG. 15 is a cross sectional view showing the image pickup apparatus incorporated into the personal computer and the periphery of the image pickup apparatus. As shown in FIGS. 13 to 15, the personal computer 2 has a keyboard 201 for a user to input information from the outside of the personal computer 2, and a liquid crystal display monitor 202 for displaying information to the user. An opening 203 for photographing is provided at the side of the liquid crystal display monitor 202. An image pickup apparatus 204 for photographing the user himself and a surrounding image, and an information processing means and a recording means which are not shown in the figures are provided inside the personal computer 2.

The image pickup apparatus 204 incorporated into the personal computer 2 corresponds to the image pickup apparatus according to the present invention explained in each embodiment mentioned above. The image pickup apparatus 204 comprises, in order from the object side, a zoom lens 204a having a prism P, a low-pass filter LF, a CCD cover glass CG, and a CCD 204b which is an imaging element chip. The optical path of light entering from the user himself and the periphery of the user into the opening 203 is changed from a direction perpendicular to the liquid crystal display monitor 202 of the personal computer 2 to a direction parallel to the liquid crystal display monitor 202 by the prism P of the zoom lens 204a inside the personal computer 2.

Because the image pickup apparatus 204, which changes an optical path of light for obtaining image information inside the personal computer 2, is used in the personal computer 2, the personal computer 2 having such a constitution can easily realize the compact design as compared with a personal computer having an image pickup apparatus which does not change an optical path. Also, the personal computer 2 can easily realize high performance and low cost, because the image pickup apparatus 204 for obtaining an image has the zoom lens 204a, which has a wide angle of view and a high variable magnification ratio, is favorably corrected for aberration, is bright, and has a long back focus in which filters can be arranged.

The cover glass CG is additionally cemented to on the CCD 204b which is an imaging element chip, and the cover glass CG and the CCD 204b are integrally constructed as an imaging unit and can be placed in a lens frame 205 holding the zoom lens 204a by fitting the cover glass CG and the CCD 204b into the rear end of the lens flame 205 in a single operation. For this reason, alignment of the zoom lens 104a and the CCD 204b and the adjustment of the face-to-face spacing are not required, and the assembly is simplified. A cover member 206 for protecting the zoom lens 204a is placed at the front end of the lens frame 205 (which is not shown in the figure). A driving mechanism for the zoom lens 204a provided in the lens frame 205 is omitted from the figure. An object image received by the CCD 204b is inputted into a processing means of the personal computer 2 through a terminal 207, and is displayed as an electronic image on the liquid crystal display monitor 202. Also, the image can be displayed on a personal computer of a remote communication partner from the processing means through the Internet or a telephone circuit.

Although the image pickup apparatus 204 is placed at the side of the liquid crystal display monitor 202 in this embodiment, the placement of the image pickup apparatus 204 is not limited to the above placement, and the image pickup apparatus 204 may be placed anywhere, for example, at a position except for the side of the liquid crystal display monitor 202 or in the periphery of the keyboard 201. Although a transmission liquid crystal display element, which is illuminated from the rear side by a backlight, is used for the liquid crystal display monitor 202 in this embodiment, a reflection liquid crystal display element reflecting and displaying light from the front may be used. The liquid crystal display monitor 202 may be replaced with a display device such as a CRT display.

Figure 16A:
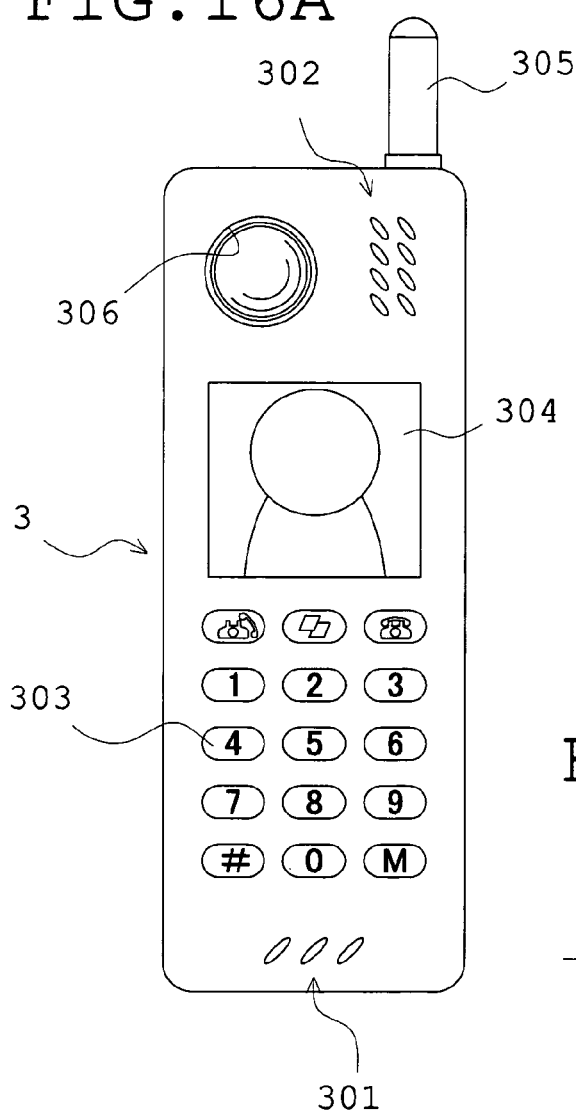
FIGS. 16A, 16B, and 16C are views showing an example of a mobile phone incorporating the image pickup apparatus using the zoom lens of the present invention, which are a front view, a side view, and a sectional view of the image pickup apparatus of the present invention incorporated in the mobile phone and its periphery, respectively.
Figure 16B:
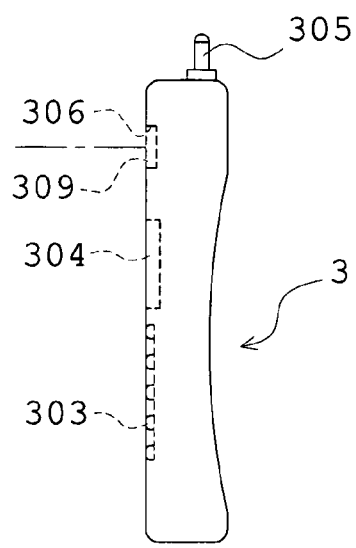
Figure 16C:
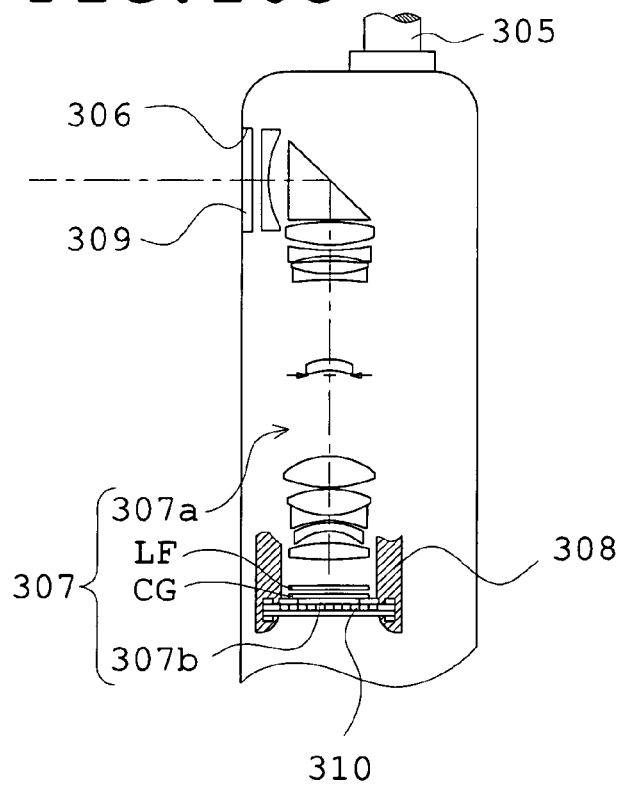

Next, one example of a mobile phone that is an information processing apparatus into which an image pickup apparatus according to the present invention is incorporated will be shown. FIG. 16A is a front view showing the mobile phone into which the image pickup apparatus is incorporated. FIG. 16B are a side view showing the mobile phone. FIG. 16C is a cross sectional view showing an image pickup apparatus incorporated into the mobile phone and the periphery of the image pickup apparatus. As shown in FIGS. 16A to 16C, the mobile phone 3 has a microphone section 301 for inputting a user's voice as information, a speaker section 302 for outputting a voice of a communication partner, input keys 303 by which the user inputs information, a liquid crystal display monitor 304 for displaying information of photographed images of the user himself and the communication partner and telephone number, and antenna 305 for transmitting and receiving communication waves. An opening 306 for photographing is provided at the side of the speaker section 302. An image pickup apparatus 307 for photographing the user himself and a surrounding image, and an information processing means and a recording means which are not shown in the figures are provided inside the mobile phone 3. A liquid crystal display element is used in the liquid crystal display monitor 304. The placement of each constitution is not limited to such a constitution in the figures, and the placement may be suitably changed.

The image pickup apparatus 307 incorporated into the mobile phone 3 corresponds to the image pickup apparatus according to the present invention which is explained above. The image pickup apparatus 307 comprises, in order from the object side, a zoom lens 307a having a prism P, a low-pass filter LF, a CCD cover glass CG, and a CCD 307b which is an imaging element chip, and is placed on an optical path of light entering from an user himself and the periphery of the user into the opening 306. For this reason, the optical path of light entering from the user himself and the periphery of the user into the opening 306 is changed from a direction perpendicular to the liquid crystal display monitor 304 of the mobile phone 3 to a direction parallel the liquid crystal display monitor 304 by the prism P of the zoom lens 307a inside the mobile phone 3.

Because the image pickup apparatus 307, which changes an optical path of light for obtaining image information inside the mobile phone 3, is used in the mobile phone 3, the mobile phone 3 having such a constitution can easily realize the compact design as compared with a mobile phone having an image pickup apparatus which does not change an optical path. Also, the mobile phone 3 can easily realize high performance and/or low cost, because the image pickup apparatus 307 for obtaining an image has the zoom lens 307a, which has a wide angle of view and a high variable magnification ratio, is favorably corrected for aberration, is bright, and has a long back focus in which filters can be arranged.

The cover glass CG is additionally cemented to the CCD 307b which is an imaging element chip, and the cover glass CG and the CCD 307b are integrally constructed as an imaging unit and can be placed in a lens frame 308 holding the zoom lens 307a by fitting the cover glass CG and the CCD 307b into the rear end of the lens flame 308 in a single operation. For this reason, alignment of the zoom lens 307a and the CCD 307b and the adjustment of the face-to-face spacing are not required, and the assembly is simplified. A cover member 309 for protecting the zoom lens 307a is placed at the front end of the lens frame 308 (which is not shown in the figure). A driving mechanism for the zoom lens 307a which is provided in the lens frame 308 is omitted from the figures. An object image received by the CCD 307b is inputted into a processing means of the mobile phone 3 through a terminal 310, and is displayed as an electronic image on the liquid crystal display monitor 304. Also, when an image is sent to a communication partner, the processing means has a signal processing function of converting the image information into a transmittable signal.

What is claimed is:

1. A zoom lens comprising a plurality of lens units so that spacings between the lens units are properly changed and thereby a magnification of the zoom lens is changed, wherein a most object-side lens unit comprises, in order from an object side, a negative lens, a reflecting member for changing an optical path, and a positive lens, without cementing the reflecting member and the positive lens as well as the reflecting member and the negative lens, and at least one of surfaces of the negative lens and the positive lens is configured as an aspherical surface to satisfy the following condition:

$$0.0001 < |Y_{49}|/ih_w < 0.1$$

where $Y_{49}$ is an aspherical amount of the aspherical surface at a position where a chief ray of light incident on the most object-side lens unit at an angle of 49° with an optical axis is incident on a most object-side aspherical surface in the lens unit and $ih_w$ is an image height at a wide-angle position.

2. A zoom lens according to claim 1, wherein the most object-side lens unit has a positive refracting power.

3. A zoom lens according to claim 1, wherein the reflecting member is a prism and satisfies the following condition:

$$1 < D_p/ih_w < 5$$

where $D_p$ is a length of the prism measured along the optical axis.

4. A zoom lens according to claim 1, further satisfying the following condition:

$$3.5 < f_t/f_w < 7.0$$

where $f_w$ is a focal length of the zoom lens at a wide-angle position and $f_t$ is a focal length of the zoom lens at a telephoto position.

5. A zoom lens according to claim 1, further satisfying the following condition:

$$0.5 < (r_{GIF\_O} + r_{GIF\_I})/(r_{GIF\_O} - r_{GIF\_I}) < 1.5$$

where $r_{GIF\_O}$ is a radius of curvature of an object-side surface of the negative lens located at the most object-side position of the most object-side lens unit and $r_{GIF\_I}$ is a radius of curvature of an image-side surface of the negative lens located at the most object-side position of the most object-side lens unit.

6. A zoom lens according to claim 1, further satisfying the following conditions:

$1.95 < n_{dGIF} < 2.1$ $18 < v_{dGIF} < 30$ where $n_{dGIF}$ is a refractive index of the negative lens located at the most object-side position of the most object-side lens unit and $v_{dGIF}$ is an Abbe's number of the negative lens located at the most object-side position of the most object-side lens unit.

7. A zoom lens according to claim 1, wherein an aperture stop is provided so that the lens unit located at the most object-side position and the aperture stop remain fixed when the magnification is changed.

8. A zoom lens according to claim 7, comprising, in order from the object side, a first lens unit, a second lens unit with negative refracting power, a third lens unit with positive refracting power, the aperture stop, a fourth lens unit with positive refracting power, and a fifth lens unit with positive refracting power.

9. A zoom lens according to claim 8, wherein the fifth lens unit includes a single lens with positive refracting power and satisfies the following condition:

$0.5 < f_{G5}/f_t < 2.0$ where $f_{G5}$ is a focal length of a positive lens constituting the fifth lens unit.

10. A zoom lens according to claim 8, satisfying at least one of the following conditions:

$-5.0 < P_{G2}/P_{G4} < -0.3$ $0.1 < P_{G3}/P_{G4} < 4$ where $P_{G2}$ is a refractive index of the second lens unit, $P_{G3}$ is a refractive index of the third lens unit, and $P_{G4}$ is a refractive index of the fourth lens unit.

11. A zoom lens according to claim 8, wherein the fifth lens unit includes a single lens with positive refracting power and satisfies the following condition:

$1.5 < P_w/ih_w < 2.3$ where $P_w$ is a position of an entrance pupil of the zoom lens at the wide-angle position.

12. A zoom lens according to claim 8, wherein the fourth lens unit has a negative lens located at a most image-side position which is movable, and satisfies the following condition:

$1 < (r_{G4L\_O} + r_{G4L\_I})/(r_{G4L\_O} - r_{G4L\_I}) < 8$ where $r_{G4L\_O}$ is a radius of curvature of an object-side surface of the negative lens located at the most image-side position of the fourth lens unit and $r_{G4L\_I}$ is a radius of curvature of an image-side surface of the negative lens located at the most image-side position of the fourth lens unit.

13. A zoom lens according to claim 8, wherein the third lens unit includes a single lens and has a positive refracting power.

14. A zoom lens according to claim 8, wherein the fourth lens unit consists of, in order from the object side, a positive lens, a cemented doublet of a positive lens and a negative lens, and a negative lens and satisfies the following condition:

$0.3 < P_{G4C}/P_{G4L} < 2$ where $P_{G4C}$ is a refractive index of the cemented doublet of the fourth lens unit and $P_{G4L}$ is a refractive index of the negative lens located at a most image-side position of the fourth lens unit.

15. An image pickup apparatus comprising:
a zoom lens according to claim 1; and
an image sensor converting an image formed by the zoom lens into an electric signal.

16. An image pickup apparatus according to claim 15, provided with a circuit electrically correcting distortion and/or chromatic aberration of magnification.

17. A zoom lens comprising a plurality of lens units so that spacings between the lens units are properly changed and thereby a magnification of the zoom lens is changed, wherein a most object-side lens unit comprises, in order from an object side, a negative lens, a reflecting member for changing an optical path, and a positive lens, without cementing the reflecting member and the positive lens as well as the reflecting member and the negative lens, and at least one of surfaces of the negative lens and the positive lens is configured as an aspherical surface to satisfy the following condition:

$0.0001 < |Y_{47}|/ih_w < 0.1$ where $Y_{47}$ is an aspherical amount of the aspherical surface at a position where a chief ray of light incident on the most object-side lens unit at an angle of 47° with an optical axis is incident on a most object-side aspherical surface in the lens unit and $ih_w$ is an image height at a wide-angle position.

18. A zoom lens according to claim 17, wherein the most object-side lens unit has a positive refracting power.

19. A zoom lens according to claim 17, wherein the reflecting member is a prism and satisfies the following condition:

$1 < D_p/ih_w < 5$ where $D_p$ is a length of the prism measured along the optical axis.

20. A zoom lens according to claim 17, further satisfying the following condition:

$3.5 < f_t/f_w < 7.0$ where $f_w$ is a focal length of the zoom lens at a wide-angle position and $f_t$ is a focal length of the zoom lens at a telephoto position.

21. A zoom lens according to claim 17, further satisfying the following condition:

$0.5 < (r_{GIF\_O} + r_{GIF\_I})/(r_{GIF\_O} - r_{GIF\_I}) < 1.5$ where $r_{GIF\_O}$ is a radius of curvature of an object-side surface of the negative lens located at the most object-side position of the most object-side lens unit and $r_{GIF\_I}$ is a radius of curvature of an image-side surface of the negative lens located at the most object-side position of the most object-side lens unit.

22. A zoom lens according to claim 17, further satisfying the following conditions:

$1.95 < n_{dGIF} < 2.1$ $18 < v_{dGIF} < 30$ where $n_{dGIF}$ is a refractive index of the negative lens located at the most object-side position of the most object-side lens unit and $v_{dGIF}$ is an Abbe's number of the negative lens located at the most object-side position of the most object-side lens unit.

23. A zoom lens according to claim 17, wherein an aperture stop is provided so that the lens unit located at the most object-side position and the aperture stop remain fixed when the magnification is changed.

24. A zoom lens according to claim 23, comprising, in order from the object side, a first lens unit, a second lens unit with negative refracting power, a third lens unit with positive refracting power, the aperture stop, a fourth lens unit with positive refracting power, and a fifth lens unit with positive refracting power.

25. A zoom lens according to claim 24, wherein the fourth lens unit consists of, in order from the object side, a positive lens, a cemented doublet of a positive lens and a negative lens, and a negative lens and satisfies the following condition:

$$0.3 < P_{G4C}/P_{G4L} < 2$$

where $P_{G4C}$ is a refractive index of the cemented doublet of the fourth lens unit and $P_{G4L}$ is a refractive index of the negative lens located at a most image-side position of the fourth lens unit.

26. A zoom lens according to claim 24, wherein the third lens unit includes a single lens and has a positive refracting power.

27. A zoom lens according to claim 24, wherein the fourth lens unit has a negative lens located at a most image-side position which is movable, and satisfies the following condition:

$$1 < (r_{G4L\_O} + r_{G4L\_I})/(r_{G4L\_O} - r_{G4L\_I}) < 8$$

where $r_{G4L\_O}$ is a radius of curvature of an object-side surface of the negative lens located at the most image-side position of the fourth lens unit and $r_{G4L\_I}$ is a radius of curvature of an image-side surface of the negative lens located at the most image-side position of the fourth lens unit.

28. A zoom lens according to claim 24, wherein the fifth lens unit includes a single lens with positive refracting power and satisfies the following condition:

$$1.5 < P_w/ih_w < 2.3$$

where $P_w$ is a position of an entrance pupil of the zoom lens at the wide-angle position.

29. A zoom lens according to claim 24, satisfying at least one of the following conditions:

$$-5.0 < P_{G2}/P_{G4} < -0.3$$

$$0.1 < P_{G3}/P_{G4} < 4$$

where $P_{G2}$ is a refractive index of the second lens unit, $P_{G3}$ is a refractive index of the third lens unit, and $P_{G4}$ is a refractive index of the fourth lens unit.

30. A zoom lens according to claim 24, wherein the fifth lens unit includes a single lens with positive refracting power and satisfies the following condition:

$$0.5 < f_{G5}/f_t < 2.0$$

where $f_{G5}$ is a focal length of a positive lens constituting the fifth lens unit.

31. An image pickup apparatus comprising:
a zoom lens according to claim 17; and
an image sensor converting an image formed by the zoom lens into an electric signal.

32. An image pickup apparatus according to claim 31, provided with a circuit electrically correcting distortion and/or chromatic aberration of magnification.

33. A zoom lens comprising a plurality of lens units so that spacings between the lens units are properly changed and thereby a magnification of the zoom lens is changed, wherein a most object-side lens unit comprises, in order from an object side, a negative lens, a reflecting member for changing an optical path, and a positive lens, without cementing the reflecting member and the positive lens as well as the reflecting member and the negative lens, and at least one of surfaces of the negative lens and the positive lens is configured as an aspherical surface to satisfy the following condition:

$$0.0001 < |Y_{45}|/ih_w < 0.1$$

where $Y_{45}$ is an aspherical amount of the aspherical surface at a position where a chief ray of light incident on the most object-side lens unit at an angle of 45° with an optical axis is incident on a most object-side aspherical surface in the lens unit and $ih_w$ is an image height at a wide-angle position.

34. A zoom lens according to claim 33, wherein the most object-side lens unit has a positive refracting power.

35. A zoom lens according to claim 33, wherein the reflecting member is a prism and satisfies the following condition:

$$1 < D_p/ih_w < 5$$

where $D_p$ is a length of the prism measured along the optical axis.

36. A zoom lens according to claim 33, further satisfying the following condition:

$$3.5 < f_t/f_w < 7.0$$

where $f_w$ is a focal length of the zoom lens at a wide-angle position and $f_t$ is a focal length of the zoom lens at a telephoto position.

37. A zoom lens according to claim 33, further satisfying the following condition:

$$0.5 < (r_{GIF\_O} + r_{GIF\_I})/(r_{GIF\_O} - r_{GIF\_I}) < 1.5$$

where $r_{GIF\_O}$ is a radius of curvature of an object-side surface of the negative lens located at the most object-side position of the most object-side lens unit and $r_{GIF\_I}$ is a radius of curvature of an image-side surface of the negative lens located at the most object-side position of the most object-side lens unit.

38. A zoom lens according to claim 33, further satisfying the following conditions:

$$1.95 < n_{dGIF} < 2.1$$

$$18 < \nu_{dGIF} < 30$$

where $n_{dGIF}$ is a refractive index of the negative lens located at the most object-side position of the most object-side lens unit and $\nu_{dGIF}$ is an Abbe's number of the negative lens located at the most object-side position of the most object-side lens unit.

39. A zoom lens according to claim 33, wherein an aperture stop is provided so that the lens unit located at the most object-side position and the aperture stop remain fixed when the magnification is changed.

40. A zoom lens according to claim 39, comprising, in order from the object side, a first lens unit, a second lens unit with negative refracting power, a third lens unit with positive refracting power, the aperture stop, a fourth lens unit with positive refracting power, and a fifth lens unit with positive refracting power.

41. A zoom lens according to claim 40, wherein the fourth lens unit consists of, in order from the object side, a positive lens, a cemented doublet of a positive lens and a negative lens, and a negative lens and satisfies the following condition:

$$0.3 < P_{G4C}/P_{G4L} < 2$$

where $P_{G4C}$ is a refractive index of the cemented doublet of the fourth lens unit and $P_{G4L}$ is a refractive index of the negative lens located at a most image-side position of the fourth lens unit.

42. A zoom lens according to claim 40, wherein the third lens unit includes a single lens and has a positive refracting power.

43. A zoom lens according to claim 40, wherein the fourth lens unit has a negative lens located at a most image-side position which is movable, and satisfies the following condition:

$$1<(r_{G4L\_O}+r_{G4L\_I})/(r_{G4L\_O}-r_{G4L\_I})<8$$

where $r_{G4L\_O}$ is a radius of curvature of an object-side surface of the negative lens located at the most image-side position of the fourth lens unit and $r_{G4L\_I}$ is a radius of curvature of an image-side surface of the negative lens located at the most image-side position of the fourth lens unit.

44. A zoom lens according to claim 40, wherein the fifth lens unit includes a single lens with positive refracting power and satisfies the following condition:

$$1.5<P_w/ih_w<2.3$$

where $P_w$ is a position of an entrance pupil of the zoom lens at the wide-angle position.

45. A zoom lens according to claim 40, satisfying at least one of the following conditions:

$$-5.0<P_{G2}/P_{G4}<-0.3$$

$$0.1<P_{G3}/P_{G4}<4$$

where $P_{G2}$ is a refractive index of the second lens unit, $P_{G3}$ is a refractive index of the third lens unit, and $P_{G4}$ is a refractive index of the fourth lens unit.

46. A zoom lens according to claim 40, wherein the fifth lens unit includes a single lens with positive refracting power and satisfies the following condition:

$$0.5<f_{G5}/f_t<2.0$$

where $f_{G5}$ is a focal length of a positive lens constituting the fifth lens unit.

47. An image pickup apparatus comprising:
a zoom lens according to claim 33; and
an image sensor converting an image formed by the zoom lens into an electric signal.

48. An image pickup apparatus according to claim 47, provided with a circuit electrically correcting distortion and/or chromatic aberration of magnification.

49. A zoom lens comprising a plurality of lens units so that spacings between the lens units are properly changed and thereby a magnification of the zoom lens is changed, wherein a most object-side lens unit comprises, in order from an object side, a negative lens, a reflecting member for changing an optical path, and a positive lens, without cementing the reflecting member and the positive lens as well as the reflecting member and the negative lens, and at least one of surfaces of the negative lens and the positive lens is configured as an aspherical surface to satisfy the following condition:

$$0.0001<|Y_{43}|/ih_w<0.1$$

where $Y_{43}$ is an aspherical amount of the aspherical surface at a position where a chief ray of light incident on the most object-side lens unit at an angle of 43° with an optical axis is incident on a most object-side aspherical surface in the lens unit and $ih_w$ is an image height at a wide-angle position.

50. A zoom lens according to claim 49, wherein the most object-side lens unit has a positive refracting power.

51. A zoom lens according to claim 49, wherein the reflecting member is a prism and satisfies the following condition:

$$1<D_p/ih_w<5$$

where $D_p$ is a length of the prism measured along the optical axis.

52. A zoom lens according to claim 49, further satisfying the following condition:

$$3.5<f_t/f_w<7.0$$

where $f_w$ is a focal length of the zoom lens at a wide-angle position and $f_t$ is a focal length of the zoom lens at a telephoto position.

53. A zoom lens according to claim 49, further satisfying the following condition:

$$0.5<(r_{GIF\_O}+r_{GIF\_I})/(r_{GIF\_O}-r_{GIF\_I})<1.5$$

where $r_{GIF\_O}$ is a radius of curvature of an object-side surface of the negative lens located at the most object-side position of the most object-side lens unit and $r_{GIF\_I}$ is a radius of curvature of an image-side surface of the negative lens located at the most object-side position of the most object-side lens unit.

54. A zoom lens according to claim 49, further satisfying the following conditions:

$$1.95<n_{dGIF}<2.1$$

$$18<\nu_{dGIF}<30$$

where $n_{dGIF}$ is a refractive index of the negative lens located at the most object-side position of the most object-side lens unit and $\nu_{dGIF}$ is an Abbe's number of the negative lens located at the most object-side position of the most object-side lens unit.

55. A zoom lens according to claim 49, wherein an aperture stop is provided so that the lens unit located at the most object-side position and the aperture stop remain fixed when the magnification is changed.

56. A zoom lens according to claim 55, comprising, in order from the object side, a first lens unit, a second lens unit with negative refracting power, a third lens unit with positive refracting power, the aperture stop, a fourth lens unit with positive refracting power, and a fifth lens unit with positive refracting power.

57. A zoom lens according to claim 56, wherein the fourth lens unit consists of, in order from the object side, a positive lens, a cemented doublet of a positive lens and a negative lens, and a negative lens and satisfies the following condition:

$$0.3<P_{G4C}/P_{G4L}<2$$

where $P_{G4C}$ is a refractive index of the cemented doublet of the fourth lens unit and $P_{G4L}$ is a refractive index of the negative lens located at a most image-side position of the fourth lens unit.

58. A zoom lens according to claim 56, wherein the third lens unit includes a single lens and has a positive refracting power.

59. A zoom lens according to claim 56, wherein the fourth lens unit has a negative lens located at a most image-side position which is movable, and satisfies the following condition:

$$1<(r_{G4L\_O}+r_{G4L\_I})/(r_{G4L\_O}-r_{G4L\_I})<8$$

where $r_{G4L\_O}$ is a radius of curvature of an object-side surface of the negative lens located at the most image-side position of the fourth lens unit and $r_{G4L\_I}$ is a radius of curvature of an image-side surface of the negative lens located at the most image-side position of the fourth lens unit.

60. A zoom lens according to claim 56, wherein the fifth lens unit includes a single lens with positive refracting power and satisfies the following condition:

$$1.5<P_w/ih_w<2.3$$

where $P_w$ is a position of an entrance pupil of the zoom lens at the wide-angle position.

61. A zoom lens according to claim 56, satisfying at least one of the following conditions:

$$-5.0 < P_{G2}/P_{G4} < -0.3$$

$$0.1 < P_{G3}/P_{G4} < 4$$

where $P_{G2}$ is a refractive index of the second lens unit, $P_{G3}$ is a refractive index of the third lens unit, and $P_{G4}$ is a refractive index of the fourth lens unit.

62. A zoom lens according to claim 56, wherein the fifth lens unit includes a single lens with positive refracting power and satisfies the following condition:

$$0.5 < f_{G5}/f_t < 2.0$$

where $f_{G5}$ is a focal length of a positive lens constituting the fifth lens unit.

63. An image pickup apparatus comprising:
a zoom lens according to claim 49; and
an image sensor converting an image formed by the zoom lens into an electric signal.

64. An image pickup apparatus according to claim 63, provided with a circuit electrically correcting distortion and/or chromatic aberration of magnification.

65. A zoom lens comprising a plurality of lens units so that spacings between the lens units are properly changed and thereby a magnification of the zoom lens is changed, wherein a most object-side lens unit comprises, in order from an object side, a negative lens, a reflecting member for changing an optical path, and a positive lens, without cementing the reflecting member and the positive lens as well as the reflecting member and the negative lens, and at least one of surfaces of the negative lens and the positive lens is configured as an aspherical surface to satisfy the following condition:

$$0.0001 < |Y_{41}|/ih_w < 0.1$$

where $Y_{41}$ is an aspherical amount of the aspherical surface at a position where a chief ray of light incident on the most object-side lens unit at an angle of 41° with an optical axis is incident on a most object-side aspherical surface in the lens unit and $ih_w$ is an image height at a wide-angle position.

66. A zoom lens according to claim 65, wherein the most object-side lens unit has a positive refracting power.

67. A zoom lens according to claim 65, wherein the reflecting member is a prism and satisfies the following condition:

$$1 < D_p/ih_w < 5$$

where $D_p$ is a length of the prism measured along the optical axis.

68. A zoom lens according to claim 65, further satisfying the following condition:

$$3.5 < f_t/f_w < 7.0$$

where $f_w$ is a focal length of the zoom lens at a wide-angle position and $f_t$ is a focal length of the zoom lens at a telephoto position.

69. A zoom lens according to claim 65, further satisfying the following condition:

$$0.5 < (r_{GIF\_O} + r_{GIF\_I})/(r_{GIF\_O} - r_{GIF\_I}) < 1.5$$

where $r_{GIF\_O}$ is a radius of curvature of an object-side surface of the negative lens located at the most object-side position of the most object-side lens unit and $r_{GIF\_I}$ is a radius of curvature of an image-side surface of the negative lens located at the most object-side position of the most object-side lens unit.

70. A zoom lens according to claim 65, further satisfying the following conditions:

$$1.95 < n_{dGIF} < 2.1$$

$$18 < \nu_{dGIF} < 30$$

where $n_{dGIF}$ is a refractive index of the negative lens located at the most object-side position of the most object-side lens unit and $\nu_{dGIF}$ is an Abbe's number of the negative lens located at the most object-side position of the most object-side lens unit.

71. A zoom lens according to claim 65, wherein an aperture stop is provided so that the lens unit located at the most object-side position and the aperture stop remain fixed when the magnification is changed.

72. A zoom lens according to claim 71, comprising, in order from the object side, a first lens unit, a second lens unit with negative refracting power, a third lens unit with positive refracting power, the aperture stop, a fourth lens unit with positive refracting power, and a fifth lens unit with positive refracting power.

73. A zoom lens according to claim 72, wherein the fourth lens unit has a negative lens located at a most image-side position which is movable, and satisfies the following condition:

$$1 < (r_{G4L\_O} + r_{G4L\_I})/(r_{G4L\_O} - r_{G4L\_I}) < 8$$

where $r_{G4L\_O}$ is a radius of curvature of an object-side surface of the negative lens located at the most image-side position of the fourth lens unit and $r_{G4L\_I}$ is a radius of curvature of an image-side surface of the negative lens located at the most image-side position of the fourth lens unit.

74. A zoom lens according to claim 72, wherein the third lens unit includes a single lens and has a positive refracting power.

75. A zoom lens according to claim 72, wherein the fourth lens unit consists of, in order from the object side, a positive lens, a cemented doublet of a positive lens and a negative lens, and a negative lens and satisfies the following condition:

$$0.3 < P_{G4C}/P_{G4L} < 2$$

where $P_{G4C}$ is a refractive index of the cemented doublet of the fourth lens unit and $P_{G4L}$ is a refractive index of the negative lens located at a most image-side position of the fourth lens unit.

76. A zoom lens according to claim 72, wherein the fifth lens unit includes a single lens with positive refracting power and satisfies the following condition:

$$1.5 < P_w/ih_w < 2.3$$

where $P_w$ is a position of an entrance pupil of the zoom lens at the wide-angle position.

77. A zoom lens according to claim 72, satisfying at least one of the following conditions:

$$-5.0 < P_{G2}/P_{G4} < -0.3$$

$$0.1 < P_{G3}/P_{G4} < 4$$

where $P_{G2}$ is a refractive index of the second lens unit, $P_{G3}$ is a refractive index of the third lens unit, and $P_{G4}$ is a refractive index of the fourth lens unit.

78. A zoom lens according to claim 72, wherein the fifth lens unit includes a single lens with positive refracting power and satisfies the following condition:

$$0.5 < f_{G5}/f_t < 2.0$$

where $f_{G5}$ is a focal length of a positive lens constituting the fifth lens unit.

79. An image pickup apparatus comprising:
a zoom lens according to claim 65; and
an image sensor converting an image formed by the zoom lens into an electric signal.

80. An image pickup apparatus according to claim 79, provided with a circuit electrically correcting distortion and/or chromatic aberration of magnification.

81. A zoom lens comprising a plurality of lens units so that spacings between the lens units are properly changed and thereby a magnification of the zoom lens is changed, wherein a most object-side lens unit comprises, in order from an object side, a negative lens, a reflecting member for changing an optical path, and one or two positive lenses, without cementing the reflecting member and the one or two positive lenses as well as the reflecting member and the negative lens; at least one of surfaces of the negative lens and the one or two positive lenses is configured as an aspherical surface; and a most image-side lens unit has a positive refracting power, to satisfy the following condition:

$$0.0001 < |Y_{40}|/ih_w < 0.1$$

where $Y_{40}$ is an aspherical amount of the aspherical surface at a position where a chief ray of light incident on the most object-side lens unit at an angle of 40° with an optical axis is incident on a most object-side aspherical surface in the lens unit and $ih_w$ is an image height at a wide-angle position.

82. A zoom lens according to claim 81, wherein the most object-side lens unit has a positive refracting power.

83. A zoom lens according to claim 81, wherein the reflecting member is a prism and satisfies the following condition:

$$1 < D_p/ih_w < 5$$

where $D_p$ is a length of the prism measured along the optical axis.

84. A zoom lens according to claim 81, further satisfying the following condition:

$$3.5 < f_t/f_w < 7.0$$

where $f_w$ is a focal length of the zoom lens at a wide-angle position and $f_t$ is a focal length of the zoom lens at a telephoto position. curvature of an image-side surface of the negative lens located at the most object-side position of the most object-side lens unit.

85. A zoom lens according to claim 81, further satisfying the following condition:

$$0.5 < (r_{GIF\_O} + r_{GIF\_I})/(r_{GIF\_O} - r_{GIF\_I}) < 1.5$$

where $r_{GIF\_O}$ is a radius of curvature of an object-side surface of the negative lens located at the most object-side position of the most object-side lens unit and $r_{GIF\_I}$ is a radius of curvature of an image-side surface of the negative lens located at the most object-side position of the most object-side lens unit.

86. A zoom lens according to claim 81, further satisfying the following conditions:

$$1.95 < n_{dGIF} < 2.1$$

$$18 < v_{dGIF} < 30$$

where $n_{dGIF}$ is a refractive index of the negative lens located at the most object-side position of the most object-side lens unit and $v_{dGIF}$ is an Abbe's number of the negative lens located at the most object-side position of the most object-side lens unit.

87. A zoom lens according to claim 81, wherein an aperture stop is provided so that the lens unit located at the most object-side position and the aperture stop remain fixed when the magnification is changed.

88. A zoom lens according to claim 87, comprising, in order from the object side, a first lens unit, a second lens unit with negative refracting power, a third lens unit with positive refracting power, the aperture stop, a fourth lens unit with positive refracting power, and a fifth lens unit with positive refracting power.

89. A zoom lens according to claim 88, wherein the fourth lens unit consists of, in order from the object side, a positive lens, a cemented doublet of a positive lens and a negative lens, and a negative lens and satisfies the following condition:

$$0.3 < P_{G4C}/P_{G4L} < 2$$

where $P_{G4C}$ is a refractive index of the cemented doublet of the fourth lens unit and $P_{G4L}$ is a refractive index of the negative lens located at a most image-side position of the fourth lens unit.

90. A zoom lens according to claim 88, wherein the third lens unit includes a single lens and has a positive refracting power.

91. A zoom lens according to claim 88, wherein the forth lens has a negative lens located at a most image-side position which is movable, and satisfies the following condition:

$$1 < (r_{G4L\_O} + r_{G4L\_I})/(r_{G4L\_O} - r_{G4L\_I}) < 8$$

where $r_{G4L\_O}$ is a radius of curvature of an object-side surface of the negative lens located at the most image-side position of the fourth lens unit and $r_{G4L\_I}$ is a radius of curvature of an image-side surface of the negative lens located at the most image-side position of the fourth lens unit.

92. A zoom lens according to claim 88, wherein the fifth lens unit includes a single lens with positive refracting power and satisfies the following condition:

$$1.5 < P_w/ih_w < 2.3$$

where $P_w$ is a position of an entrance pupil of the zoom lens at the wide-angle position.

93. A zoom lens according to claim 88, satisfying at least one of the following conditions:

$$-5.0 < P_{G2}/P_{G4} < -0.3$$

$$0.1 < P_{G3}/P_{G4} < 4$$

where $P_{G2}$ is a refractive index of the second lens unit, $P_{G3}$ is a refractive index of the third lens unit, and $P_{G4}$ is a refractive index of the fourth lens unit.

94. A zoom lens according to claim 88, wherein the fifth lens unit includes a single lens with positive refracting power and satisfies the following condition:

$$0.5 < f_{G5}/f_t < 2.0$$

where $f_{G5}$ is a focal length of a positive lens constituting the fifth lens unit.

95. An image pickup apparatus comprising:
a zoom lens according to claim 81; and
an image sensor converting an image formed by the zoom lens into an electric signal.

96. An image pickup apparatus according to claim 95, provided with a circuit electrically correcting distortion and/or chromatic aberration of magnification.

97. A zoom lens comprising a plurality of lens units so that spacings between the lens units are properly changed and thereby a magnification of the zoom lens is changed, wherein a most object-side lens unit comprises, in order from an object side, a negative lens, a reflecting member for changing an optical path, and one or two positive lenses, without cementing the reflecting member and the one or two positive lenses as well as the reflecting member and the negative lens; at least one of surfaces of the negative lens and the one or two positive lenses is configured as an aspherical surface; and a most image-side lens unit has a positive refracting power, to satisfy the following condition:

$$0.0001 < |Y_{39}|/ih_w < 0.1$$

where $Y_{39}$ is an aspherical amount of the aspherical surface at a position where a chief ray of light incident on the most object-side lens unit at an angle of 39° with an optical axis is incident on a most object-side aspherical surface in the lens unit and $ih_w$ is an image height at a wide-angle position.

98. A zoom lens according to claim 97, wherein the most object-side lens unit has a positive refracting power.

99. A zoom lens according to claim 7, wherein the reflecting member is a prism and satisfies the following condition:

$$1 < D_p/ih_w < 5$$

where $D_p$ is a length of the prism measured along the optical axis.

100. A zoom lens according to claim 97, further satisfying the following condition:

$$3.5 < f_t/f_w < 7.0$$

where $f_w$ is a focal length of the zoom lens at a wide-angle position and $f_t$ is a focal length of the zoom lens at a telephoto position.

101. A zoom lens according to claim 97, further satisfying the following condition:

$$0.5 < (r_{GIF\_O} + r_{GIF\_I})/(r_{GIF\_O} - r_{GIF\_I}) < 1.5$$

where $r_{GIF\_O}$ is a radius of curvature of an object-side surface of the negative lens located at the most object-side position of the most object-side lens unit and $r_{GIF\_I}$ is a radius of curvature of an image-side surface of the negative lens located at the most object-side position of the most object-side lens unit.

102. A zoom lens according to claim 97, further satisfying the following conditions:

$$1.95 < n_{dGIF} < 2.1$$

$$18 < v_{dGIF} < 30$$

where $n_{dGIF}$ is a refractive index of the negative lens located at the most object-side position of the most object-side lens unit and $v_{dGIF}$ is an Abbe's number of the negative lens located at the most object-side position of the most object-side lens unit.

103. A zoom lens according to claim 97, wherein an aperture stop is provided so that the lens unit located at the most object-side position and the aperture stop remain fixed when the magnification is changed.

104. A zoom lens according to claim 103, comprising, in order from the object side, a first lens unit, a second lens unit with negative refracting power, a third lens unit with positive refracting power, the aperture stop, a fourth lens unit with positive refracting power, and a fifth lens unit with positive refracting power.

105. A zoom lens according to claim 104, wherein the fourth lens unit consists of, in order from the object side, a positive lens, a cemented doublet of a positive lens and a negative lens, and a negative lens and satisfies the following condition:

$$0.3 < P_{G4C}/P_{G4L} < 2$$

where $P_{G4C}$ is a refractive index of the cemented doublet of the fourth lens unit and $P_{G4L}$ is a refractive index of the negative lens located at a most image-side position of the fourth lens unit.

106. A zoom lens according to claim 104, wherein the third lens unit includes a single lens and has a positive refracting power.

107. A zoom lens according to claim 104, wherein the fourth lens unit has a negative lens located at a most image-side position which is movable, and satisfies the following condition:

$$1 < (r_{G4L\_O} + r_{G4L\_I})/(r_{G4L\_O} - r_{G4L\_I}) < 8$$

where $r_{G4L\_O}$ is a radius of curvature of an object-side surface of the negative lens located at the most image-side position of the fourth lens unit and $r_{G4L\_I}$ is a radius of curvature of an image-side surface of the negative lens located at the most image-side position of the fourth lens unit.

108. A zoom lens according to claim 104, wherein the fifth lens unit includes a single lens with positive refracting power and satisfies the following condition:

$$1.5 < P_w/ih_w < 2.3$$

where $P_w$ is a position of an entrance pupil of the zoom lens at the wide-angle position.

109. A zoom lens according to claim 104, satisfying at least one of the following conditions:

$$-5.0 < P_{G2}/P_{G4} < -0.3$$

$$0.1 < P_{G3}/P_{G4} < 4$$

where $P_{G2}$ is a refractive index of the second lens unit, $P_{G3}$ is a refractive index of the third lens unit, and $P_{G4}$ is a refractive index of the fourth lens unit.

110. A zoom lens according to claim 104, wherein the fifth lens unit includes a single lens with positive refracting power and satisfies the following condition:

$$0.5 < f_{G5}/f_t < 2.0$$

where $f_{G5}$ is a focal length of a positive lens constituting the fifth lens unit.

111. An image pickup apparatus comprising:
a zoom lens according to claim 97; and
an image sensor converting an image formed by the zoom lens into an electric signal.

112. An image pickup apparatus according to claim 111, provided with a circuit electrically correcting distortion and/or chromatic aberration of magnification.

113. A zoom lens comprising a plurality of lens units so that spacings between the lens units are properly changed and thereby a magnification of the zoom lens is changed, wherein a most object-side lens unit comprises, in order from an object side, a negative lens, a reflecting member for changing an optical path, and one or two positive lenses, without cementing the reflecting member and the one or two positive lenses as well as the reflecting member and the negative lens; at least one of surfaces of the negative lens and the one or two positive lenses is configured as an aspherical surface; and a most image-side lens unit has a positive refracting power and includes a single positive lens, to satisfy the following condition:

$$0.0001 < |Y_{38}|/ih_w < 0.1$$

where $Y_{38}$ is an aspherical amount of the aspherical surface at a position where a chief ray of light incident on the most object-side lens unit at an angle of 38° with an optical axis is incident on a most object-side aspherical surface in the lens unit and $ih_w$ is an image height at a wide-angle position.

114. A zoom lens according to claim 113, wherein the most object-side lens unit has a positive refracting power.

115. A zoom lens according to claim 113, wherein the reflecting member is a prism and satisfies the following condition:

$$1 < D_p/ih_w < 5$$

where $D_p$ is a length of the prism measured along the optical axis.

116. A zoom lens according to claim 113, further satisfying the following condition:

$$3.5 < f_t/f_w < 7.0$$

where $f_w$ is a focal length of the zoom lens at a wide-angle position and $f_t$ is a focal length of the zoom lens at a telephoto position.

117. A zoom lens according to claim 113, further satisfying the following condition:

$$0.5 < (r_{GIF\_O} + r_{GIF\_I})/(r_{GIF\_O} - r_{GIF\_I}) < 1.5$$

where $r_{GIF\_O}$ is a radius of curvature of an object-side surface of the negative lens located at the most object-side position of the most object-side lens unit and $r_{GIF\_I}$ is a radius of curvature of an image-side surface of the negative lens located at the most object-side position of the most object-side lens unit.

118. A zoom lens according to claim 113, further satisfying the following conditions:

$$1.95 < n_{dGIF} < 2.1$$

$$18 < \nu_{dGIF} < 30$$

where $n_{dGIF}$ is a refractive index of the negative lens located at the most object-side position of the most object-side lens unit and $\nu_{dGIF}$ is an Abbe's number of the negative lens located at the most object-side position of the most object-side lens unit.

119. A zoom lens according to claim 113, wherein an aperture stop is provided so that the lens unit located at the most object-side position and the aperture stop remain fixed when the magnification is changed.

120. A zoom lens according to claim 119, comprising, in order from the object side, a first lens unit, a second lens unit with negative refracting power, a third lens unit with positive refracting power, the aperture stop, a fourth lens unit with positive refracting power, and a fifth lens unit with positive refracting power.

121. A zoom lens according to claim 120, wherein the fourth lens unit consists of, in order from the object side, a positive lens, a cemented doublet of a positive lens and a negative lens, and a negative lens and satisfies the following condition:

$$0.3 < P_{G4C}/P_{G4L} < 2$$

where $P_{G4C}$ is a refractive index of the cemented doublet of the fourth lens unit and $P_{G4L}$ is a refractive index of the negative lens located at a most image-side position of the fourth lens unit.

122. A zoom lens according to claim 120, wherein the third lens unit includes a single lens and has a positive refracting power.

123. A zoom lens according to claim 120, wherein the fourth lens unit has a negative lens located at a most image-side position which is movable, and satisfies the following condition:

$$1 < (r_{G4L\_O} + r_{G4L\_I})/(r_{G4L\_O} - r_{G4L\_I}) < 8$$

where $r_{G4L\_O}$ is a radius of curvature of an object-side surface of the negative lens located at the most image-side position of the fourth lens unit and $r_{G4L\_I}$ is a radius of curvature of an image-side surface of the negative lens located at the most image-side position of the fourth lens unit.

124. A zoom lens according to claim 120, wherein the fifth lens unit includes a single lens with positive refracting power and satisfies the following condition:

$$1.5 < P_w/ih_w < 2.3$$

where $P_w$ is a position of an entrance pupil of the zoom lens at the wide-angle position.

125. A zoom lens according to claim 120, satisfying at least one of the following conditions:

$$-5.0 < P_{G2}/P_{G4} < -0.3$$

$$0.1 < P_{G3}/P_{G4} < 4$$

where $P_{G2}$ is a refractive index of the second lens unit, $P_{G3}$ is a refractive index of the third lens unit, and $P_{G4}$ is a refractive index of the fourth lens unit.

126. A zoom lens according to claim 120, wherein the fifth lens unit includes a single lens with positive refracting power and satisfies the following condition:

$$0.5 < f_{G5}/f_t < 2.0$$

where $f_{G5}$ is a focal length of a positive lens constituting the fifth lens unit.

127. An image pickup apparatus comprising:
a zoom lens according to claim 113; and
an image sensor converting an image formed by the zoom lens into an electric signal.

128. An image pickup apparatus according to claim 127, provided with a circuit electrically correcting distortion and/or chromatic aberration of magnification.

* * * * *